US012763832B2

(12) United States Patent
Chou et al.

(10) Patent No.: US 12,763,832 B2
(45) Date of Patent: Oct. 13, 2026

(54) MULTIPLE-TRANSMISSION-RECEPTION-POINT MEASUREMENT AND TRANSMISSION IN WIRELESS COMMUNICATION SYSTEM

(71) Applicant: MEDIATEK INC., Hsinchu (TW)

(72) Inventors: Kuan-Hung Chou, Hsinchu (TW); Chin-Kuo Jao, Hsinchu (TW); Sandeep Bhat, Bengaluru KA (IN)

(73) Assignee: MEDIATEK INC., Hsinchu (TW)

( * ) Notice: Subject to any disclaimer, the term of this patent is extended or adjusted under 35 U.S.C. 154(b) by 51 days.

(21) Appl. No.: 18/169,613

(22) Filed: Feb. 15, 2023

(65) Prior Publication Data

US 2023/0291452 A1 Sep. 14, 2023

(30) Foreign Application Priority Data

Mar. 9, 2022 (IN) ............................ 202221012693

(51) Int. Cl.
*H04B 7/06* (2006.01)
*H04B 7/10* (2017.01)
*H04L 5/00* (2006.01)

(52) U.S. Cl.
CPC ......... *H04B 7/0626* (2013.01); *H04B 7/0623* (2013.01); *H04B 7/0632* (2013.01);
(Continued)

(58) Field of Classification Search
None
See application file for complete search history.

(56) References Cited

U.S. PATENT DOCUMENTS

2021/0143870 A1 5/2021 Faxér .................. H04B 7/0417
2022/0123810 A1 * 4/2022 Huang ................. H04L 5/0091
(Continued)

FOREIGN PATENT DOCUMENTS

CN 110945793 A 3/2020
CN 112913155 A 6/2021
(Continued)

OTHER PUBLICATIONS

Combined Taiwanese Office Action and Search Report issued Sep. 22, 2023 in Taiwanese Application 112108711, 4 pages.
(Continued)

*Primary Examiner* — Minh Trang T Nguyen
(74) *Attorney, Agent, or Firm* — Helen Mao; Imperium Patent Works

(57) ABSTRACT

A method of channel state information (CSI) report can include receiving a CSI report configuration at a user equipment (UE) from a base station, the CSI report configuration being associated with a set of CSI reference signal (CSI-RS) resources corresponding to multiple transmission reception points (TRPs), performing a channel measurement based on the CSI-RSs resources corresponding to the multiple TRPs, determining a precoder matrix indicator (PMI) based on measurement results of the channel measurement, the PMI corresponding to a precoder matrix, denoted W, of a Type II CSI codebook, the precoder matrix having a spatial domain (SD) basis vector matrix, denoted $W_1$, SD basis selection of the SD basis vector matrix being TRP-specific, and transmitting a CSI report to the base station, the CSI report including the PMI.

20 Claims, 28 Drawing Sheets

(52) U.S. Cl.
CPC ............. *H04B 7/0639* (2013.01); *H04B 7/10* (2013.01); *H04L 5/0035* (2013.01); *H04L 5/0051* (2013.01)

(56) References Cited

U.S. PATENT DOCUMENTS

| | | | | |
|---|---|---|---|---|
| 2022/0140981 | A1 | 5/2022 | Hindy | |
| 2022/0329304 | A1 | 10/2022 | Ahmed Salem | |
| 2023/0062132 | A1 * | 3/2023 | Wu | H04W 74/0808 |
| 2023/0246785 | A1 | 8/2023 | Grossmann | |
| 2023/0309110 | A1 | 9/2023 | Khoshnevisan | |

FOREIGN PATENT DOCUMENTS

| | | | |
|---|---|---|---|
| CN | 113228768 | A | 8/2021 |
| CN | 107113040 | B | 9/2021 |
| EP | 3 605 868 | A2 | 2/2020 |
| TW | 201242292 | A1 | 10/2012 |
| TW | 201534072 | A | 9/2015 |
| TW | 201822495 | A | 6/2018 |
| TW | 201904215 | A | 1/2019 |
| TW | 202014016 | A | 4/2020 |
| WO | 2020147025 | A1 | 7/2020 |
| WO | 2021159376 | A1 | 8/2021 |
| WO | 2021238576 | A1 | 12/2021 |

OTHER PUBLICATIONS

Combined Taiwanese Office Action and Search Report issued Jul. 28, 2023, in corresponding Taiwanese Patent Application No. 112108712 (with English Translation of Category of Cited Documents), 8 pages.
Taiwan Intellectual Property Office Action 112108710, dated Jul. 18, 2024.
USPTO Action U.S. Appl. No. 18/169,711 Dated Jun. 20, 2025.
USPTO Action U.S. Appl. No. 18/169,672 Dated May 1, 2025.
China Intellectual Property Office Action 202310218043.6 Dated Aug. 2, 2025.
China Intellectual Property Office Action 202310218884.7 Dated Aug. 23, 2025 (No English Translation Available).
China Intellectual Property Office Action 202310218884.7 Dated Dec. 16, 2025 (No English Translation Available).

* cited by examiner

ALT 1.1: ANTENNA CONFIGURATION IS CONFIGURED FOR EACH CSI-RS RESOURCES

| $P_{CSI\text{-}RS}$ | TRP 1 | TRP 2 | TRP 3 | TRP 4 | $W_1$ REPORTING | NOTE |
|---|---|---|---|---|---|---|
| #CSI-RS PORTS IN RESOURCE SET | RS# 1 $(N_1,N_2)$ | RS# 2 $(N_1,N_2)$ | RS# 3 $(N_1,N_2)$ | RS# 4 $(N_1,N_2)$ | | |
| 32 | (4,1) | (4,1) | (4,1) | (4,1) | $\{W_1^{(1)}, W_1^{(2)}, W_1^{(3)}, W_1^{(4)}\}$ | 4 TRPS ARE NON-CO-LOCATED |
| | (8,1) | (4,1) | (4,1) | (4,1) | $\{W_1^{(1)}, W_1^{(2)}, W_1^{(3)}\}$ | {TRP1, TRP2} CO-LOCATED |
| | (4,1) | (4,1) | (4,1) | (4,1) | $\{W_1^{(1)}, W_1^{(2)}, W_1^{(3)}\}$ | {TRP2, TRP3} CO-LOCATED |
| | (4,1) | (4,1) | (4,1) | (4,1) | $\{W_1^{(1)}, W_1^{(2)}\}$ | {TRP1, TRP2} CO-LOCATED {TRP3, TRP4} CO-LOCATED |

1601 1602 1603 1604

: RESOURCE GROUP 1
: RESOURCE GROUP 2
: RESOURCE GROUP 3
: RESOURCE GROUP 4

FIG. 16

ALT 1.2: ANTENNA CONFIGURATION IS CONFIGURED FOR THE CSI-RS RESOURCES WIHTIN THE RESOURCE GROUP

| $P_{CSI\text{-}RS}$ | TRP 1 | TRP 2 | TRP 3 | TRP 4 | $W_1$ REPORTING | NOTE |
|---|---|---|---|---|---|---|
| #CSI-RS PORTS IN RESOURCE SET | RS# 1 $(N_1,N_2)$ | RS# 2 $(N_1,N_2)$ | RS# 3 $(N_1,N_2)$ | RS# 4 $(N_1,N_2)$ | | |
| 32 | (4,1) | (4,1) | (4,1) | (4,1) | $\{W_1^{(1)}, W_1^{(2)}, W_1^{(3)}, W_1^{(4)}\}$ | 4 TRPS ARE NON-CO-LOCATED |
| | (8,1) | | (4,1) | (4,1) | $\{W_1^{(1)}, W_1^{(2)}, W_1^{(3)}\}$ | {TRP1, TRP2} CO-LOCATED |
| | (4,1) | (8,1) | | (4,1) | $\{W_1^{(1)}, W_1^{(2)}, W_1^{(3)}\}$ | {TRP2, TRP3} CO-LOCATED |
| | (8,1) | | (8,1) | | $\{W_1^{(1)}, W_1^{(2)}\}$ | {TRP1, TRP2} CO-LOCATED {TRP3, TRP4} CO-LOCATED |

1701 1702 1703 1704

: RESOURCE GROUP 1
: RESOURCE GROUP 2
: RESOURCE GROUP 3
: RESOURCE GROUP 4

FIG. 17

| CSI | | REPORT BOTH sTRP AND mTRP CSIs (X=4 CASE) | | | | |
|---|---|---|---|---|---|---|
| | | TRP#1 CSI | TRP#2 CSI | TRP#3 CSI | TRP#4 CSI | mTRP CSI |
| CRI | | $CRI^{(1)}$ | $CRI^{(2)}$ | $CRI^{(3)}$ | $CRI^{(4)}$ | $CRI^{(mTRP)}$ |
| RI | | $RI^{(1)}$ | $RI^{(2)}$ | $RI^{(3)}$ | $RI^{(4)}$ | $RI^{(mTRP)}$ |
| PMI | $W_1$ | $W_1^{(1)}$ | $W_1^{(2)}$ | $W_1^{(3)}$ | $W_1^{(4)}$ | NOT REPORTED |
| | $W_2$ | $W_2$, TRP#1 | $W_2$, TRP#2 | $W_2$, TRP#3 | $W_2$, TRP#4 | $\{W_2^{(1)}, W_2^{(2)}, W_2^{(3)}, W_2^{(4)}\}$ |
| | $W_f$ | $W_f$, TRP#1 | $W_f$, TRP#2 | $W_f$, TRP#3 | $W_f$, TRP#4 | $\{W_f^{(1)}, W_f^{(2)}, W_f^{(3)}, W_f^{(4)}\}$ |
| CQI | | $CQI^{(1)}$ | $CQI^{(2)}$ | $CQI^{(3)}$ | $CQI^{(4)}$ | $CQI^{(mTRP)}$ |

| INDICATOR | DESIGN | TRP 1 | TRP 2 | TRP 3 | TRP 4 | NOTE |
|---|---|---|---|---|---|---|
| SCI | TRP COMMON | $i_{1,8}$ | | | | |
| REFERENCE AMPLITUDE | TRP COMMON | $i_{2,3}$ | | | | POL. SPECIFIC $i_{2,3} = [k_0^{(1)} \quad k_1^{(1)}]$<br>POL. COMMON $i_{2,3} = \mathrm{MAX}\{k_0^{(1)}, k_1^{(1)}\}$ |
| | TRP SPECIFIC | $i_{2,3}^{(1)}$ | $i_{2,3}^{(2)}$ | $i_{2,3}^{(3)}$ | $i_{2,3}^{(4)}$ | POL. SPECIFIC $i_{2,3}^{(p)} = [k_0^{(1),(p)} \quad k_1^{(1),(p)}]$<br>POL. COMMON $i_{2,3}^{(p)} = \mathrm{MAX}[k_0^{(1),(p)} \quad k_1^{(1),(p)}]$ |
| DIFFERENTIAL AMPLITUDE | TRP SPECIFIC | $i_{2,4}^{(1)}$ | $i_{2,4}^{(2)}$ | $i_{2,4}^{(3)}$ | $i_{2,4}^{(4)}$ | $i_{2,4}^{(p)} = [k_0^{(2)} \ldots k_{M-1}^{(2)}]$, $k_f^{(2)} = [k_{0,f}^{(2)} \ldots k_{2Lp-1,f}^{(2)}]$ |
| PCI | TRP SPECIFIC | $i_{2,5}^{(1)}$ | $i_{2,5}^{(2)}$ | $i_{2,5}^{(3)}$ | $i_{2,5}^{(4)}$ | $i_{2,5}^{(p)} = [c_0 \ldots c_{M-1}]$, $c_f = [c_{0,f} \ldots c_{2Lp-1,f}]$ |
| BITMAP | TRP COMMON | $i_{1,7}$ | | | | APPLY TO TRP COMMON FD BASIS SELECTION (ALT. 2) |
| | TRP SPECIFIC | $i_{1,7}^{(1)}$ | $i_{1,7}^{(2)}$ | $i_{1,7}^{(3)}$ | $i_{1,7}^{(4)}$ | APPLY TO TRP SPECIFIC FD BASIS SELECTION (ALT. 1) |

FIG. 21

| INDICATOR | DESIGN | TRP 1 | TRP 2 | TRP 3 | TRP 4 |
|---|---|---|---|---|---|
| SCI | TRP COMMON | $i_{1,8}$ | | | |
| REFERENCE AMPLITUDE | TRP SPECIFIC | $i_{2,3}$ | | | |
| DIFFERENTIAL AMPLITUDE | TRP SPECIFIC | $i_{2,4}^{(1)}$ | $i_{2,4}^{(2)}$ | $i_{2,4}^{(3)}$ | $i_{2,4}^{(4)}$ |
| PCI | TRP SPECIFIC | $i_{2,5}^{(1)}$ | $i_{2,5}^{(2)}$ | $i_{2,5}^{(3)}$ | $i_{2,5}^{(4)}$ |

| INDICATOR | DESIGN | TRP 1 | TRP 2 | TRP 3 | TRP 4 |
|---|---|---|---|---|---|
| SCI | TRP COMMON | $i_{1,8}$ | | | |
| REFERENCE AMPLITUDE | TRP SPECIFIC | $i_{2,3}^{(1)}$ | $i_{2,3}^{(2)}$ | $i_{2,3}^{(3)}$ | $i_{2,3}^{(4)}$ |
| DIFFERENTIAL AMPLITUDE | TRP SPECIFIC | $i_{2,4}^{(1)}$ | $i_{2,4}^{(2)}$ | $i_{2,4}^{(3)}$ | $i_{2,4}^{(4)}$ |
| PCI | TRP SPECIFIC | $i_{2,5}^{(1)}$ | $i_{2,5}^{(2)}$ | $i_{2,5}^{(3)}$ | $i_{2,5}^{(4)}$ |

```
CSI-ReportConfig ::=                    SEQUENCE {↵
    reportConfigId                          CSI-ReportConfigId,↵
    carrier                                 ServCellIndex              OPTIONAL,  -- NEED S↵
    resourcesForChannelMeasurement          CSI-ResourceConfigId,↵
    csi-IM-ResourcesForInterference         CSI-ResourceConfigId       OPTIONAL,  -- NEED R↵
    nzp-CSI-RS-ResourcesForInterference     CSI-ResourceConfigId       OPTIONAL,  -- NEED R↵
    reportConfigType                        CHOICE {↵
        periodic                                SEQUENCE {↵
            reportSlotConfig                        CSI-ReportPeriodicityAndOffset,↵
            pucch-CSI-ResourceList                  SEQUENCE (SIZE (1..maxNrofBAPs) ) OF PUCCH-CSI-Resource↵
        },↵
        semiPersistentOnPUCCH                   SEQUENCE {↵
            reportSlotConfig                        CSI-ReportPeriodicityAndOffset,↵
            pucch-CSI-ResourceList                  SEQUENCE (SIZE (1..maxNrofBAPs) ) OF PUCCH-CSI-Resource↵
        },↵
        semiPersistentOnPUSCH                   SEQUENCE {↵
            reportSlotConfig                        ENUMERATED {s15, s110, s120, s140, s160, s1160, s1320},↵
            reportSlotOffsetList                SEQUENCE (SIZE (1..maxNrofUL-Allocations)) OF INTEGER (0..32),↵
            p0alpha                                 P0-PUSCH-AlphaSetId,↵
        },↵
        aperiodic                               SEQUENCE {↵
            reportSlotOffsetList                SEQUENCE (SIZE (1..maxNrofUL-Allocations)) OF INTEGER (0..32),
        },↵
    },↵
    reportQuantity                          CHOICE {↵
        none                                    NULL,↵
        cri-RI-PMI-CQI                          NULL,↵
        cri-RI-PMI-il                           NULL,↵
        cri-RI-PMI-il-CQI                       SEQUENCE {↵
            pdsch-BundleSizeForCSI                  ENUMERATED {n2, n4}
        },↵
        cri-RI-CQI                              NULL,↵
        cri-RSRP                                NULL,↵
        ssb-Index-RSRP                          NULL,↵
        cri-RI-LI-PMI-CQI                       NULL,↵
    },↵
    reportFreqConfiguration                 SEQUENCE {↵

        },    OPTIONAL,  -- NEED S↵
↵

    timeRestrictionForChannelMeasurements       ENUMERATED {configured, notConfigured},↵
    timeRestrictionForInterferenceMeasurements  ENUMERATED {configured, notConfigured},↵
    codebookConfig                              CodebookConfig  <-- CODEBOOK CONFIGURATION
    dummy                                       ENUMERATED {n1, n2}
    groupBasedBeamReporting                 CHOICE {↵
        enabled                                 NULL,↵
        disabled                                SEQUENCE↵
        nrofReportedR9                          ENUMERATED {n1, n2, n3, n4}
        }↵
    },↵
```

FIG. 28A

CODEBOOK CONFIGURATION

ANTENNA CONFIGURATION ($N_1$,$N_2$)

```
CodebookConfig-r16 ::=                          SEQUENCE {↵
    codebookType                                    CHOICE {↵
        type2                                           SEQUENCE {↵
            subType                                         CHOICE {↵
                typeII-r16                                      SEQUENCE {↵
                    n1-n2-codebookSubsetRestriction-r16             CHOICE {↵
                        two-one          BIT STRING   (SIZE (16)),↵
                        two-two          BIT STRING   (SIZE (43)),↵
                        four-one         BIT STRING   (SIZE (32)),↵
                        three-two        BIT STRING   (SIZE (59)),↵
                        six-one          BIT STRING   (SIZE (48)),↵
                        four-two         BIT STRING   (SIZE (75)),↵
                        eight-one        BIT STRING   (SIZE (64)),↵
                        four-three       BIT STRING   (SIZE (107)),↵
                        six-two          BIT STRING   (SIZE (107)),↵
                        twelve-one       BIT STRING   (SIZE (96)),↵
                        four-four        BIT STRING   (SIZE (139)),↵
                        eight-two        BIT STRING   (SIZE (139)),↵
                        sixteen-one      BIT STRING   (SIZE (128)),↵
                    },↵
                    typeII-RI-Restricion-r16            BIT STRING (SIZE (4))↵
                },↵
                typeII-PortSelection-r16        SEQUENCE {↵
                    portSelectionSamplingSize-r16       ENUMERATED {n1, n2, n3, n4},↵
                    typeII-PortSelectionRI-Restriction-r16  BIT STRING (SIZE (4))↵
                },↵
            },↵
            numberOfPMI-SubbandsPerCQI-Subband-r16      INTERGER (1..2),↵
            paramCombination-r16                        INTERGER (1..8),↵
        },↵
    },↵
},↵
```

FIG. 28B

MULTIPLE-TRANSMISSION-RECEPTION-POINT MEASUREMENT AND TRANSMISSION IN WIRELESS COMMUNICATION SYSTEM

INCORPORATION BY REFERENCE

This present application claims the benefit of Indian Application No. 202221012693, "Methods for Multiple-Transmission-Reception-Point Measurement and Transmission in Communication Systems" filed on Mar. 9, 2022, which is incorporated herein by reference in its entirety.

TECHNICAL FIELD

The present disclosure relates to wireless communications and specifically relates to multi-antenna transmission operations at the network and mobile devices in a wireless communication system.

BACKGROUND

A large number of steerable antenna elements can be employed for transmission and reception at the network side or the device side. At higher frequency bands, a large number of antenna elements can be used for beamforming to extend coverage. At lower frequency bands, a large number of antenna elements can be used to separate users spatially to increase the transmission capacity of the spectrum. Channel state information (CSI) for the operation of the massive multi-antenna schemes can be obtained by the feedback of the CSI report based on the transmission of reference signals in the downlink or uplink between the network and the mobile device.

SUMMARY

Aspects of the disclosure provide a first method of channel state information (CSI) report. The first method can include receiving a CSI report configuration at a user equipment (UE) from a base station, the CSI report configuration being associated with a set of CSI reference signal (CSI-RS) resources corresponding to multiple transmission reception points (TRPs), performing a channel measurement based on the CSI-RSs resources corresponding to the multiple TRPs, determining a precoder matrix indicator (PMI) based on measurement results of the channel measurement, the PMI corresponding to a precoder matrix, denoted W, of a Type II CSI codebook, the precoder matrix having a spatial domain (SD) basis vector matrix, denoted $W_1$, SD basis selection of the SD basis vector matrix being TRP-specific, and transmitting a CSI report to the base station, the CSI report including the PMI.

In an embodiment, the SD basis vector matrix has a form of $$W_1 = \begin{bmatrix} W_1^{(1)} & & & \\ & W_1^{(2)} & & \\ & & \ddots & \\ & & & W_1^{(N_P)} \end{bmatrix} \in \mathbb{C}^{N_T \times 2L}$$

where $N_T$ is a number of antenna ports of the multiple TRPs, L is a number of basis vectors corresponding to one antenna polarization in $W_1$, $N_P$ is a number of the multiple TRPs, $$W_1^{(p)}$$

is an SD basis vector matrix of the p-th TRP, p=1, . . . $N_P$.

$$W_1^{(p)}$$

is an $N_{T_p} \times 2L_p$ SD basis matrix and has a form of $$W_1^{(p)} = \begin{bmatrix} v_1 & \cdots & v_{L_p} & & 0 & \\ & 0 & & v_1 & \cdots & v_{L_p} \end{bmatrix},$$

where $N_{T_p}$ is a number of antenna ports of the p-th TRP, p=1, . . . $N_P$, and $L_p$ is a number of SD basis vectors in each polarization of the p-th TRP, such that $$N_T = \sum_{p=1}^{N_P} N_{T_p} \text{ and } 2L = \sum_{p=1}^{N_P} 2L_p.$$

In an embodiment, the SD basis vector matrix includes TRP-specific SD basis matrices each corresponding to one of the multiple TRPs. In an embodiment, the SD basis vector matrix includes TRP-specific SD basis matrices each corresponding to one of the multiple TRPs, the TRP-specific SD basis matrices having different numbers of SD basis vectors. For example, one of the TRP-specific SD basis matrices includes first basis vectors for a first polarization of the respective TRP and second basis vectors for a second polarization of the respective TRP, the first basis vectors being the same as the second basis vectors.

In an embodiment, the SD basis selection of the SD basis vector matrix is layer-common. In an embodiment, the SD basis vector matrix includes SD basis vectors corresponding to different TRPs of the multiple TRPs, and co-located TRPs of the multiple TRPs have same SD basis vectors. In an embodiment, the PMI includes indication of SD basis vectors included in the SD basis vector matrix, the SD basis vectors corresponding to respective TRPs of the multiple TRPs, wherein two co-located TRPs of the multiple TRPs share a same set of SD basis vectors among the SD basis vectors in the PMI. In an example, the method further comprises, in response to receiving an indication of which TRPs are co-located among the multiple TRPs from the base station, determining to report the same set of SD basis vectors for the two co-located TRPs based on the indication. In an example, the method further comprises determining to report the same set of SD basis vectors for the two co-located TRPs based on calculated SD basis vectors corresponding to different TRPs.

Aspects of the disclosure provide a first apparatus comprising circuitry. The circuitry is configured to receive a CSI report configuration from a base station, the CSI report configuration being associated with a set of CSI-RS resources corresponding to TRPs, perform a channel measurement based on the CSI-RSs resources corresponding to the multiple TRPs, determine a PMI based on measurement results of the channel measurement, the PMI corresponding to a precoder matrix of a Type II CSI codebook, the precoder matrix having an SD basis vector matrix, SD basis selection of the SD basis vector matrix being TRP-specific, and transmit a CSI report to the base station, the CSI report including the PMI.

Aspects of the disclosure provide a first non-transitory computer-readable medium storing instructions that, when executed by a processor, cause the processor to perform the first method.

Aspects of the disclosure provide a second method of CSI report. The second method can include receiving a CSI report configuration at a UE from a base station, the CSI report configuration being associated with a set of CSI-RS resources corresponding to multiple TRPs, performing a channel measurement based on the CSI-RS resources corresponding to the multiple TRPs, determining a first precoder matrix indicator (PMI) based on measurement results of the channel measurement, the first PMI corresponding to a first precoder matrix, denoted W, of a Type II CSI codebook, the first precoder matrix having a first spatial domain (SD)/frequency domain (FD) coefficient matrix, denoted $W_2$, rows of coefficients in the first SD/FD coefficient matrix corresponding to SD basis vectors in an SD basis vector matrix, denoted $W_1$, columns of coefficients in the first SD/FD coefficient matrix corresponding to FD basis vectors in an FD basis vector matrix, the first PMI including first FD basis indicators that indicate FD basis selection of any TRP in the first SD/FD coefficient matrix being independent of FD basis selection of any other TRP, and transmitting a CSI report to the base station, the CSI report including the first PMI.

In an embodiment, the first FD basis indicators include an initial window position indicator and an FD basis index for each of the multiple TRPs. In an embodiment, the method can further include determining a second PMI, the second PMI being based on a second precoder matrix of the Type II CSI codebook, the second precoder matrix having a second SD/FD coefficient matrix, the second PMI including second FD basis indicators that indicate FD basis selection in the second SD/FD coefficient matrix being TRP-common for the multiple TRPs. In an example, the second FD basis indicators include only one initial window position indicator and only one FD basis index for the multiple TRPs.

In an embodiment, NZCs are selected from the first SD/FD coefficient matrix across the multiple TRPs. In an embodiment, a strongest coefficient is selected from the first SD/FD coefficient matrix across the multiple TRPs. In an embodiment, a reference amplitude coefficient is selected from the first SD/FD coefficient matrix across the multiple TRPs.

In an embodiment, TRP-specific reference amplitude coefficients are selected from the first SD/FD coefficient matrix. In an example, the TRP-specific reference amplitude coefficients are polarization-common. In an example, the TRP-specific reference amplitude coefficients are polarization-specific. In an embodiment, the PMI includes a TRP-common NZC bitmap indicating NZC positions in the first SD/FD coefficient matrix. In an embodiment, the PMI includes TRP-specific NZC bitmaps indicating NZC positions in the first SD/FD coefficient matrix.

Aspects of the disclosure provide a second apparatus comprising circuitry. The circuitry is configured to receive a CSI report configuration from a base station, the CSI report configuration being associated with a set of CSI-RS resources corresponding to multiple TRPs, perform a channel measurement based on the CSI-RS resources corresponding to the multiple TRPs, determine a first precoder matrix indicator (PMI) based on measurement results of the channel measurement, the first PMI corresponding to a first precoder matrix, denoted W, of a Type II CSI codebook, the first precoder matrix having a first spatial domain (SD)/frequency domain (FD) coefficient matrix, denoted $W_2$, rows of coefficients in the first SD/FD coefficient matrix corresponding to SD basis vectors in an SD basis vector matrix, denoted $W_1$, columns of coefficients in the first SD/FD coefficient matrix corresponding to FD basis vectors in an FD basis vector matrix, the first PMI including first FD basis indicators that indicate FD basis selection of any TRP in the first SD/FD coefficient matrix being independent of FD basis selection of any other TRP, and transmit a CSI report to the base station, the CSI report including the first PMI.

Aspects of the disclosure provide a second non-transitory computer-readable medium storing instructions that, when executed by a processor, cause the processor to perform the first method.

Aspects of the disclosure provide a third method of channel state information (CSI) report. The third method can include receiving a CSI report configuration at a UE from a base station, the CSI report configuration being associated with a set of CSI-RS resources corresponding to multiple TRPs, the CSI-RS resources being organized into one or more resource groups, the CSI report configuration including one or more antenna configurations (N1, N2) each corresponding to one or more of the multiple TRPs, the one or more antenna configurations (N1, N2) corresponding to the one or more resource groups, respectively, N1 and N2 being numbers of antenna ports of the respective one or more TRPs in vertical and horizontal directions, respectively, performing a channel measurement based on the CSI-RS resources corresponding to the multiple TRPs, determining a PMI based on measurement results of the channel measurement and the one or more antenna configurations (N1, N2) each corresponding to one or more of the multiple TRPs, and transmitting a CSI report to the base station, the CSI report including the PMI.

In an embodiment, the PMI corresponding to a precoder matrix of a Type II CSI codebook. In an embodiment, a first antenna configuration (N1, N2) of the one or more antenna configurations (N1, N2) corresponds to at least two co-located TRPs of the multiple TRPs, N1 and N2 being numbers of antenna ports of the respective co-located TRPs in vertical and horizontal directions, respectively. In an embodiment, the CSI report configuration further includes a power indicator indicating how to scale a transmission power of a TRP of the multiple TRPs. For example, the UE perform channel-quality indicator (CQI) estimation based on the power indicator.

In an embodiment, the CSI report configuration further includes a power indicator indicating which TRPs of the multiple TRPs share a same total power. In an embodiment, the CSI report configuration further includes a power indicator indicating at least one of the multiple TRPs transmits with full power. In an embodiment, the CSI report configuration further includes a power indicator indicating each of the multiple TRPs transmits with full power.

Aspects of the disclosure provide a third apparatus comprising circuitry. The circuitry is configured to receive a CSI report configuration at a UE from a base station, the CSI report configuration being associated with a set of CSI-RS resources corresponding to multiple TRPs, the CSI-RS resources being organized into one or more resource groups, the CSI report configuration including one or more antenna configurations (N1, N2) each corresponding to one or more of the multiple TRPs, the one or more antenna configurations (N1, N2) corresponding to the one or more resource groups, respectively, N1 and N2 being numbers of antenna ports of the respective one or more TRPs in vertical and horizontal directions, respectively, perform a channel measurement based on the CSI-RS resources corresponding to the multiple TRPs, determine a PMI based on measurement results of the channel measurement and the one or more antenna configurations (N1, N2) each corresponding to one or more of the multiple TRPs, and transmit a CSI report to the base station, the CSI report including the PMI.

Aspects of the disclosure provide a third non-transitory computer-readable medium storing instructions that, when executed by a processor, cause the processor to perform the method.

BRIEF DESCRIPTION OF THE DRAWINGS

Various embodiments of this disclosure that are proposed as examples will be described in detail with reference to the following figures, wherein like numerals reference like elements, and wherein:

FIG. 16 shows a first example of $W_1$ feedback reduction. As shown, 4 TRPs from TRP1 to TRP4 are deployed.

FIG. 17 shows a second example of $W_1$ feedback reduction.

FIG. 21 shows an example of non-zero-coefficients (NZCs) selection according to embodiments of the disclosure.

FIG. 28A shows an example of a CSI report configuration.

FIG. 28B shows an example of a codebook configuration.

DETAILED DESCRIPTION OF EMBODIMENTS

I. Multi-Antenna Operations

1. Reference Signals and Channel State Information (CSI)

In some embodiments, knowledge of a radio link can be obtained by measurement of reference signals transmitted over the radio link during a channel-sounding process. The reference signals in a downlink direction can be referred to as channel-state-information reference signals (CSI-RS). The reference signals in an uplink direction can be referred to as sounding reference signals (SRS).

A CSI-RS can be configured on a per-device basis. A configured CSI-RS may correspond to one or multiple different antenna ports (referred to as CSI-RS ports). Each CSI-RS port can correspond to a channel to be sounded. For example, a multi-port CSI-RS can include 32 per-antenna-port CSI-RS that are orthogonally transmitted on 32 CSI-RS ports. Each per-antenna-port CSI-RS corresponds to a CSI-RS port.

A CSI-RS can be configured for a particular bandwidth (such as a bandwidth part). Within the configured bandwidth, a CSI-RS can be configured for every N resource block. N can be 1, 2, 3, or the like. Within a resource block, a CSI-RS may occupy a set of one or more element resources within a time slot. For a multi-port CSI-RS, the set of element resources are shared by the multiple per-antenna-port CSI-RS, for example, based on a combination of code-domain sharing (CDM), frequency-domain sharing (FDM), or time-domain sharing (TDM).

A device can be configured with one or several CSI-RS resource sets. For example, the device can receive a CSI resource configuration specifying one or more CSI-RS resource sets. Each resource set can include one or more configured CSI-RS. Each resource set may also include pointers to a set of New Radio (NR) synchronization signal (SS) blocks. A CSI-RS resource set can be configured for periodic, semi-persistent, or aperiodic transmission. For example, the semi-persistent CSI-RS transmission can be activated or deactivated based on a MAC control element (CE). The aperiodic CSI-RS transmission can be triggered by means of downlink control information (DCI).

Similarly, an SRS can support one or more antenna ports (referred to as SRS ports). Different SRS ports of the SRS can share a same set of resource elements and a same basis SRS sequence. Different rotations can be applied to separate the different SRS ports. Applying a phase rotation (or phase shift) in the frequency domain is equivalent to applying a cyclic shift in the time domain. Similar to CSI-RS, a device can be configured with one or several SRS resource sets. Each resource set can include one or several configured SRS. An SRS resource set can be configured for periodic transmission, semi-persistent transmission (controlled by a MAC CE), or aperiodic transmission (triggered by a DCI).

Figure 1:
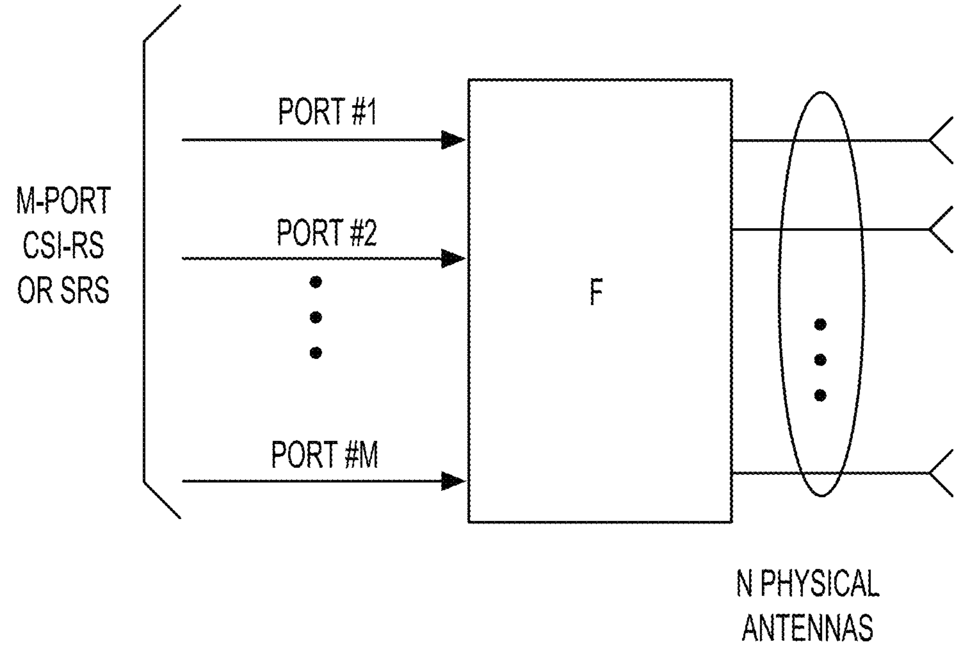
FIGS. 1-3 show examples of mapping channel state information reference signal (CSI-RS) ports or sounding reference signal (SRS) ports to physical antennas.
Figure 2:
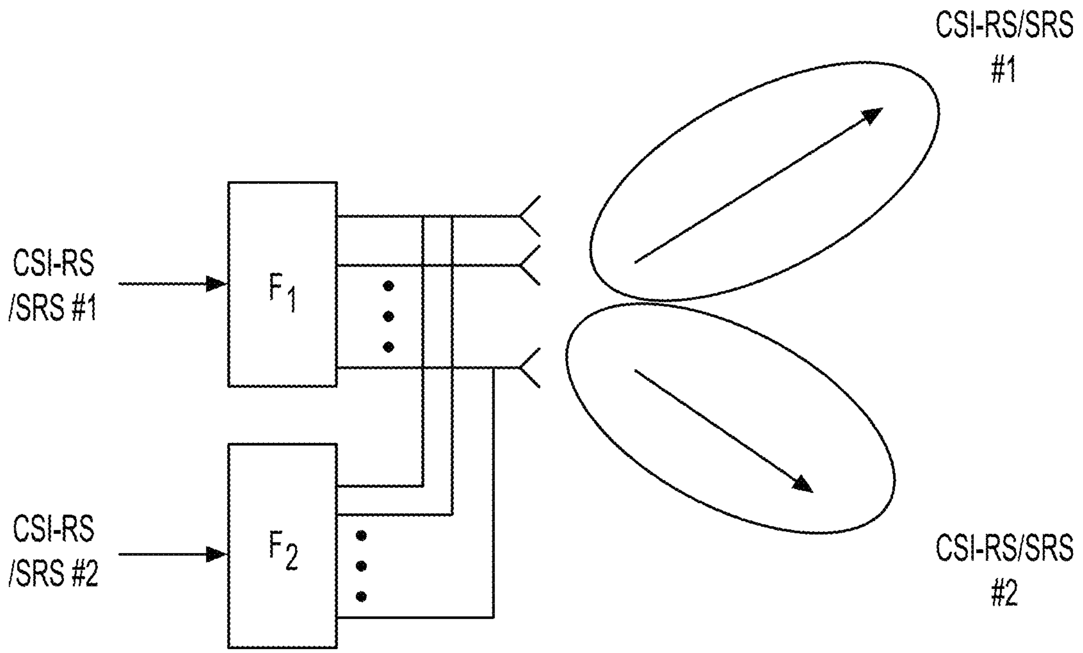
Figure 3:
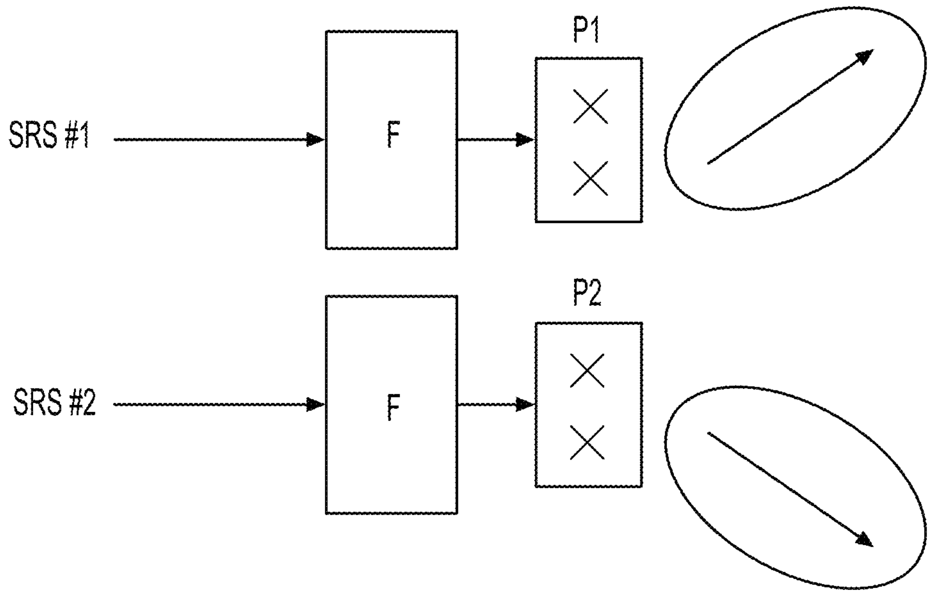

FIGS. 1-3 show examples of mapping CSI-RS ports or SRS ports to physical antennas. In the FIG. 1 example, an M-port CSI-RS or SRS (CSI-RS/SRS) corresponds to M antenna ports (CSI-RS ports or SRS ports). The M antenna ports are connected to N physical antennas through a spatial filter (labeled F). The M-port CSI-RS/SRS is processed by a spatial filter before being mapped to the N physical antennas. Due to the spatial filtering, one or more transmission beams can be formed for transmission of the M-port CSI-RS/SRS. Typically, N can be larger than M.

In the FIG. 2 example, two CSI-RS/SRS #1 and #2 are applied with two separate spatial filters F1 and F2 but transmitted over a same set of physical antennas at a same time or at different times. Due to the spatial filtering, the two CSI-RS/SRS #1 and #2 are beamformed in different directions.

In the FIG. 3 example, multiple antenna panels are employed for transmission. Two CSI-RS/SRS #1 and #2 are processed with two separate spatial filters F1 and F2 and transmitted over two antenna panels P1 and P2, respectively, at a same time or at different times. Due to the spatial filtering and the respective antenna panels, the two CSI-RS/SRS #1 and #2 are beamformed in different directions.

As shown in the examples of FIGS. 1-3, a channel being sounded based on a CSI-RS/SRS is not a physical radio channel but a channel corresponding to a CSI-RS port or an SRS port.

In some embodiments, a network (e.g., a base station) can configure a CSI report configuration to a device. The device can perform a channel measurement and report measurement results to the network based on the CSI report configuration. For example, the CSI report configuration can specify a set of quantities to be reported. The quantities can include channel-quality indicator (CQI), rank indicator (RI), precoder-matrix indicator (PMI), or the like. Those quantities can be jointly referred to as channel-state information (CSI). The quantities can also include reference-signal received power (RSRP) reflecting a received signal strength.

The CSI report configuration can further specify downlink resource(s) on which measurements can be performed to derive the specified quantities. For example, the CSI report configuration may describe or indicate one or more CSI-RS resource sets each including one or more CSI-RS. For example, a single multi-port CSI-RS can be configured for reporting a combination of CQI, RI, and PMI for link adaptation and multi-antenna precoding. Multiple CSI-RS can be configured for beam management, and each CSI-RS can be beamformed and transmitted in different direction. In some scenarios, a device may perform measurements based on the configured resources without reporting. For example, a device may perform a measurement for receiver-side beamforming and multi-antenna precoding without reporting.

The report configuration can further describe when and how the reporting be carried out. For example, the reporting can be periodic, semi-persistent, or aperiodic. The reporting can be activated (deactivated) based on MAC CE or triggered by means of DCI. The measurement results for periodic and semi-persistent reporting can be carried in a physical uplink control channel (PUCCH). The measurement results for aperiodic reporting can be carried in a physical uplink shared channel (PUSCH).

2. Multi-Antenna Transmission

A. Digital and Analog Multi-Antenna Processing

Figure 4:
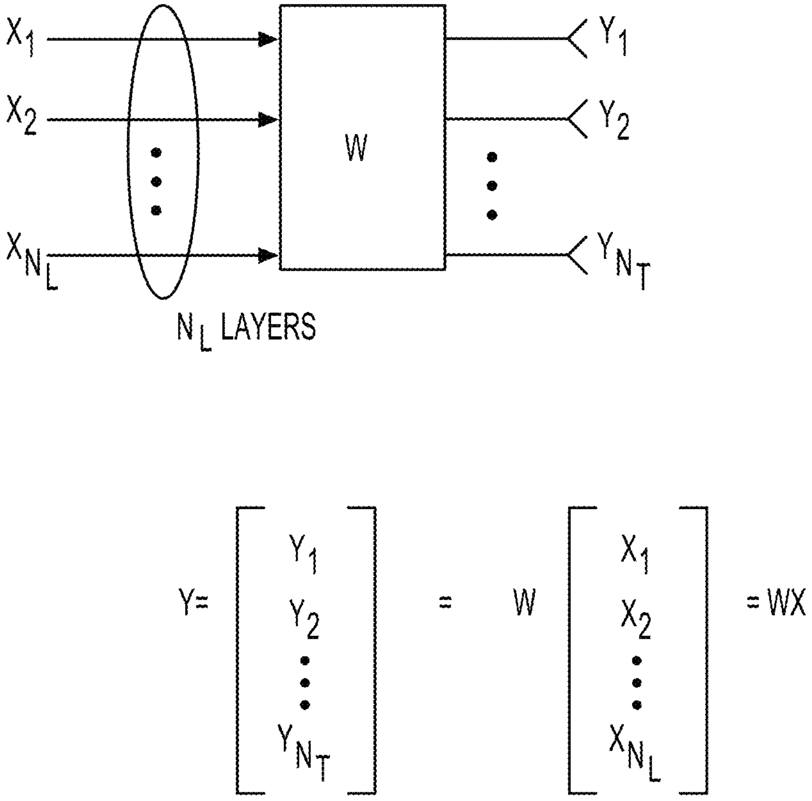
FIG. 4 shows a linear multi-antenna transmission scheme in a transmitter according to embodiments of the disclosure.

FIG. 4 shows a linear multi-antenna transmission scheme in a transmitter according to embodiments of the disclosure. As shown, $N_L$ layers of data (such as modulation symbols) are mapped to $N_T$ transmit antennas by means of multiplication with a transmission matrix W of size $N_T \times N_L$. The vector X represents the $N_L$ layers of data. The vector Y represents $N_T$ signals corresponding to the $N_T$ antennas.

In various examples, the multi-antenna processing, represented by the matrix W, can be applied in an analog part of a transmitter chain or a digital part of the transmitter chain. Or, a hybrid approach can be adopted where the multi-antenna processing can be applied in both the analog and digital parts of the transmitter chain. Accordingly, a multi-antenna processing can be an analog multi-antenna processing, a digital multi-antenna processing, or a hybrid multi-antenna processing in various embodiments.

Figure 5:
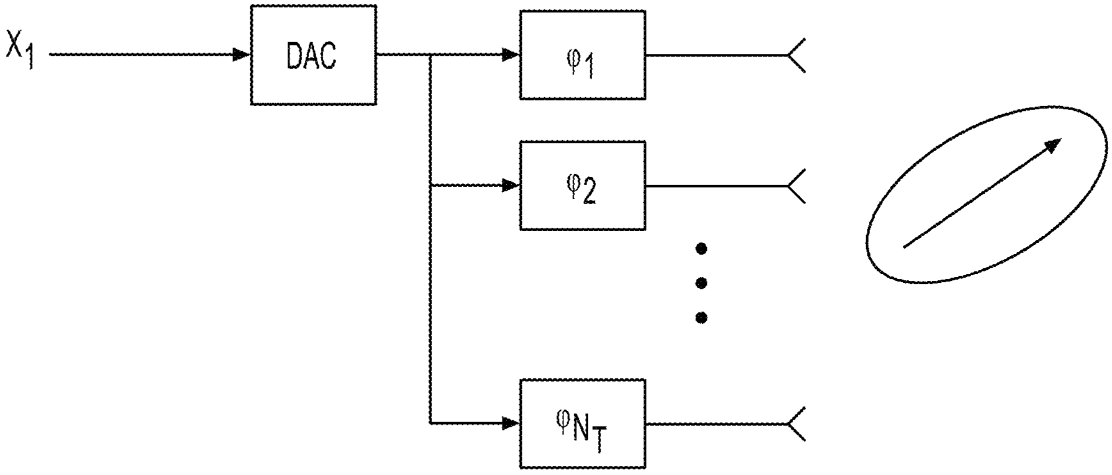
FIG. 5 shows an example of analog multi-antenna processing.

In the case of analog processing, a spatial filter, F, can be applied to provide per-antenna phase shifts to form a transmission beam. FIG. 5 shows an example of analog multi-antenna processing. In some examples, analog processing is carried out on a per-carrier basis for downlink transmission. Thus, no frequency multiplex beam-formed transmissions are performed towards devices located in different directions relative to a base station. To cover different devices located in different directions, a beam sweeping is performed by the analog processing.

In the case of digital processing, each element of the transmission matrix W can include both a phase shift and a scale factor, which provides a higher flexibility for controlling beamforming directions. For example, simultaneous multi-beam beamforming can be obtained to cover multiple devices located in different directions relative to a base station. A transmission matrix W used in digital multi-antenna processing is referred to as a precoder matrix. The corresponding multi-antenna processing is referred to as multi-antenna precoding.

Figure 6:
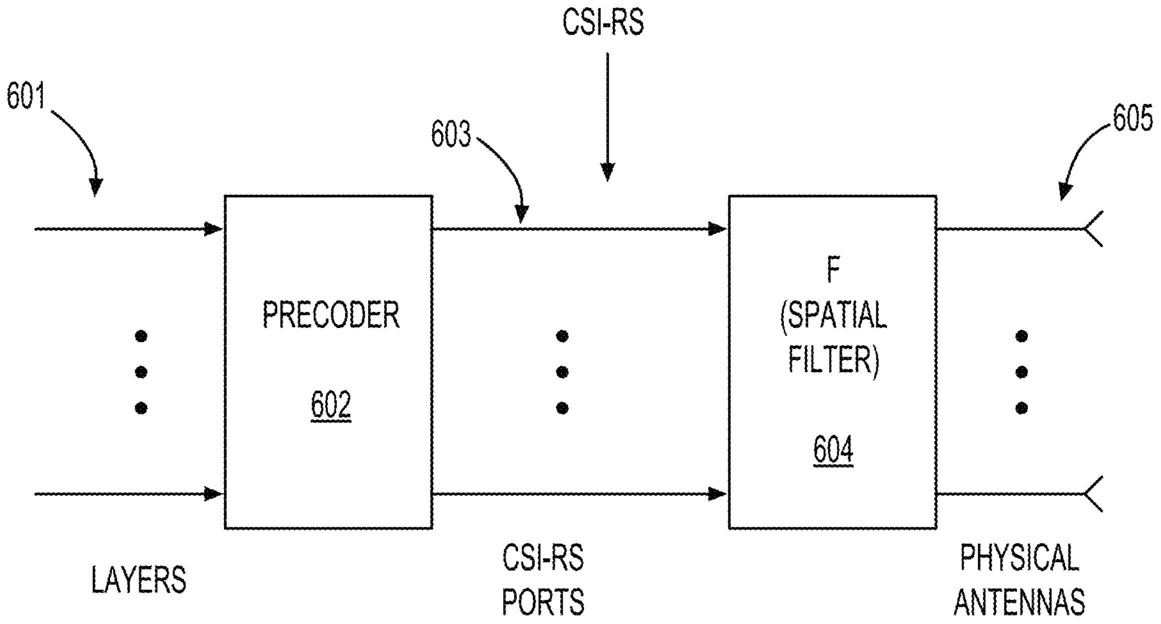
FIG. 6 shows an example of hybrid multi-antenna processing according to some embodiments of the disclosure.

A precoder and a spatial filter can be sequentially connected in hybrid multi-antenna processing to form directional transmission beams. FIG. 6 shows an example of hybrid multi-antenna processing according to some embodiments of the disclosure. As shown, layers of modulation symbols 601 are mapped to CSI-RS antenna ports 603 by means of a precoder 602. Outputs from the precoder 602 are mapped to physical antennas 605 by means of a spatial filter (F) 604. In some examples, the spatial filter 604 is used to form a broader beam, while the precoder 602 is used to form one or more narrower beams along the direction of the broader beam. By selecting a specific precoder 602 and a spatial filter 604, a transmitter can determine one or more beams to cover one or more receivers distributed at different locations.

Similar to transmitter-side processing, a receiver can apply analog, digital, or hybrid multi-antenna processing for beam-formed reception of signals arriving from different directions.

B. Downlink Multi-Antenna Precoding

In some embodiments, to support network selection of precoder for downlink transmission (such as physical downlink shared channel (PDSCH) transmission), a device can perform measurement based on CSI-RS and report measurement results (such as a CSI report) to the network based on configurations (such as a CSI report configuration) received from the network. The network can then determine a precoder(s) based on the measurement results.

In some examples, a CSI report can include a rank indicator (RI), a precoder-matrix indicator (PMI), a channel-quality indicator (COI), or the like. The RI can indicate a suitable transmission rank (a number of transmission layer $N_L$) for downlink transmission. The PMI can indicate a suitable precoder matrix M corresponding to the selected rank. The CQI can indicate a suitable channel-coding rate and modulation scheme given the selected precoder matrix.

In some embodiments, a value of the PMI can correspond to one specific precoder matrix selected from a precoder codebook. The precoder codebook provides a set of candidate precoder matrices. In addition to the number of transmission layer $N_L$, the device selects a PMI based on a certain number of antenna ports ($N_{RS}$) of configured CSI-RS associated with the CSI report configuration. In an example, at least one codebook is provided for each valid combination of $N_T$ and $N_L$.

In some embodiments, two types of CSI are defined corresponding to different scenarios: Type I CSI and Type II CSI. Different types of CSI are associated with different sets of precoder codebooks having different structures and sizes.

The code books for Type I CSI can be relatively simple and aim at focusing transmitted energy at a target receiver. The type I CSI can include two subtypes: Type I single-panel CSI and Type I multi-panel CSI. The two subtypes correspond to different antenna configurations on a network or transmitter side. The codebooks for Type II CSI can provide channel information with higher spatial granularity than Type I CSI. Type II CSI can target a multi-user Multiple-Input Multiple-Output (MIMO) (MU-MIMO) scenario.

II. Type II CSI Codebook Structures

In some embodiments, the Type II CSI feedback can be based on a linear combination (LC) codebook. For example, an eigenvector of a channel can be expressed (approximately) as a linear combination of L Discrete Fourier Transform (DFT) vectors. A UE can report CSI including DFT vectors and coefficients for combining the DFT vectors. If the channel has multiple dominant eigenvectors (higher rank channel), the UE can report multiple eigenvectors. DFT beams of the DFT vectors can be reported in a wideband (WB) manner (one common report for all subbands (SBs). The amplitude and phase of the coefficients can be reported separately using respective codebooks. For example, coefficient phases can be frequency selective and thus reported for each SB. Coefficient amplitudes can be reported in a WB manner.

$$W = W_1 W_2 = \begin{bmatrix} w_{0,0} \\ w_{1,0} \end{bmatrix} w_{r,l} W_1 W_2 W_1$$

In some embodiments, a weighting vector (or a precoder matrix) of rank 1 Type II CSI can have a form of $$W = W_1 W_2 = \begin{bmatrix} w_{0,0} \\ w_{1,0} \end{bmatrix} w_{r,l} W_1 W_2 W_1$$

$$W = W_1 W_2 = \begin{bmatrix} w_{0,0} \\ w_{1,0} \end{bmatrix} w_{r,l} W_1 W_2 W_1$$

where, for polarization r and rank l, is a weighted linear combination of L orthogonal beams per polarization. The weighting vector W can be determined as follows. The DFT beam matrix can have a size of $2N_1N_2 \times 2L$, where L orthogonal vectors/beams can be selected per polarization from a set of oversampled $O_1O_2N_1N_2$ DFT beams. $N_1$ and $N_2$ are the numbers of antenna ports of the same polarization direction in horizontal and vertical domains. $O_1$ and $O_2$ are the oversampling factors in respective dimensions. The linear combination of the L orthogonal vectors achieves compression in the spatial domain (SD). The L orthogonal vectors can be referred to as SD components or SD basis. The linear combination subband matrix can be determined in such a way that, for each subband, the weighted linear combination of the columns of yielding the l strongest eigenvectors of a channel covariance matrix. As can be seen, the number of combining coefficients can increase linearly when the numbers of layers and subbands increase, causing a large CSI report overhead.

$$W_2 W_2 W_2 W_f W_f \tilde{W}_2 \tilde{W}_2 = W_2 W_f W_f W_1 W = W_1 \tilde{W}_2 W_f^H \tilde{W}_2 \tilde{W}_2 \tilde{W}_2$$

In some embodiments, frequency domain (FD) correlation inside is exploited to further compress the Type II CSI precoder. A DFT compression can be applied over. For example, can have a size of $2L \times N_3$, where 2L is the number of the SD beams and $N_3$ is the number of subbands. A frequency compression matrix can be determined by the selection of a set of orthogonal vectors from the columns of an oversampled DFT codebook. The matrix can have a size of $N_3 \times M$ ($M<N_3$). M is the number of FD basis vectors that are selected after compression. FD compression can be applied to each layer to obtain a matrix of linear combination coefficients $$W_2 W_2 W_2 W_f W_f \tilde{W}_2 \tilde{W}_2 = W_2 W_f W_f W_1 W = W_1 \tilde{W}_2 W_f^H \tilde{W}_2 \tilde{W}_2 \tilde{W}_2.$$

$$W_2 W_2 W_2 W_f W_f \tilde{W}_2 \tilde{W}_2 = W_2 W_f W_f W_1 W = W_1 \tilde{W}_2 W_f^H \tilde{W}_2 \tilde{W}_2 \tilde{W}_2$$

The compression matrix can be regarded as an equivalent of the SD basis matrix for frequency compression. Accordingly, the Type II CSI precoder matrix can have a format as:

$$W_2 W_2 W_2 W_f W_f \tilde{W}_2 \tilde{W}_2 = W_2 W_f W_f W_1 W = W_1 \tilde{W}_2 W_f^H \tilde{W}_2 \tilde{W}_2 \tilde{W}_2.$$

$$W_2 W_2 W_2 W_f W_f \tilde{W}_2 \tilde{W}_2 = W_2 W_f W_f W_1 W = W_1 \tilde{W}_2 W_f^H \tilde{W}_2 \tilde{W}_2 \tilde{W}_2$$

The elements inside can be referred to as FD coefficients. After the frequency compression, the FD coefficient matrix can be sparse. Also, most of the energy is concentrated in a few coefficients. Therefore, a few of the most significant FD coefficients in can be determined for reporting. The rest can be assumed to be zero.

III. Deployment of Single TRP and Multiple TRPs

In the present disclosure, the terms "transmission reception point (TRP)", "antenna panel (or panel)", "antenna group (or port group)", "cell", and "sector" may be used interchangeably to refer to a group of co-located antennas. The techniques, methods, processes, procedures, examples, or embodiments disclosed using a TRP or a panel as an example can also be applied to an antenna group, a cell, or a sector. In deployment, a sector may correspond to one or more cells, a cell may correspond to one or more TRPs, and a TRP may correspond to one or more antenna panels. However, each of a sector, a cell, a TRP, or a panel can be treated as a group of antennas for applying the technologies disclosed herein.

1. Single-TRP Deployment

Figure 7:
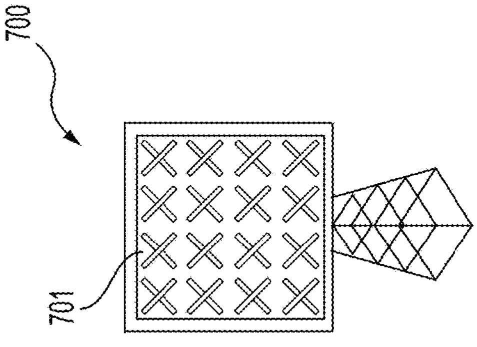
FIG. 7 shows a first example of single transmission-reception-point (TRP) (sTRP) transmission.

FIG. 7 shows a first example of single-TRP (sTRP) transmission. A TRP 700 is configured with a single antenna panel 701. The antenna panel 701 includes a 32-port square (or rectangular) antenna array. The antenna array has a horizontal dimension of $N_1=4$ and a vertical dimension of $N_2=4$. $N_1$ and $N_2$ are the numbers of cross-polarized antenna elements. Each cross-polarized antenna elements include two cross-polarized antennas. Each cross-polarized antenna element can correspond to a pair of well-isolated spatial paths for diversity or spatial multiplexing. The co-located antennas of the antenna panel 701 allow the usage of same DFT basis vectors across polarizations in a precoder matrix. Those DFT basis vectors can be linearly combined for a near-optimal precoder. Examples of suitable codebooks for the single TRP transmission in the FIG. 7 example can include the Third Generation Partnership Project (3GPP) Release 15 Type I codebook for single panel, Release 15 Type II codebook, and Release 16 eType II codebook.

Figure 8:
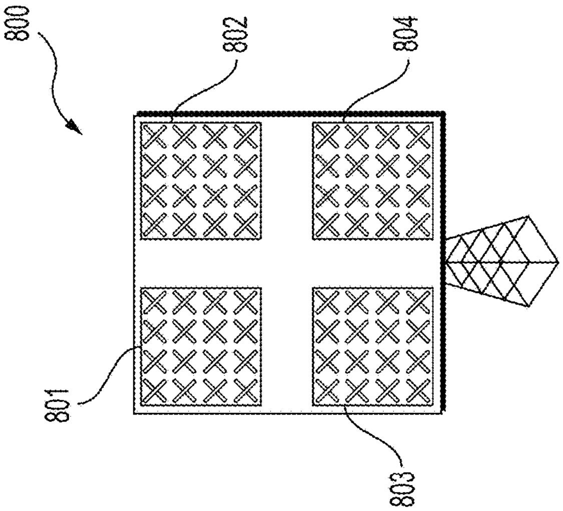
FIG. 8 shows a second example of sTRP transmission.

FIG. 8 shows a second example of sTRP transmission. A TRP 800 is configured with 4 antenna panels 801-804. Each antenna panel 801 includes a 32-port square (or rectangular) antenna array. The antenna array has a dimension of ($N_1$, $N_2$)=(4, 4). Spacing between the last antenna element of a first panel and the first antenna element of the next panel is different from the antenna element spacing within each antenna panel 801-804. Accordingly, a suitable precoder can include a $W_1$ matrix and a $W_2$ matrix. The $W_1$ matrix defines one beam per polarization and panel. The $W_2$ matrix provides per-subband co-phasing between polarizations and co-phasing between panels. Examples of suitable codebooks for the multi-panel single TRP transmission in the FIG. 8 example can include 3GPP Release 15 Type I codebook for multiple panels 2. Multiple-TRP Deployment Multiple largely-spaced (distributed) transmission and reception points (TRPs) can operate in a coherent joint transmission (CJT) mode or a non-coherent joint transmission (NCJT). In NCJT, different layers can be transmitted from multiple TRPs without coordination among the multiple TRPs. Interlayer interference may reduce throughput and coverage. In CJT, multiple TRPs can be controlled to operate coordinately. Thus, signals from different TRPs can be constructively interfered with each other to improve throughput and coverage, and interlayer interference can be reduced. To support CJT from multiple TRPs, co-phasing and amplitude (or power) differences among the TRPs can be measured and reported from a mobile device to a network. Based on such reported information, the network can control the TRPs to perform coherent joint transmission. Accordingly, mTRP CJT CSI measurement and report schemes are employed in various embodiments disclosed herein. The schemes can include new mechanisms of CSI-RS configuration, CSI report configuration, and CJT codebook structure.

Figure 9:
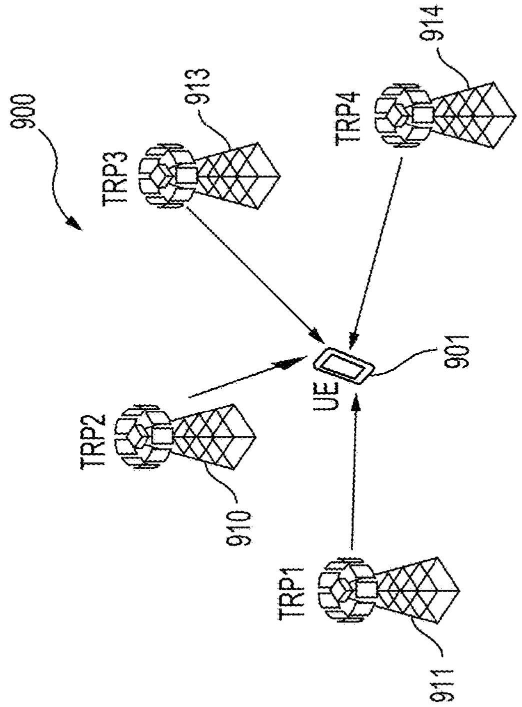
FIG. 9 shows an example 900 of multiple-TRP (mTRP) transmission according to an embodiment of the disclosure.

FIG. 9 shows an example 900 of mTRP transmission according to an embodiment of the disclosure. A UE 901 receives CSI-RS signals from 4 TRPs 911-914. Each TRP can be configured with one or more antennal panels. Those TRPs 911-914 can be controlled by a same base station (e.g., a gNB) and can operate cooperatively for CJT. Due to the distributed geographic locations of the TRPs 911-914, synchronized signals transmitted from the TRPs 911-914 to the UE 901 can take different paths. To enable the TRPs 911-914 to operate in the CJT mode, a CSI measurement and report process can be performed between the TRPs 911-914 and the UE 901. Based on the reported CSI, the CJT of the TRPs 911-914 can be realized.

$$x \in \mathbb{C}^{v\times 1} v N_R N_T^{(1)} N_T^{(2)} N_T =$$

$$N_T^{(1)} + N_T^{(2)} H_1 \in \mathbb{C}^{N_R\times N_T^{(1)}} W^{(1)} \in \mathbb{C}^{N_T^{(1)}\times v} H_2 \in \mathbb{C}^{N_R\times N_T^{(2)}} W^{(2)} \in \mathbb{C}^{N_T^{(2)}\times v} y =$$

$$H_1 W^{(1)} x + H_2 W^{(2)} x + n = [\,H_1 \quad H_2\,] \begin{bmatrix} W^{(1)} \\ W^{(2)} \end{bmatrix} x + n =$$

$$HWx + nH \in \mathbb{C}^{N_R\times N_T} W \in \mathbb{C}^{N_T\times v}$$

Figure 10:
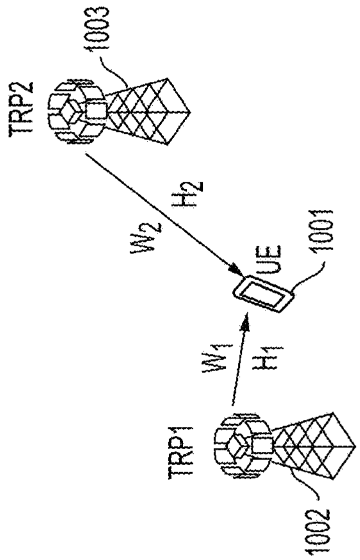
FIG. 10 shows an example of coherent joint transmission (CJT) of two TRPs 1002-1003.

FIG. 10 shows an example of CJT of two TRPs 1002-1003. A system model is introduced below with reference to FIG. 10. The two TRPs 1002-1003 are configured to jointly transmit a signal (layers) to a UE 1001 with reception (rx) ports. TRP1 1002 has transmission (tx) ports and TRP2 1003 has tx ports. A total effective number of tx ports are. A downlink (DL) channel from TRP1 1002 to the UE 1001 is. A precoder from TRP1 1002 to the UE 1001 is. A DL channel from TRP2 1003 to the UE 1001 is. A precoder from TRP2 1003 to the UE 1001 is. Accordingly, a received signal at the UE 1001 can be $$x \in \mathbb{C}^{v\times 1} v N_R N_T^{(1)} N_T^{(2)} N_T =$$

$$N_T^{(1)} + N_T^{(2)} H_1 \in \mathbb{C}^{N_R\times N_T^{(1)}} W^{(1)} \in \mathbb{C}^{N_T^{(1)}\times v} H_2 \in \mathbb{C}^{N_R\times N_T^{(2)}} W^{(2)} \in \mathbb{C}^{N_T^{(2)}\times v} y =$$

$$H_1 W^{(1)} x + H_2 W^{(2)} x + n = [\,H_1 \quad H_2\,] \begin{bmatrix} W^{(1)} \\ W^{(2)} \end{bmatrix} x + n =$$

$$HWx + nH \in \mathbb{C}^{N_R\times N_T} W \in \mathbb{C}^{N_T\times v}$$

where and are the effective channel matrix and effective precoder matrix.

$$x \in \mathbb{C}^{v\times 1} v N_R N_T^{(1)} N_T^{(2)} N_T =$$

$$N_T^{(1)} + N_T^{(2)} H_1 \in \mathbb{C}^{N_R \times N_T^{(1)}} W^{(1)} \in \mathbb{C}^{N_T^{(1)} \times v} H_2 \in \mathbb{C}^{N_R \times N_T^{(2)}} W^{(2)} \in \mathbb{C}^{N_T^{(2)} \times v} y =$$

$$H_1 W^{(1)} x + H_2 W^{(2)} x + n = [\,H_1 \quad H_2\,] \begin{bmatrix} W^{(1)} \\ W^{(2)} \end{bmatrix} x + n =$$

$$HWx + nH \in \mathbb{C}^{N_R \times N_T} W \in \mathbb{C}^{N_T \times v}$$

3. CSI Report Process for mTRP CJT

Figure 11:
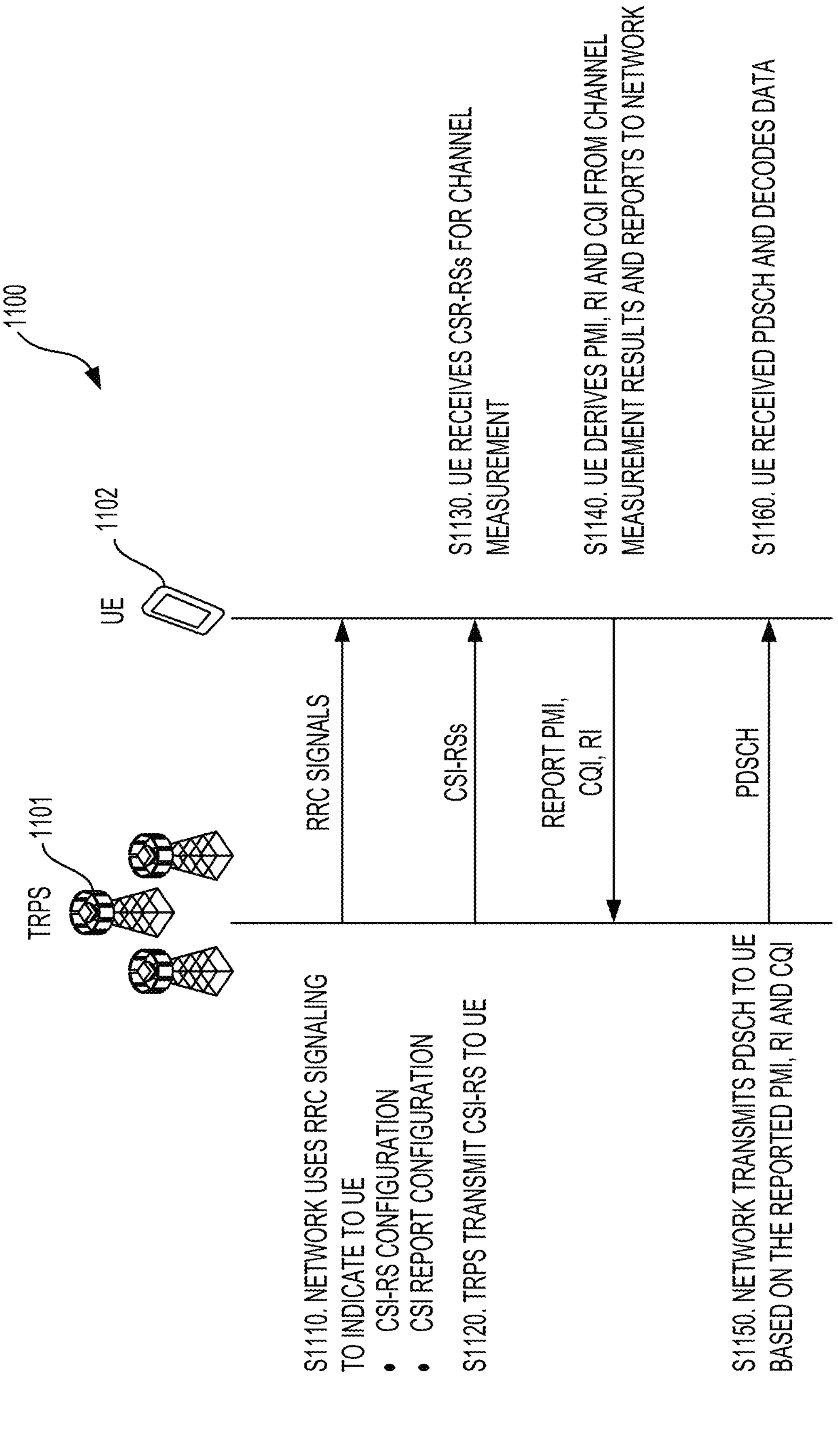
FIG. 11 shows a CSI measurement and report process 1100 according to embodiments of the disclosure.

FIG. 11 shows a CSI measurement and report process 1100 according to embodiments of the disclosure. In the process 1100, CSI is reported from a UE 1102 to a base station connected with a group of geographically distributed TRPs 1101. The process 1100 can include 6 steps from S1110 to S1160.

At S1110, a network (or referred to as a base station) can use radio resource control (RRC) signaling to indicate to the UE 1102 a CSI-RS resource configuration and a CSI report configuration. For example, by the resource configuration, the base station can configure to the UE 1102 multiple CSI-RS resources in a CSI-RS resource set. The multiple CSI-RS resources can correspond to one or more channel measurement resources (CMRs) specified in the CSI report configuration. For example, the CSI report configuration can be associated with one or more resource configurations. The CSI report configuration can indicate a codebook type, such as a Type I codebook type or a Type II codebook type.

At S1120, the base station can then trigger the UE 1102 to perform a CSI measurement and report process, for example, by transmitting an RRC message, a MAC CE command, or a DCI. The TRPs 1101 can then transmit CSI-RSs to the UE 1102. At S1130, the UE 1102 can receive the CSI-RSs and perform channel measurement according to the CSI-RS configuration and the CSI report configuration. At S1140, based on the measurement results, the UE 1102 can derive the CSI, for example, including PMI, RI, CQI, and the like. The UE 1102 can report the CSI to the base station.

At S1150, the base station can perform PDSCH transmission from the TRPs 1101 based on the reported PMI, RI, and CQI. At S1160, the UE 1102 can receive the PDSCH and decode the data carried in the PDSCH. The process 1100 can terminate at S1150.

IV. CSI-RS Resource Configuration

In some embodiments, a network can configure a UE with a CSI-RS resource set. The CSI-RS resource set can include multiple CSI-RS resources. The CSI-RS resource set can be used for CSI measurement and report for mTRP CJT. The CSI-RS resource set can include multiple resource groups. Each resource group can include at least one CSI-RS resource. CSI-RS resources within the same resource group can mean that the CSI-RS resources can be transmitted from the same TRP, panel, or multiple TRPS at a same location. The UE can assume that the CSI-RS resources belonging to a same resource group can be transmitted under the same Quasi Co Location (QCL) assumption. In some embodiments, the network can configure and trigger the UE with a CSI report configuration. The CSI report configuration can associate the CSI-RS resource set with at least one channel measurement selection information. The channel measurement selection information can indicate which CSI-RS resources in the CSI-RS resource set should be measured together. The UE can base on the at least one channel measurement selection information to measure multiple resources or multiple resource groups to estimate CSI information for the CSI report.

In some embodiments, for mixing mTRP CJT CSI and sTRP CSI in a CSI report, the UE can be configured with multiple pieces of channel measurement selection information to indicate which CSI-resources should be estimated. Each channel measurement selection information can be associated with, or represented by, at least one CSI-RS Resource Indicator (CRI). In some examples, one CRI can indicate at least one CSI-RS resource belonging to a resource group. In some examples, one CRI can indicate at least two CSI-RS resources belonging to at least two resource groups for mTRP CJT transmission. In some examples, one channel measurement selection information can indicate at least one CRI. The CRIs for indexing of sTRP CSI and mTRP CSI can be separated.

Figure 12A:
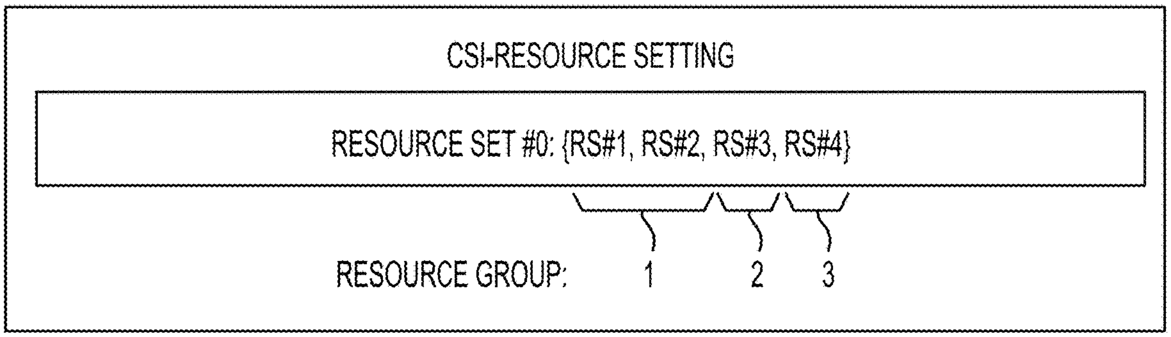
FIG. 12A and FIG. 12B show an example of a resource group configuration.
Figure 12B:
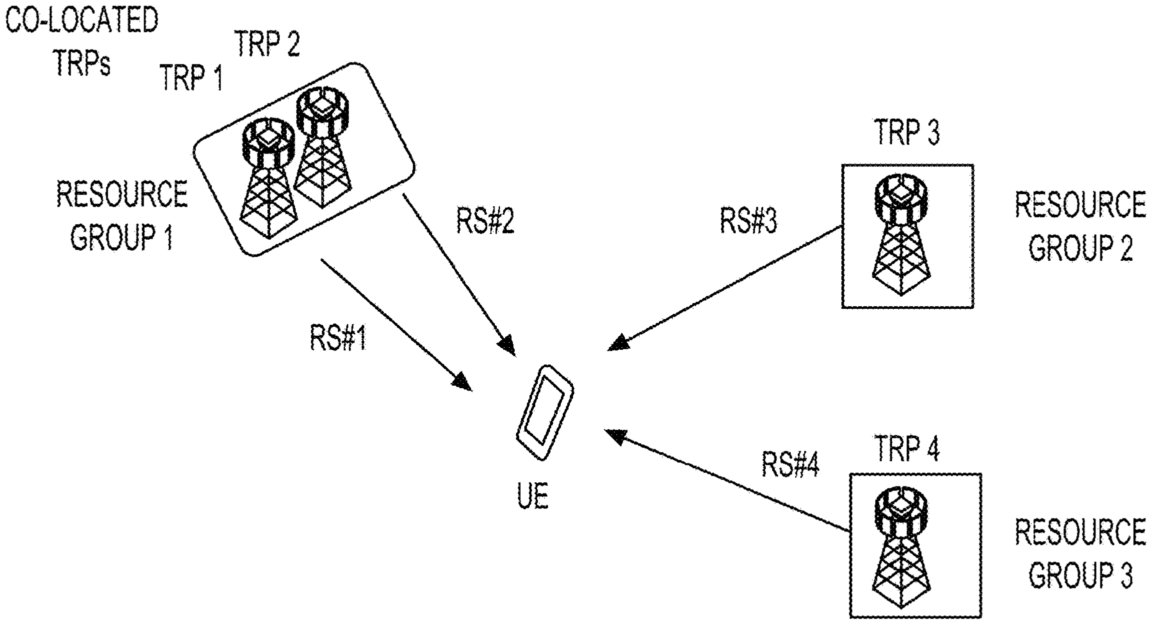

FIG. 12A and FIG. 12B show an example of a resource group configuration. In the CSI-resource setting of FIG. 12A, a resource set #0 includes 4 RS resources RS #1-RS #4. The 4 RS resources are partitioned into 3 resource groups 1-3. The first resource group includes RS #1 and RS #2. The second and third resource groups include RS #3 and RS #4, respectively.

FIG. 12B shows 4 TRPs (TRP 1-TRP 4). TRP 1 and TRP 2 are co-located with each other. Accordingly, signals from the TRP 1 and TRP 2 can be treated as quasi-co-located (QCLed) for the purpose of CSI reporting. TRP 3 and TRP 4 are at different distances from the location of TRP 1 and TRP2. As shown, the 4 RS resources configured in FIG. 12A are assigned to the 4 TRPs 1-4 in FIG. 12B, respectively. Particularly, RS #1 and RS #2 in the same resource group 1 are assigned to the co-located TRPs 1-2. When reporting CSI (including the co-phasing/amplitude/power differences) based on the resource groups, the TRP 1 and TRP 2 can be treated as one element. In this way, the signaling cost of the CSI report can be reduced.

Example #0—CSI-RS Resource Setting

Figure 13A:
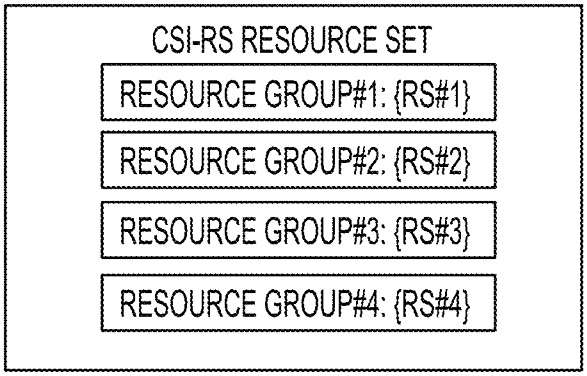
FIGS. 13A-13B show an example of CSI-RS resource configuration for mTRP CJT reporting only (no report for sTRP).
Figure 13B:
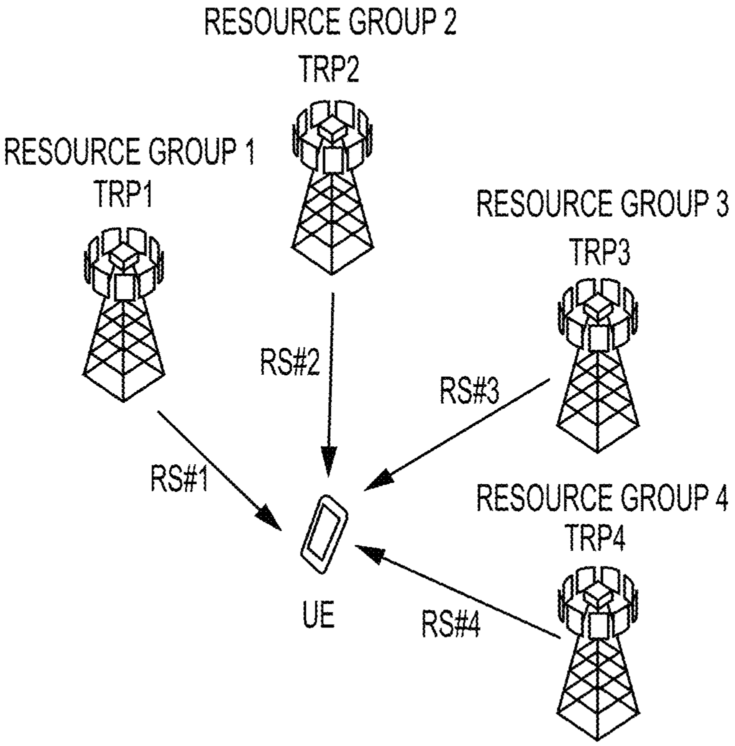

FIGS. 13A-13B show an example of CSI-RS resource configuration for mTRP CJT reporting only (no report for sTRP). For example, as shown in FIG. 13A, a network (or base station) configures K=4 CSI-RS resources {RS #1, RS #2, RS #3, RS #4} in a CSI-RS resource set to a UE only for the reporting of mTRP CJT CSI. As shown in FIG. 13B, a group of 4 TRPs {TRP1, TRP 2, TRP3, TRP4} are geographically separated. The 4 CSI-RS resources {RS #1, RS #2, RS #3, RS #4} are transmitted from the 4 TRPs {TRP1, TRP 2, TRP3, TRP4}, respectively. In some examples, the 4 CSI-RS resources can be grouped into 4 resource groups from resource group #1 to resource group #4, as shown in FIG. 13A. Each resource group includes one CSI-RS resource. Each resource group corresponds to one geographically separated TRP, respectively. In some examples, when the CSI-RS resources and the resource groups are 1-to-1 mapping, the resource groups can be omitted from the configuration.

Example #1—CSI-RS Resource Setting

Figure 14A:
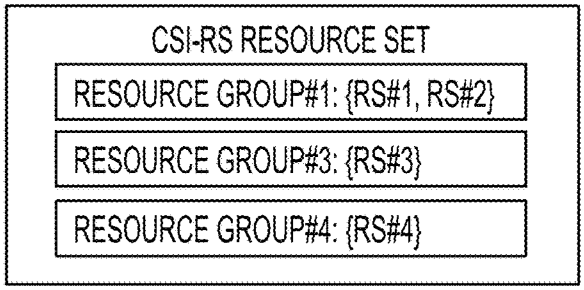
FIGS. 14A-14B show an example of CSI-RS resource configuration for mTRP CJT reporting only (no report for sTRP).
Figure 14B:
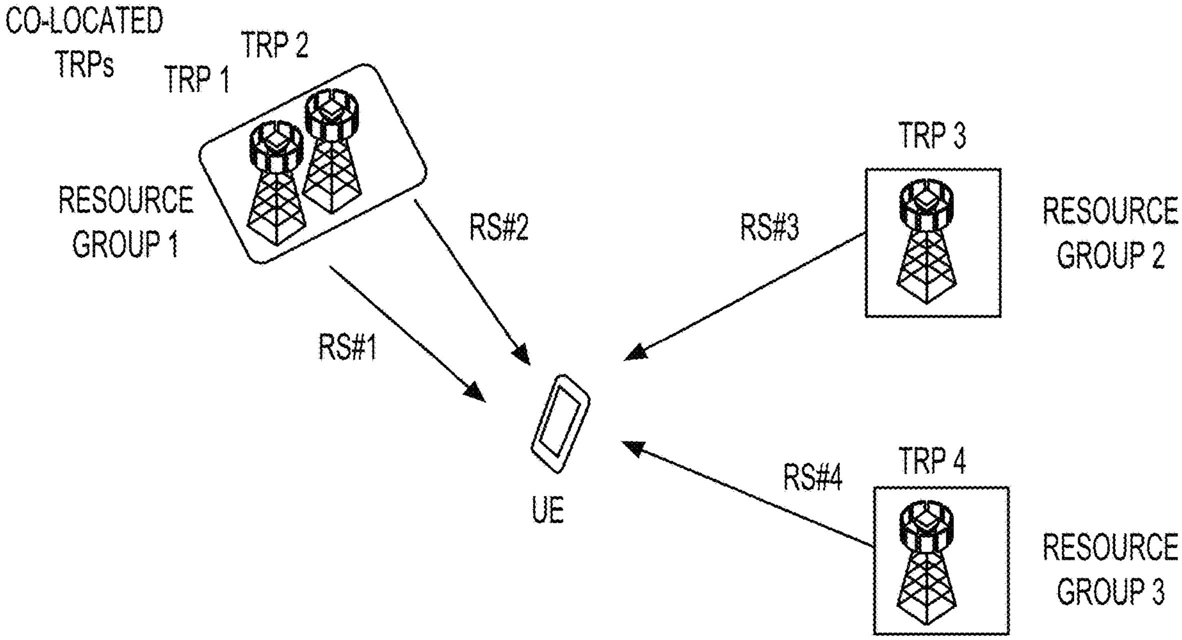

FIGS. 14A-14B show an example of CSI-RS resource configuration for mTRP CJT reporting only (no report for sTRP). For example, as shown in FIG. 14A, a network (or base station) configures K=4 CSI-RS resources {RS #1, RS #2, RS #3, RS #4} in a CSI-RS resource set to a UE only for the reporting of mTRP CJT CSI. As shown in FIG. 14B, a group of 4 TRPs {TRP1, TRP 2, TRP3, TRP4} are deployed. TRP1 and TRP2 are co-located. TRP3 and TRP4 are geographically separated. The 4 CSI-RS resources {RS #1, RS #2, RS #3, RS #4} are transmitted from the 4 TRPs {TRP1, TRP 2, TRP3, TRP4}, respectively. The 4 CSI-RS resources can be grouped into 3 resource groups from resource group

#1 to resource group #3, as shown in FIG. 14A. Resource group #1 includes CSI-RS resources RS #1 and RS #2. Resource groups #2 and #3 include CSI-RS resources RS #3 and RS #4, respectively. Grouping CSI-RS resource RS #1 and RS # into the same resource group #1 can implicitly indicate to the UE that {RS #1, RS #2} are co-located and have the same QCL (quasi co-location) assumption.

Example #2—CSI-RS Resource Setting

Figure 15A:
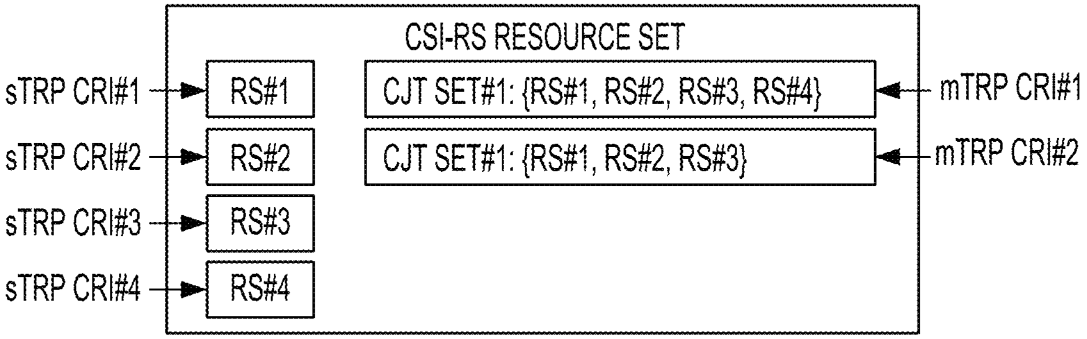
FIGS. 15A-15B show an example of CSI-RS resource configuration for sTRP and mTRP CJT joint reporting, sTRP CSI reporting, or mTRP CSI reporting.
Figure 15B:
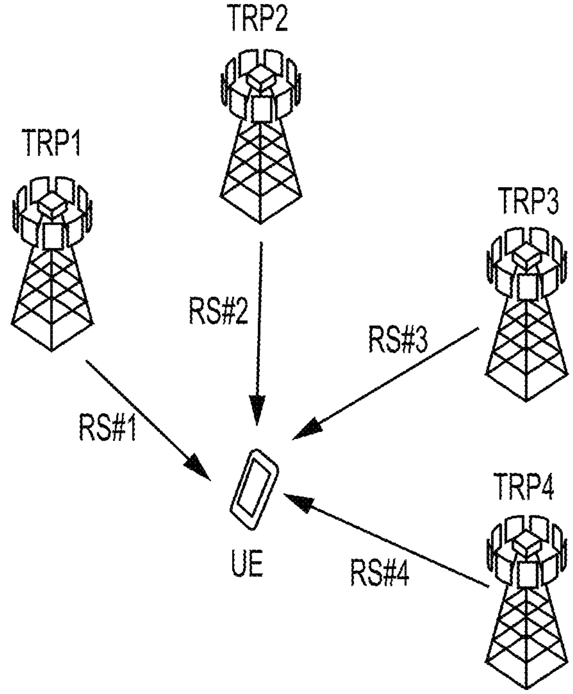

FIGS. 15A-15B show an example of CSI-RS resource configuration for sTRP and mTRP CJT joint reporting, sTRP CSI reporting, or mTRP CSI reporting. For example, as shown in FIG. 15A, a network (or base station) a CSI-RS resource set to a UE. The CSI-RS resource set can include K=4 CSI-RS resources {RS #1, RS #2, RS #3, RS #4}. The 4 CSI-RS resources can be assigned or transmitted from the 4 TRPs {TRP1, TRP 2, TRP3, TRP4}, respectively, as shown in FIG. 15B. As shown, the 4 TRPs {TRP1, TRP 2, TRP3, TRP4} are geographically separated.

Also, the CSI-RS resource set can include indications of one or more CJT sets. In some examples, each CJT set can include one or more CSI-RS resources configured in the CSI-RS resource set. In some examples, each CJT set can include more than one CSI-RS resources configured in the CSI-RS resource set. In the FIG. 15A, the CSI-RS resource set is shown to include $K_{CJT}$=2 CJT sets, CJT set #1 and CJT set #2. CJT set #1 includes CSI-RS resources from RS #1 to RS #4. CJT set #2 includes CSI-RS resources from RS #1 to RS #3. The CJT sets can be used for mTRP CJT CSI report. Different CJT sets can indicate different CJT transmission hypotheses.

Further, in the CSI-RS resource set shown in FIG. 15A, each CSI-RS resource and CJT set can be associated with a CRI. In some examples, the CRI for sTRP and mTRP measurement can be provided separately or not separately. In the FIG. 15A example, four CRIs {CRI #1, CRI #2, CRI #3, CRI #4} corresponding to 4 CSI-RSs {RS #1, RS #2, RS #3, RS #4}, respectively, are provided for sTRP CSI report. Two CRIs {CRI #1, CRI #2} corresponding to CJT set #1 and CJT set #2, respectively, are provided for mTRP CSI report. The UE can report the CSI (PMI, RI, CQI, and the like) accompanied with a CRI, for example, in form of a CRI index.

V. Type II CSI Codebook Design for mTRP Transmission

1. Overall Precoder Structure of PMI in CSI Report $$P_{CSI-RS} \times v W_{UE}[n] = [\, W^1[n] \;\; W^2[n] \;\; \cdots \;\; W^v[n] \,] = \begin{bmatrix} W^{(1)}[n] \\ W^{(2)}[n] \\ W^{(3)}[n] \\ W^{(4)}[n] \end{bmatrix}$$

$$n = 0, 1, \ldots N_3 - 1 P_{CSI-RS} v W^r[n] P_{CSI-RS} \times 1 r = 1, \ldots ,$$

$$v n[\, W^r[0] \;\; W^r[1] \;\; \cdots \;\; W^r[N_3 - 1] \,] =$$

$$W_1 \tilde{W}_2^r W_f^{rH} W^{(p)}[n] P^{(p)}_{CSI-RS} \times v p^{th} p = 1, \ldots N_P P^{(p)}_{CSI-RS} p^{th} N_P$$

In some embodiments, the overall mTRP CJT precoder reported by a UE in PMI can have a size of and takes the form below, $$P_{CSI-RS} \times v W_{UE}[n] = [\, W^1[n] \;\; W^2[n] \;\; \cdots \;\; W^v[n] \,] = \begin{bmatrix} W^{(1)}[n] \\ W^{(2)}[n] \\ W^{(3)}[n] \\ W^{(4)}[n] \end{bmatrix}$$

$$n = 0, 1, \ldots N_3 - 1 P_{CSI-RS} v W^r[n] P_{CSI-RS} \times 1 r = 1, \ldots ,$$

$$v n[\, W^r[0] \;\; W^r[1] \;\; \cdots \;\; W^r[N_3 - 1] \,] =$$

$$W_1 \tilde{W}_2^r W_f^{rH} W^{(p)}[n] P^{(p)}_{CSI-RS} \times v p^{th} p = 1, \ldots N_P P^{(p)}_{CSI-RS} p^{th} N_P$$

$$P_{CSI-RS} \times v W_{UE}[n] = [\, W^1[n] \;\; W^2[n] \;\; \cdots \;\; W^v[n] \,] = \begin{bmatrix} W^{(1)}[n] \\ W^{(2)}[n] \\ W^{(3)}[n] \\ W^{(4)}[n] \end{bmatrix}$$

$$n = 0, 1, \ldots N_3 - 1 P_{CSI-RS} v W^r[n] P_{CSI-RS} \times 1 r = 1, \ldots ,$$

$$v n[\, W^r[0] \;\; W^r[1] \;\; \cdots \;\; W^r[N_3 - 1] \,] =$$

$$W_1 \tilde{W}_2^r W_f^{rH} W^{(p)}[n] P^{(p)}_{CSI-RS} \times v p^{th} p = 1, \ldots N_P P^{(p)}_{CSI-RS} p^{th} N_P$$

In the above expression, n denotes a subband of the channel and. is the total number of CSI-RS ports at the UE. is the transmission rank. is the precoder corresponding to layer in PMI subband such that $$P_{CSI-RS} \times v W_{UE}[n] = [\, W^1[n] \;\; W^2[n] \;\; \cdots \;\; W^v[n] \,] = \begin{bmatrix} W^{(1)}[n] \\ W^{(2)}[n] \\ W^{(3)}[n] \\ W^{(4)}[n] \end{bmatrix}$$

$$n = 0, 1, \ldots N_3 - 1 P_{CSI-RS} v W^r[n] P_{CSI-RS} \times 1 r = 1, \ldots ,$$

$$v n[\, W^r[0] \;\; W^r[1] \;\; \cdots \;\; W^r[N_3 - 1] \,] =$$

$$W_1 \tilde{W}_2^r W_f^{rH} W^{(p)}[n] P^{(p)}_{CSI-RS} \times v p^{th} p = 1, \ldots N_P P^{(p)}_{CSI-RS} p^{th} N_P$$

$$P_{CSI-RS} \times v W_{UE}[n] = [\, W^1[n] \;\; W^2[n] \;\; \cdots \;\; W^v[n] \,] = \begin{bmatrix} W^{(1)}[n] \\ W^{(2)}[n] \\ W^{(3)}[n] \\ W^{(4)}[n] \end{bmatrix}$$

$$n = 0, 1, \ldots N_3 - 1 P_{CSI-RS} v W^r[n] P_{CSI-RS} \times 1 r = 1, \ldots ,$$

$$v n[\, W^r[0] \;\; W^r[1] \;\; \cdots \;\; W^r[N_3 - 1] \,] =$$

$$W_1 \tilde{W}_2^r W_f^{rH} W^{(p)}[n] P^{(p)}_{CSI-RS} \times v p^{th} p = 1, \ldots N_P P^{(p)}_{CSI-RS} p^{th} N_P$$

is the precoder of the TRP,. is the number of CSI-RS ports of the TRP. is the total number of TRPs configured for CJT.

$$W_1 \tilde{W}_2^r W_f^{rH} W_1 W_2 W_f W_1 W_1 W_2 W_f$$

For ease of notation, the superscriptions of respective matrices are dropped in the descriptions below. The overall mTRP CJT precoder can be represented as follows:

$$W_1 \tilde{W}_2^r W_f^{rH} W_1 W_2 W_f W_1 W_1 W_2 \; W_f \quad W == .$$

$$W_1 \tilde{W}_2^r W_f^{rH} W_1 W_2 W_f W_1 W_1 W_2 W_f$$

indicates layer common spatial domain information (e.g., SD basis vectors). For example, different layers can share a same SD basis vector matrix. represents layer specific linear combination coefficients (e.g., FD coefficients). represents layer specific frequency domain information (e.g., FD basis vectors).

2. $W_1$ Matrix Design

In some embodiments, $W_1$ represents the spatial domain (SD) DFT basis vectors which are wideband-common and layer-common reported. The SD basis matrix $W_1$ for mTRP CJT can take the following form:

$$W_1 = \begin{bmatrix} W_1^{(1)} & & & \\ & W_1^{(2)} & & \\ & & \ddots & \\ & & & W_1^{(N_P)} \end{bmatrix} \in \mathbb{C}^{N_T \times 2L}$$

where $N_P$ is the number of coherently transmitting TRPs.

$$W_1^{(p)}$$

can be an $N_{T_p} \times 2L_p$ SD basis matrix and represent the SD basis vectors of the $p^{th}$ TRP, p=1, . . . $N_P$. For example, $$W_1^{(p)}$$

is of the form $$W_1^{(p)} = \begin{bmatrix} v_1 & \cdots & v_{L_p} & & 0 & \\ & 0 & & v_1 & \cdots & v_{L_p} \end{bmatrix}.$$

$N_{T_p}$ is the number of tx ports in TRP p=1, . . . $N_P$, and $L_p$ is the number of SD basis vectors in each polarization of TRP p=1, . . . $N_P$ such that $$N_T = \sum_{p=1}^{N_P} N_{T_p} \text{ and } 2L = \sum_{p=1}^{N_P} 2L_p.$$

As can be seen, the SD basis matrix $W_1$ for mTRP CJT can have a block diagonal structure. The block diagonal structured $W_1$ means TRP-specific SD basis selection. For example, different TRPs can correspond to different $$W_1^{(p)}.$$

When each TRP is configured with a CSI-RS resource in mTRP transmission, each CSI-RS resource corresponds to a specific $$W_1^{(p)}.$$

In other words, SD basis selection is per CSI-RS-resource. Also, $$W_1^{(p)}$$

can include polarization-common SD basis. For example, the basis vectors $v_1$, . . . , $v_{L_p}$ are shared between the two polarizations. Thus, for a given CSI-RS resource, SD basis selection can be polarization-common. As $W_1$ indicates layer common spatial domain information, for a givent CSI-RS resource, SD basis selection can also be layer-common.

The design principles of $W_1$ are as follows. First, $W_1$ has a block diagonal structure. Tx ports across different TRPs act as isolated spatial paths available for diversity/multiplexing. Second, geographically separated TRPs mean that SD basis vectors for TRPs are different, i.e., $$W_1^{(p)} \neq W_1^{(q)}$$

for p≠q. Third, with respect to a particular UE, the line-of-sight (LOS) or non-line-of-sight (NLOS) conditions for different TRPs may be different. In this case, it can be expected that the number of SD basis vectors are different across TRPs, i.e., $L_p \neq L_q$ for p≠q. For example, {$L_p$, p=1, . . . $N_P$} can be higher-layer configured by a base station. Or, a total number of $L_p$ for all TRPs can be configured by a base station. A UE can report {$L_p$, p=1, . . . $N_P$}.

A. $W_1$ Feedback Reduction

Co-located TRPs may use the same SD basis vectors, i.e., $$W_1^{(p)} = W_1^{(q)}$$

if $p^{th}$ and $q^{th}$ TRP are co-located. Accordingly, UE computation/feedback overhead may be reduced with this knowledge. In various embodiment, the following two approaches can be employed to reduce $W_1$ feedback:

Alt 1: a base station (e.g., gNB) uses higher layer signaling, such as RRC or MAC-CE, to inform a UE about the co-located TRPs.

Alt 2: Based on the calculated $$W_1^{(p)},$$

a UE can determine to only report $$W_1^{(p)}$$

which has different SD information.

Example #3—$W_1$ Feedback Reduction (Alt 1.1)

In some examples, if some TRPs are co-located, network (NW) can inform a UE the co-location relationship among the TRPs. In various embodiments, there are various ways to inform the co-location information to a UE. For example, network can configure the CSI-RS resources of the co-located TRPs within the same resource group. The CSI report associated with the CSI-RS resources in the same resource group can share the same $W_1$ information. For example, corresponding to the co-located TRPs or the CSI-RS resources in the same resource group, one $$W_1^{(p)}$$

can be shared for CSI reporting. Under such configuration, antenna configurations ($N_1$, $N_2$) and ($O_1$, $O_2$) can be configured for each CSI-RS resource (Alt 1.1).

FIG. 16 shows a first example of $W_1$ feedback reduction. As shown, 4 TRPs from TRP1 to TRP4 are deployed. Each TRP has a configuration of ($N_1$, $N_2$)=(4, 1) and 8 CSI-RS ports. In total, 4 TRPs have CSI-RS ports of $P_{CSI\text{-}RS}$=32. Four CSI-RS resources from RS #1 to RS #4 are configured from the 4 TRPs, respectively.

There are 4 scenarios from 1601-1604 regarding the TRP co-location arrangement listed in FIG. 16. In scenario 1601, the 4 TRPs are non-co-located. Network can signal to a UE the resource group configuration as follows: {Resource group #1 (RS #1), Resource group #2 (RS #2), Resource group #3 (RS #3), Resource group #4 (RS #4)}. The 4 SD basis matrices $$\{W_1^{(1)}, W_1^{(2)}, W_1^{(3)}, W_1^{(4)}\}$$

for each TRP can be different. The 4 SD basis matrices $$\{W_1^{(1)}, W_1^{(2)}, W_1^{(3)}, W_1^{(4)}\}$$

can be reported in the CSI report corresponding to the 4 CSI-RS resources {RS #1, RS #2, RS #3, RS #4}, respectively.

In scenario 1602, the TRPs {TRP1, TRP2} are co-located and the TRPs {(TRP1/TRP2), TRP3, TRP4} are non-co-located. Network can signal to a UE the resource group configuration as follows: {Resource group #1 (RS #1, RS #2), Resource group #2 (RS #3), Resource group #3 (RS #4)}. The 4 SD basis matrices can be $$\{W_1^{(1)}, W_1^{(1)}, W_1^{(2)}, W_1^{(3)}\}.$$

The SD basis matrices of TRP1 and TRP2 can be similar or the same. Accordingly, 3 SD basis matrices $$\{W_1^{(1)}, W_1^{(2)}, W_1^{(3)}\}$$

can be reported in the CSI report corresponding to the 4 CSI-RS resources {RS #1, RS #2, RS #3, RS #4}.

In scenario 1603, the TRPs {TRP2, TRP3} are co-located and the TRPs {TRP1, (TRP2/TRP3), TRP4} are non-co-located. Network can signal to a UE the resource group configuration as follows: {Resource group #1 (RS #1), Resource group #2 (RS #2, RS #3), Resource group #3 (RS #4)}. The 4 SD basis matrices can be $$\{W_1^{(1)}, W_1^{(2)}, W_1^{(2)}, W_1^{(3)}\}.$$

The SD basis matrices of TRP2 and TRP3 can be similar or the same. Accordingly, 3 SD basis matrices $$\{W_1^{(1)}, W_1^{(2)}, W_1^{(3)}\}$$

can be reported in the CSI report corresponding to the 4 CSI-RS resources {RS #1, RS #2, RS #3, RS #4}.

In scenario 1604, the TRPs {TRP1, TRP2} are co-located. The TRPs {TRP3, TRP4} are also co-located. The TRPs {(TRP1/TRP2), (TRP3/TRP4)} are non-co-located. The 4 SD basis matrices can be $$\{W_1^{(1)}, W_1^{(1)}, W_1^{(2)}, W_1^{(2)}\}.$$

The SD basis matrices of TRP1 and TRP2 can be similar or the same. The SD basis matrices of TRP3 and TRP4 can be similar or the same. Accordingly, 2 SD basis matrices $$\{W_1^{(1)}, W_1^{(2)}\}$$

be reported in the CSI report corresponding to the 4 CSI-RS resources {RS #1, RS #2, RS #3, RS #4}.

Example #4—$W_1$ Feedback Reduction (Alt 1.2)

FIG. 17 shows a second example of $W_1$ feedback reduction. Similar to the FIG. 17 example, 4 TRPs from TRP1 to TRP4 are deployed. In total, 4 TRPs have CSI-RS ports of $P_{CSI\text{-}RS}$=32. Four CSI-RS resources from RS #1 to RS #4 are configured from the 4 TRPs respectively. There are 4 scenarios from 1701-1704 regarding the TRP co-location arrangement listed in FIG. 17. The scenarios 1701-1704 are similar to the scenarios 1601-1604. Accordingly, CSI-RS resource grouping scheme can be employed similarly to inform the UE about the TRP co-location arrangement (or deployment). The SD basis matrices $$W_1^{(p)}$$

corresponding to CSI-RS resources configured to multiple co-located TRPs can share a same SD basis matrix in the CSI report to reduce CSI feedback overhead.

Different from the FIG. 16 example, a combined antenna configuration ($N_1$,$N_2$) is configured for the CSI-RS resources corresponding to co-located TRPs (Alt 1.2). In some examples, the CSI-RS resources corresponding to co-located TRPs are grouped into a same resource group. For example, in scenario 1702, TRP1 and TRP2 are co-located. Accordingly, a combined antenna configuration (8, 1) is configured for the CSI-RS resources RS #1 and RS #2 corresponding to co-located TRP1 and TRP2. Similarly, in scenario 1704, a combined antenna configuration (8, 1) is configured for the CSI-RS resources RS #1 and RS #2 corresponding to co-located TRP1 and TRP2, and another combined antenna configuration (8, 1) is configured for the CSI-RS resources RS #3 and RS #4 corresponding to co-located TRP3 and TRP4.

Example #5—$W_1$ Feedback Reduction (Alt 2.1)

In some examples, according to the $$W_1^{(p)}$$

calculated based on CSI-RS measurements results, a UE can only report a set of $$W_1^{(p)}$$

which have different SD basis vector information. For example, for $$W_1^{(1)} \text{ and } W_1^{(2)}$$

corresponding to two co-located TRPs, one SD basis vector matrix, $$W_1^{(1)} \text{ or } W_1^{(2)},$$

is reported instead of both.

Figure 18:
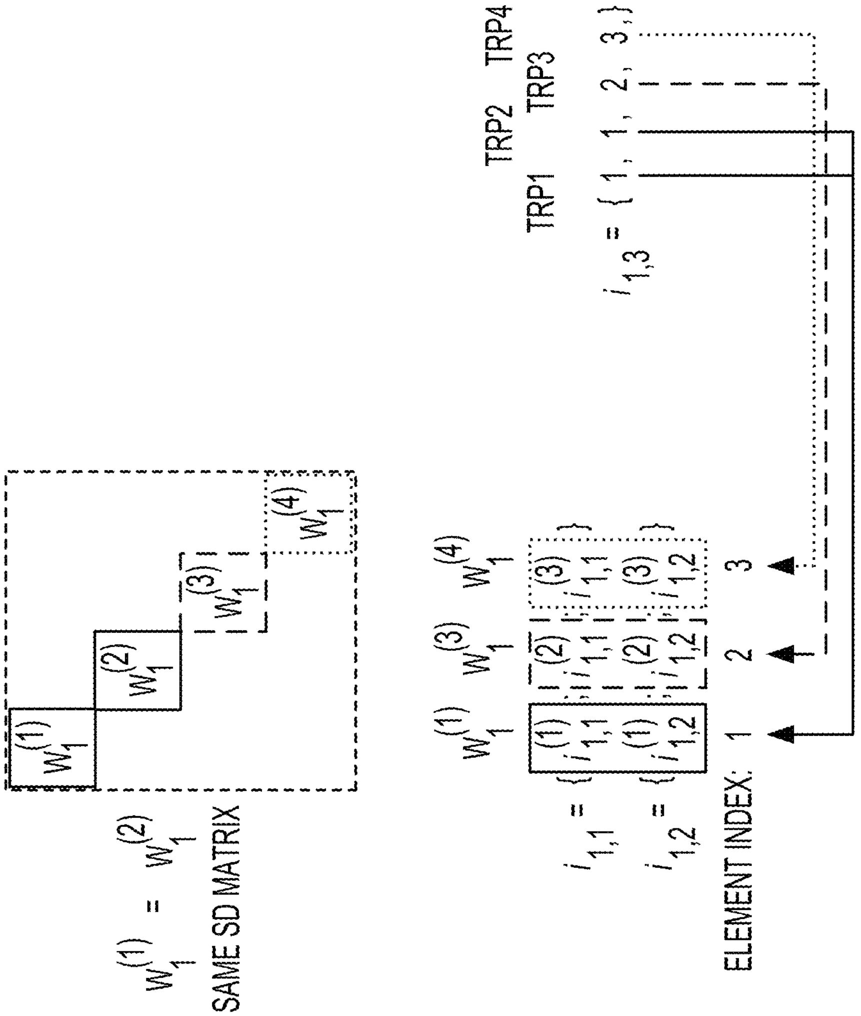
FIG. 18 shows an example of reporting compressed spatial domain (SD) basis vector matrix $W_1$.

FIG. 18 shows an example of reporting compressed SD basis vector matrix $W_1$. The PMI reporting format of $W_1$ matrix can be TRP-specific, e.g., $$\{W_1^{(1)}, W_1^{(2)}, W_1^{(3)}, W_1^{(4)}\}.$$

For example, $$W_1^{(p)}$$

contains rotation factor of SD basis ($i_{1,1}$) and SD basis indicator ($i_{1,2}$):

$$i_{1,1}^{(p)} = [q_1^{(p)} q_2^{(p)}],$$

where $$q_1^{(p)} \in \{0, 1, \ldots, O_1^{(p)} - 1\} \text{ and } q_2^{(p)} \in \{0, 1, \ldots, O_2^{(p)} - 1\}$$

for the p-th TRP, $$i_{1,2}^{(p)} \in \left\{0, 1, \ldots, \binom{N_1^{(p)} N_2^{(p)}}{L_p}\right\}$$

for the p-th TRP

Considering a four-TRP CJT CSI reporting, if the calculated SD matrix for TRP1 and TRP2 are the same, i.e., $$W_1^{(1)} = W_1^{(2)},$$

as shown in FIG. 18, $W_1$ can be further compressed by a UE. In one example, the UE can reports $$i_{1,1} = \{i_{1,1}^{(1)}; i_{1,1}^{(2)}; i_{1,1}^{(3)}\}$$

and $$i_{1,2} = \{i_{1,2}^{(1)}; i_{1,2}^{(2)}; i_{1,2}^{(3)}\}$$

each with only three elements instead of 4 elements, as shown in FIG. 18. In one example, the UE can further report an additional quartet indices, e.g., $i_{1,3}$={1, 1, 2, 3} to indicate the corresponding element indexes of four TRPs. The indexes having a same value can indicate the corresponding multiple $$W_1^{(p)}$$

sharing a same SD basis vector matrix.

Figures 19A, 19B:
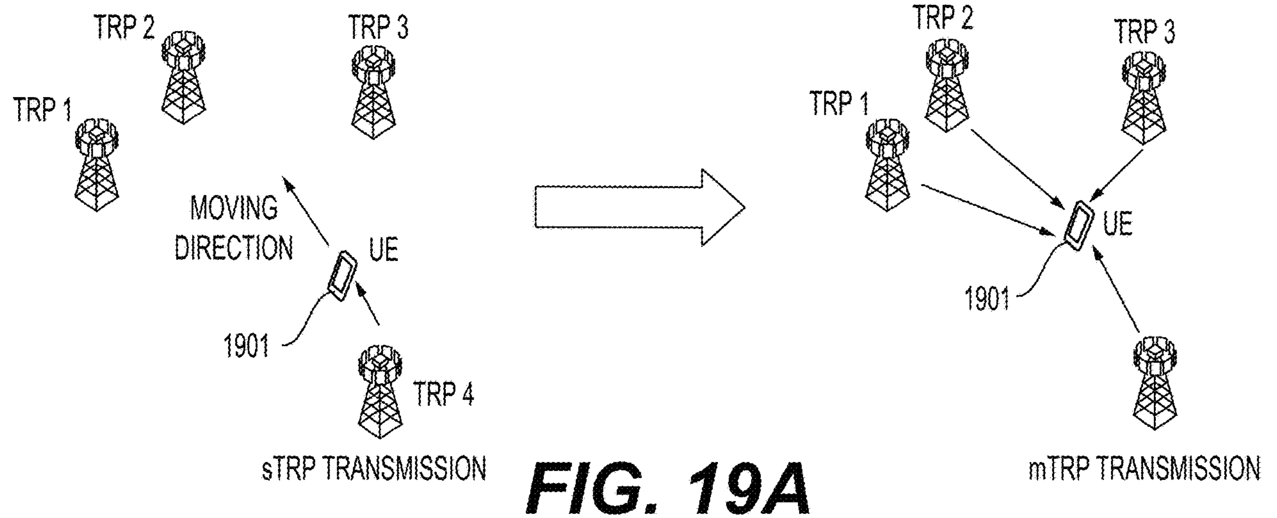
FIG. 19A shows a scenario of sTRP and mTRP switching.
FIG. 19B shows another example of $W_1$ feedback reduction in the scenario of mixed sTRP and mTRP CSI report of FIG. 19A.

Example #6—$W_1$ Feedback Reduction (Alt 2.2): $W_1$ PMI Sharing for Dynamic sTRP and mTRP Switching FIG. 19A shows a scenario of sTRP and mTRP switching. As shown, four TRPs from TRP1 to TRP4 are deployed surrounding a UE 1901. Initially, the UE 1901 is communicating with a single TRP, TRP4. The UE 1901 moves away from TRP4 towards TRP1, TRP2, and TRP3. Based on based on a CSI report from the UE 1901, a base station (not shown) can control the UE 1901 and the 4 TRPs to switch to mTRP transmission from the previous sTRP transmission. In the scenario of FIG. 19A, CSI regarding the channels between the UE 1901 and the 4 TRPs can be reported to the base station to support the dynamic sTRP and mTRP switching.

To support dynamic the switch between sTRP and mTRP transmission, the UE 1901 can report one CSI among CJT and sTRP. For example, the UE 1901 can report one CSI reflecting the channel conditions between the UE 1901 and the 4 TRPs. Alternatively, the UE 1901 can report one CSI for CJT and X CSI for single-TRP transmission. For example, X∈{0, 1, 2, 3, 4} is configurable. In this alternative scenario, separate CRI indexing for CJT and single-TRP measurement, respectively, can be configured from the base station to the UE 1901. Based on the CSI-RS measurement, separate CSI corresponding to the respective CRI can be derived and reported.

In the above alternative scenario, $W_1$ matrices can be shared between sTRP and mTRP CSI reports. For example, only one $W_1$ matrix corresponding to each TRP is reported. FIG. 19B shows another example of $W_1$ feedback reduction in the scenario of mixed sTRP and mTRP CSI report of FIG. 19A. As shown, one sTRP CSI, including CRI, RI, PMI ($W_1$, $W_2$, $W_f$), and CQI, is reported corresponding to each TRP.

One mTRP CSI is reported corresponding to the 4 TRPs. The mTRP CSI can include CRI, RI, PMI $$(\{W_2^{(1)}, W_2^{(2)}, W_2^{(3)}, W_2^{(4)}\} \text{ and } W_f^{(1)}, W_f^{(2)}, W_f^{(3)}, W_f^{(4)}\}),$$

and CQI. However, $W_1$ SD basis matrix is omitted from the mTRP CSI. The base station, after receiving the $$W_1^{(1)}, W_1^{(2)}, W_1^{(3)}, W_1^{(4)}$$

in the 4 sTRP CSI, can derive the $W_1$ SD basis matrix accordingly.

3. $W_2$ Matrix Design $$W_1 \tilde{W}_2^r W_f^{rH} W_1 W_2 W_f W_1 N_T \times \sum_{p=1}^{N_P} 2L_p W_2 \sum_{p=1}^{N_P} 2L_p \times N_3 N_3 W_f N_3 \times N_3 W_f W_2$$

Figure 20:
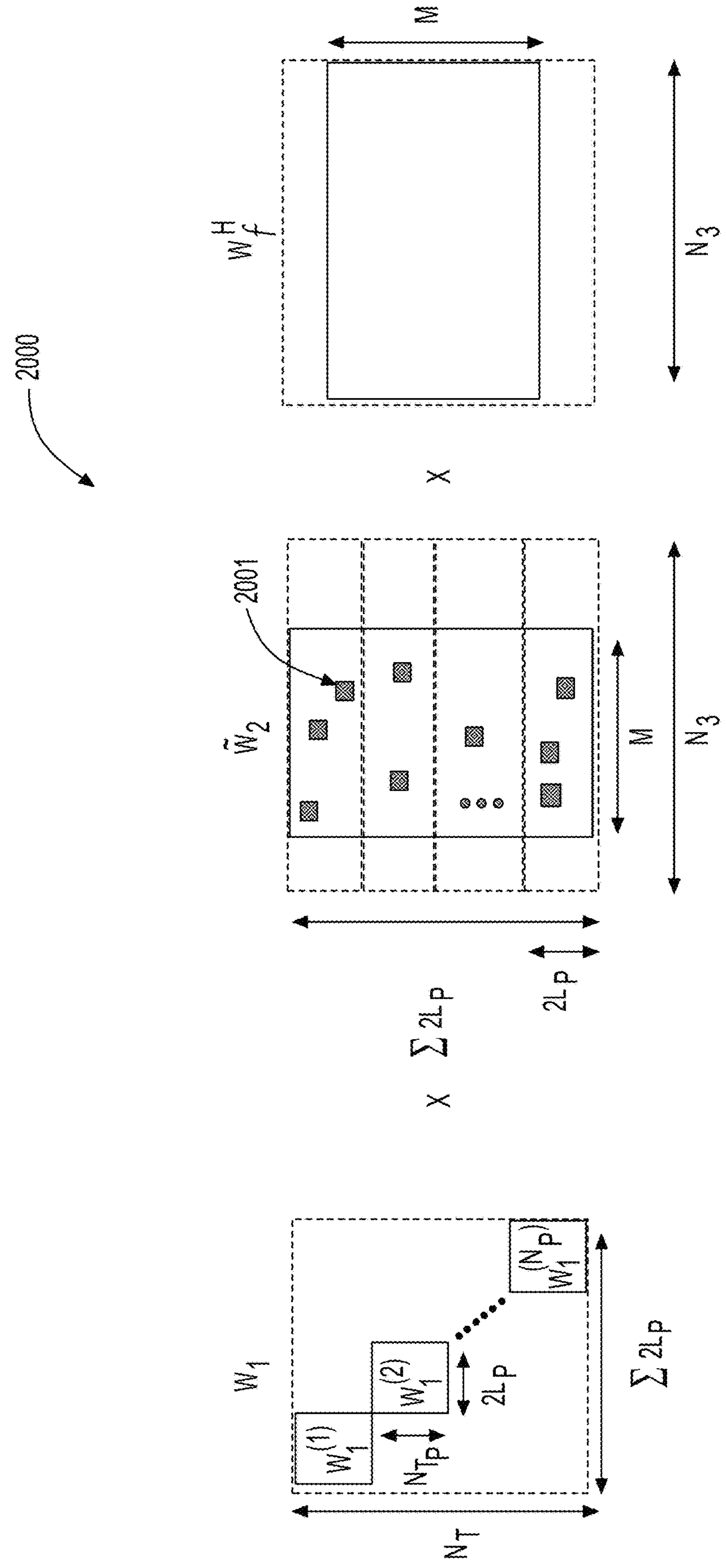
FIG. 20 shows a Type II codebook precoder structure 2000 used for mTRP CJT feedback.

FIG. 20 shows a Type II codebook precoder structure 2000 used for mTRP CJT feedback. The precoder structure 2000 can correspond to the precoder described above, $$W_1 \tilde{W}_2^r W_f^{rH} W_1 W_2 W_f W_1 N_T \times \sum_{p=1}^{N_P} 2 L_p W_2 \sum_{p=1}^{N_P} 2L_p \times N_3 N_3 W_f N_3 \times N_3 W_f \; W_2 \quad W ==$$

$$W_1 \tilde{W}_2^r W_f^{rH} W_1 W_2 W_f W_1 N_T \times \sum_{p=1}^{N_P} 2L_p W_2 \sum_{p=1}^{N_P} 2L_p \times N_3 N_3 W_f N_3 \times N_3 W_f W_2$$

where $W_1$ represents a matrix of the wideband SD basis vectors, $W_2$ represents a matrix of space-frequency compression coefficients linearly combining the SD basis vectors, and $W_f$ represents the DFT basis vectors used for FD compression. As shown, has a dimension of. has a dimension of, where is a number of subbands of the channel of mTRP transmission. has a dimension of. M number of FD basis vectors are selected from. Correspondingly, in the FIG. 20 example, M columns of frequency coefficients are included in.

Among the M columns of coefficients, the most significant coefficients 2001 can be selected and quantized. After quantization, a set of non-zero coefficients (NZC) can be reported in the respective SCI. For example, the selected linear combination coefficients of $W_2$ can be reported to a gNB in the form of a single strongest coefficient in a particular polarization, reference amplitude for the other polarization, polarization specific differential amplitudes, and phase coefficients.

In some examples, $W_2$ coefficients can be reported as a set of coefficient indicators in a CSI report. For example, the coefficient indictors can be classified as:

- SCI (Strongest coefficient indicator): $i_{1,8}$
- ACI (Amplitude coefficient indicator)
  - Reference amplitude: $i_{2,3}$
  - Differential amplitude: $i_{2,4}$ (with respect to SCI or ACI)
- PCI (Phase coefficient indicator): $i_{2,5}$
- Non-zero-coefficient (NZC) bitmap: $i_{1,7}$ (indicating coefficient positions in $W_2$)

In some examples, $W_2$ design can follow the following principles:

- Non-zero coefficients (NZCs) can be selected across TRPs. For example, $W_2$ coefficients corresponding to different TRPs can be considered together for selection or determination of to-be-reported coefficients.
  - The maximum number of NZCs per layer is determined according to $K_0 = \lceil \beta \times M \Sigma 2L_p \rceil$, where $\beta$ is the NZC selection ratio.
- One strongest coefficient (SCI) across all TRP—no amplitude and phase reported for SCI.
- Reference amplitude indicator can be
  - TRP-common, i.e., one reference amplitude across all TRPs
  - TRP-specific, i.e., each TRP has one reference amplitude
  - Polarization common, i.e., one reference amplitude for both polarization
  - Polarization specific, i.e., each polarization has one reference amplitude
  - Reference amplitudes can be quantized to 4 bits, for example
- All other NZCs are quantized relative to the corresponding reference amplitudes, for example, using 3 bits (i.e., differential amplitude).
- All NZC phases rather than SCI can be quantized, for example, to 16 PSK.
- NZC bitmap can be TRP-common or TRP-specific
  - TRP-common: The total bit map size is $(\Sigma_{p \in \mathcal{S}} 2L_p) \times M$
  - TRP-specific: The total bit map size is $\Sigma_{p \in \mathcal{S}} 2L_p M_p$, where
    - $\mathcal{S}$ is the set of selected/serving TRPs $$N_p'$$

is the number of selected TRPs, i.e., $$|\mathcal{S}| = N_p'$$

- $L_p$ is the number of beams of p-th TRP
- $M_p$ is the number of selected FD basis of p-th TRP
- M is the number of TRP-common FD basis FIG. 21 shows an example of NZCs selection according to embodiments of the disclosure. In the FIG. 21 example, $$k_0^{(1),(p)} \text{ and } k_1^{(1),(p)}$$

is the reference amplitude of p-th TRP of polarization 0 and 1, respectively.

Example #7—NZCs Selection

Figures 22A, 22B:
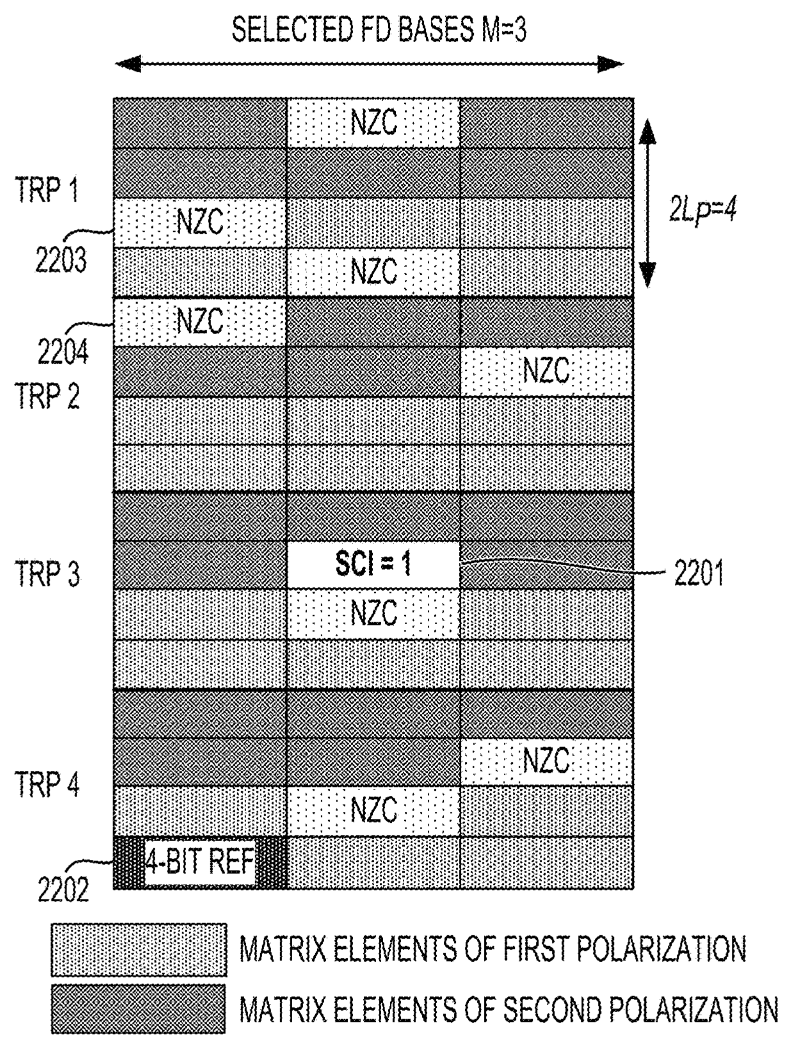
FIGS. 22A-22B show an example of NZCs selection for mTRP CSI report according to embodiments of the disclosure.

FIGS. 22A-22B show an example of NZCs selection for mTRP CSI report according to embodiments of the disclosure. There are 4 TRPs in the CSI report. Each TRP has two antenna polarizations. Corresponding to each polarization, 2 SD basis vectors are reported ($L_p=2$). A number of M=3 FD basis vectors are selected for the 4 TRPs. FIG. 22A shows different types of indicators for reporting $W_2$ coefficients and the respective selection methods (TRP-common or TRP-specific). FIG. 22B shows a layout of matrix elements in a region of $M\times\sum_{p\in\mathcal{S}} 2L_p$ in the linear combination coefficient matrix $W_2$. As shown, a TRP-common SCI is determined which corresponds to the coefficient 2201. A TRP-common reference amplitude is determined which corresponds to the coefficient 2202.

To determine differential amplitudes of other NZCs, TRP-specific NZCs (such as the coefficients 2203-2204) can be selected. Respective differential amplitudes of these TRP-specific selected NZCs can be determined with respect to the corresponding reference amplitudes, depending on which polarization the selected NZCs belongs to. For example, the matrix elements (or coefficients) 2203 and 2204 belong to first and second antenna polarization, respectively. Accordingly, the reference amplitudes of elements 2202 and 2201 are used, respectively, for determining the differential amplitudes of the elements 2203 and 2204. The differential amplitudes of the TRP-specific selected NZCs can be quantized before the CSI report.

Example #8—NZCs Selection

Figures 23A, 23B:
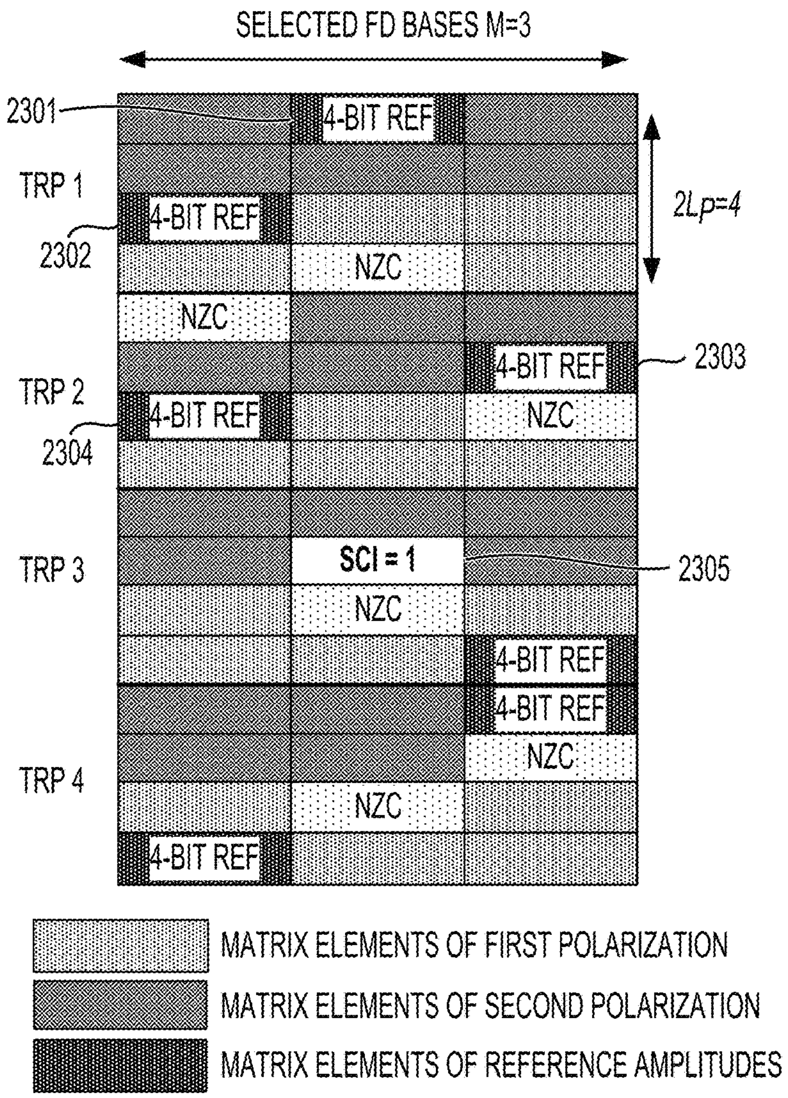
FIGS. 23A-23B show another example of NZCs selection for mTRP CSI report according to embodiments of the disclosure.

FIGS. 23A-23B show another example of NZCs selection for mTRP CSI report according to embodiments of the disclosure. Similarly, there are 4 TRPs in the CSI report. Each TRP has two polarizations. Corresponding to each polarization, 2 SD basis vectors are reported ($L_p$=2). A number of M=3 FD basis vectors are selected for the 4 TRPs. FIG. 23A shows different types of indicators for reporting $W_2$ coefficients and the respective selection methods (TRP-common or TRP-specific). FIG. 23B shows a layout of matrix elements in a region of $M\times\sum_{p\in\mathcal{S}} 2L_p$ in the linear combination coefficient matrix $W_2$. Similarly, a TRP-common SCI is determined which corresponds to the coefficient 2205.

Different from the example of FIGS. 22A-22B, multiple reference amplitudes are selected in a TRP-specific and polarization-specific manner. For example, two selected reference amplitudes correspond to coefficients (or matrix elements) 2301 and 2302 that have different polarizations and belong to a same TRP 1. Two selected reference amplitudes correspond to coefficients (or matrix elements) 2303 and 2304 that have different polarizations and belong to a same TRP 2. Accordingly, to determine differential amplitudes of other NZCs, TRP-specific selected NZCs can be compared with the respective TRP-specific and polzarization-specific reference amplitudes.

4. $W_f$ Matrix Design $$W_1 \tilde{W}_2^r W_f^{rH} W_1 W_2 W_f W_f$$

As described above, the overall mTRP CJT precoder can be represented as follows:

$$W_1 \tilde{W}_2^r W_f^{rH} W_1 W_2 W_f W_f \quad W == .$$

$$W_1 \tilde{W}_2^r W_f^{rH} W_1 W_2 W_f W_f$$

The matrix represents the frequency domain (FD) basis vectors used for frequency domain compression. In various embodiments, FD basis selection design can follow the below principles (Alt 1 and Alt 2). There can be two alternatives for FD compression.

Alt 1: TRP-independent (or TRP-specific) FD basis selection. $M_p$ number of FD basis vectors can be selected for the p-th TRP, p=1, . . . $N_P$. Overall frequency domain basis vector set can be $$\mathcal{M} = \bigcup_{p=1}^{N_p} \mathcal{M}_p,$$

such that $|\mathcal{M}_p| = M_p$ and $|\mathcal{M}| = M$. The Main rationale is to account for subband phase jumps across TRPs due to time offset between the respective TRPs. In some examples, the TRP-specific FD basis vector selection method can be applied to mTRP transmissions where the deployed TRPs include co-located TRPs.

Alt 2: TRP-common (or joint) FD basis selection. M number of FD basis vectors can be selected across TRPs (for all TRPs). In some examples, the cross-TRP (or TRP-common) FD basis vector selection method can be applied to mTRP transmissions where the deployed TRPs include geographically distributed TRPs.

Figure 24:
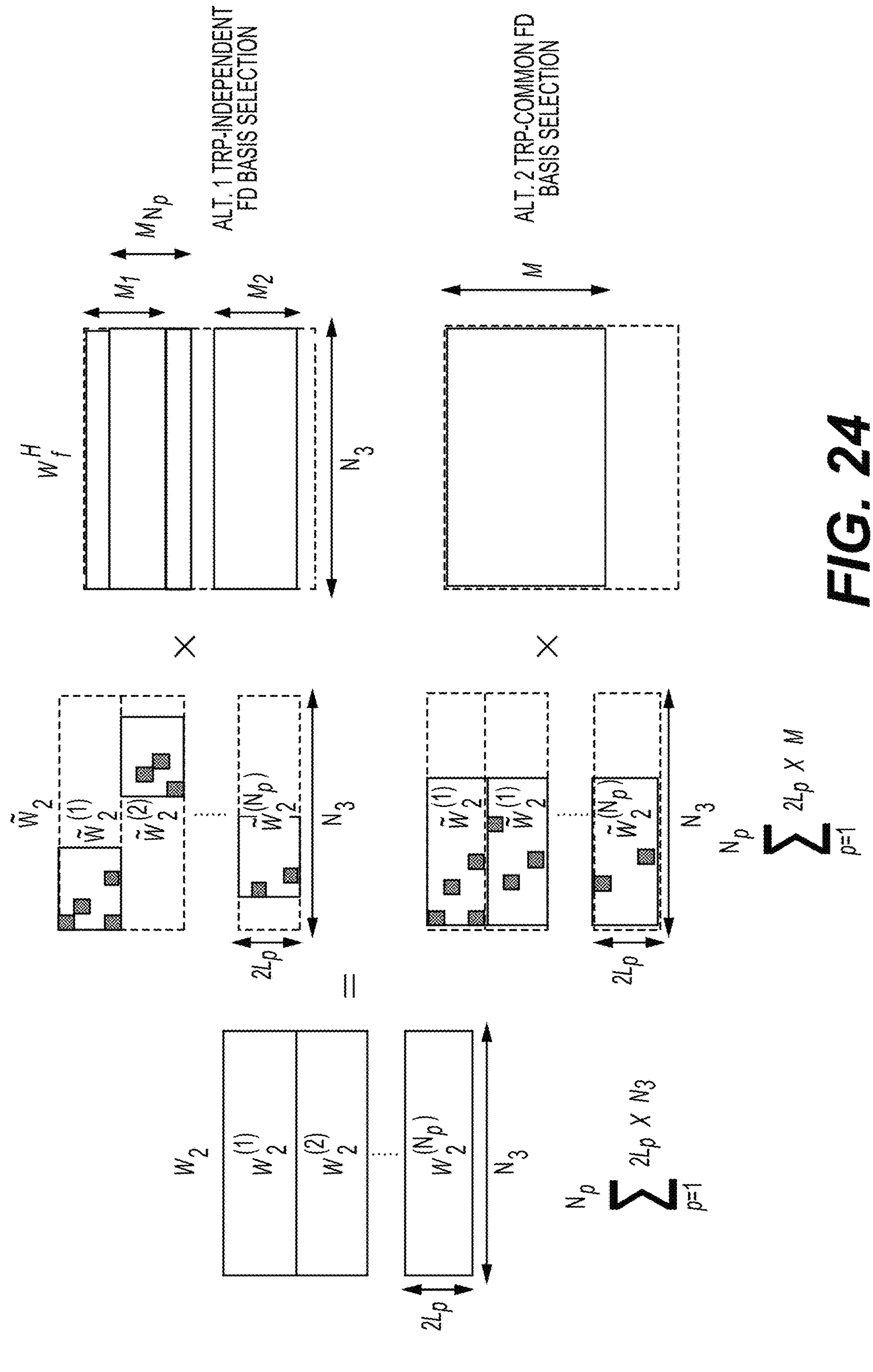
FIG. 24 shows examples of frequency domain (FD) basis vector selection alternatives according to embodiments of the disclosure.

FIG. 24 shows examples of FD basis vector selection alternatives according to embodiments of the disclosure. Two alternatives are shown: Alt 1, TRP-independent FD basis selection, and Alt 2, TRP-common FD basis selection. As shown, the coefficients matrix $$W_2(\tilde{W}_2^r)$$

in both Alt 1 and Alt 2 includes per-TRP coefficient matrices $$\left\{W_2^{(1)}, W_2^{(2)}, W_2^{(N_p)}\right\}.$$

For the SD basis matrix $$W_f\left(W_f^H\right)$$

of Alt 1, the SD basis vectors are selected per TRP. For example, $M_1$ SD basis vectors are selected for $TRP^{(1)}$. $M_2$ SD basis vectors are selected for $TRP^{(2)}$. $M_{N_p}$ SD basis vectors are selected for $TRP^{(N_p)}$. For the SD basis matrix $$W_f\left(W_f^H\right)$$

of Alt 2, the SD basis vectors are selected across-TRP.

$$\begin{bmatrix} W_1^{(1)}\tilde{W}_2^{(1)}W_f^{(1)H} \\ \vdots \\ W_1^{(N_p)}\tilde{W}_2^{(N_p)}W_f^{(N_p)H} \end{bmatrix}\begin{bmatrix} W_1^{(1)}\tilde{W}_2^{(1)}W_f^{H} \\ \vdots \\ W_1^{(N_p)}\tilde{W}_2^{(N_p)}W_f^{H} \end{bmatrix} W_f^{(1)H}, \ldots, W_f^{(N_p)H} W_f^H$$

Corresponding to the two FD basis selection alternatives Alt 1 and Alt 2, the overall mTRP CJT precoder may take the following two forms:

$$\begin{bmatrix} W_1^{(1)}\tilde{W}_2^{(1)}W_f^{(1)H} \\ \vdots \\ W_1^{(N_p)}\tilde{W}_2^{(N_p)}W_f^{(N_p)H} \end{bmatrix}\begin{bmatrix} W_1^{(1)}\tilde{W}_2^{(1)}W_f^{H} \\ \vdots \\ W_1^{(N_p)}\tilde{W}_2^{(N_p)}W_f^{H} \end{bmatrix} W_f^{(1)H}, \ldots, W_f^{(N_p)H} W_f^H \quad \text{Alt 1}$$

$$\begin{bmatrix} W_1^{(1)}\tilde{W}_2^{(1)}W_f^{(1)H} \\ \vdots \\ W_1^{(N_p)}\tilde{W}_2^{(N_p)}W_f^{(N_p)H} \end{bmatrix}\begin{bmatrix} W_1^{(1)}\tilde{W}_2^{(1)}W_f^{H} \\ \vdots \\ W_1^{(N_p)}\tilde{W}_2^{(N_p)}W_f^{H} \end{bmatrix} W_f^{(1)H}, \ldots, W_f^{(N_p)H} W_f^H \quad \text{Alt 2}$$

$$\begin{bmatrix} W_1^{(1)}\tilde{W}_2^{(1)}W_f^{(1)H} \\ \vdots \\ W_1^{(N_p)}\tilde{W}_2^{(N_p)}W_f^{(N_p)H} \end{bmatrix}\begin{bmatrix} W_1^{(1)}\tilde{W}_2^{(1)}W_f^{H} \\ \vdots \\ W_1^{(N_p)}\tilde{W}_2^{(N_p)}W_f^{H} \end{bmatrix} W_f^{(1)H}, \ldots, W_f^{(N_p)H} W_f^H$$

As shown, for independent FD basis selection across $N_p$ TRPs (Alt 1), the per-TRP FD basis vector matrices { } are different for different TRPs. For TRP-common FD basis selection, different TRPs share a same FD basis vector matrix.

Example #9—FD Basis Selection for $W_f$

In some examples, FD basis indicators ($i_{1,5}$ and $i_{1,6}$) for $W_f$ matrix in a CSI report contains an initial window position $M_{initial}$ (e.g., for $N_3>19$) and an FD basis index $n_3$, where $i_{1,5}$: $M_{initial} \in \{-2M+1, -2M+2, \ldots, 0\}$ $i_{1,6}$: $n_3=[n_{3,0}, \ldots, n_{3,M-1}]$ and $n_{3,f} \in \{0,1, \ldots, N_3-1\}$ Corresponding to the above SD basis selection alternatives, the PMI reporting format of FD basis vectors can have two designs:

Alt 1: FD basis indicators are reported for each TRP (TRP-specific).

Considering 4 TRP case, the reporting format can be $i_{1,5}$:

$$\{M_{initial}^{(1)}, M_{initial}^{(2)}, M_{initial}^{(3)}, M_{initial}^{(4)}\} \text{ and } i_{1,6}:\{n_3^{(1)}, n_3^{(2)}, n_3^{(3)}, n_3^{(4)}\}$$

Alt 2: FD basis indicators are reported across all TRPs (TRP-common)

Figure 25:
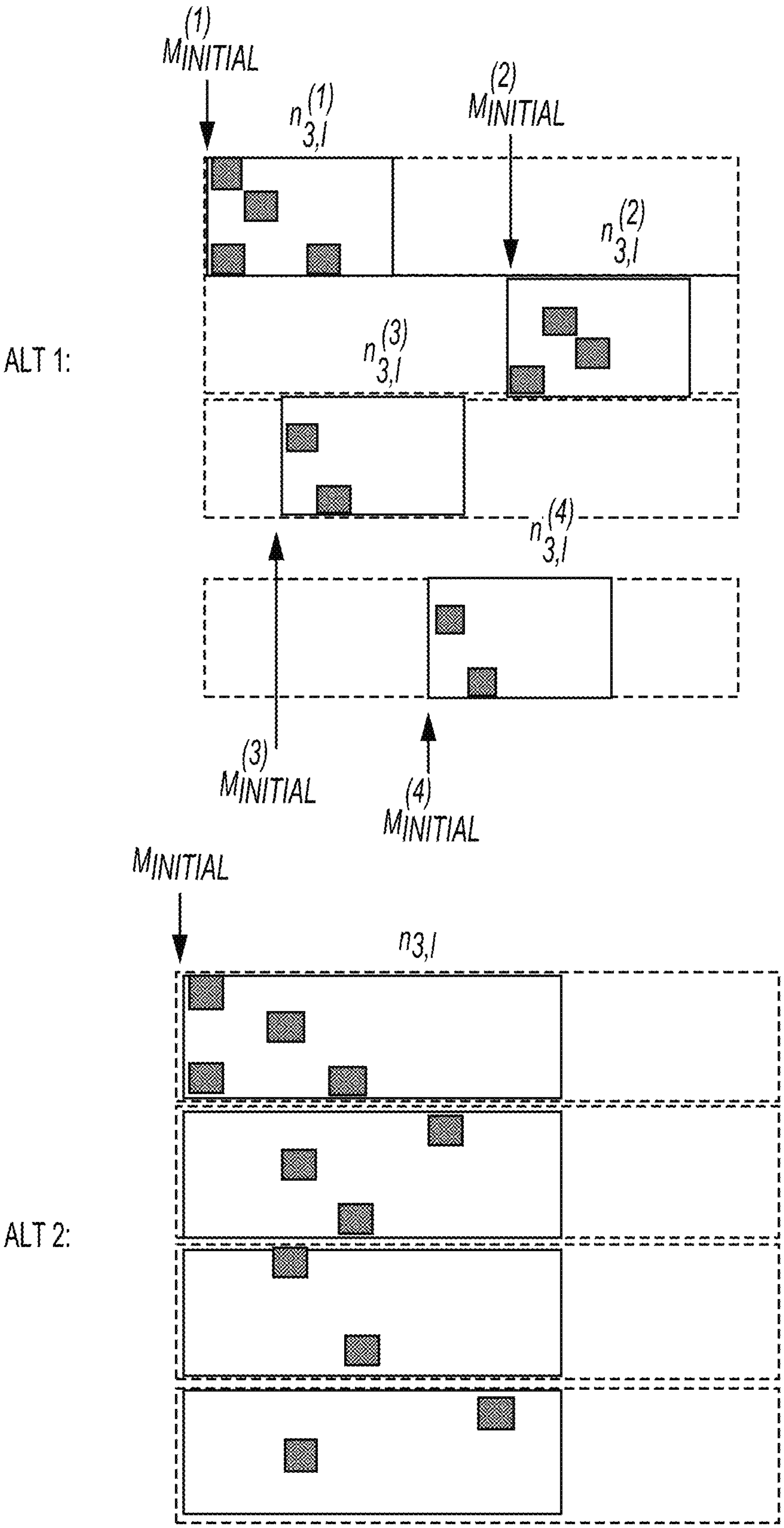
FIG. 25 shows examples of the initial window positions and the FD basis indexes in an FD coefficient matrix $W_2$.

The reporting format can be $i_{1,5}$: $\{M_{initial}\}$ and $i_{1,6}$: $\{n_3\}$ FIG. 25 shows examples of the initial window positions and the FD basis indexes in an FD coefficient matrix $W_2$. As shown, the Alt 1 case corresponds to the PMI reporting format of FD basis vectors Alt 1. Different TRPs have different indicators $$M_{initial}^{(p)} \text{ and } n_{3,l}^{(p)}.$$

The Alt 2 case corresponds to the PMI reporting format of FD basis vectors Alt 2. Different TRPs have same indicators $M_{initial}$ and $n_{3,l}$.

VI. Dynamic TRP Selection

A UE may need to measure CSI-RS resources from multiple sets of multiple TRPs for mTRP measurement and CJT/NCJT transmission, for example, due to UE moving and blockage. In some scenarios, the UE can be served by at least two dominant TRPs (larger receiving powers from the at least two dominant TRPs). The non-dominant TRPs can be switched off or used for other UEs. A flexible design for a network and a UE to select appropriate TRPs for mTRP measurement and transmission is described herein.

Figure 26:
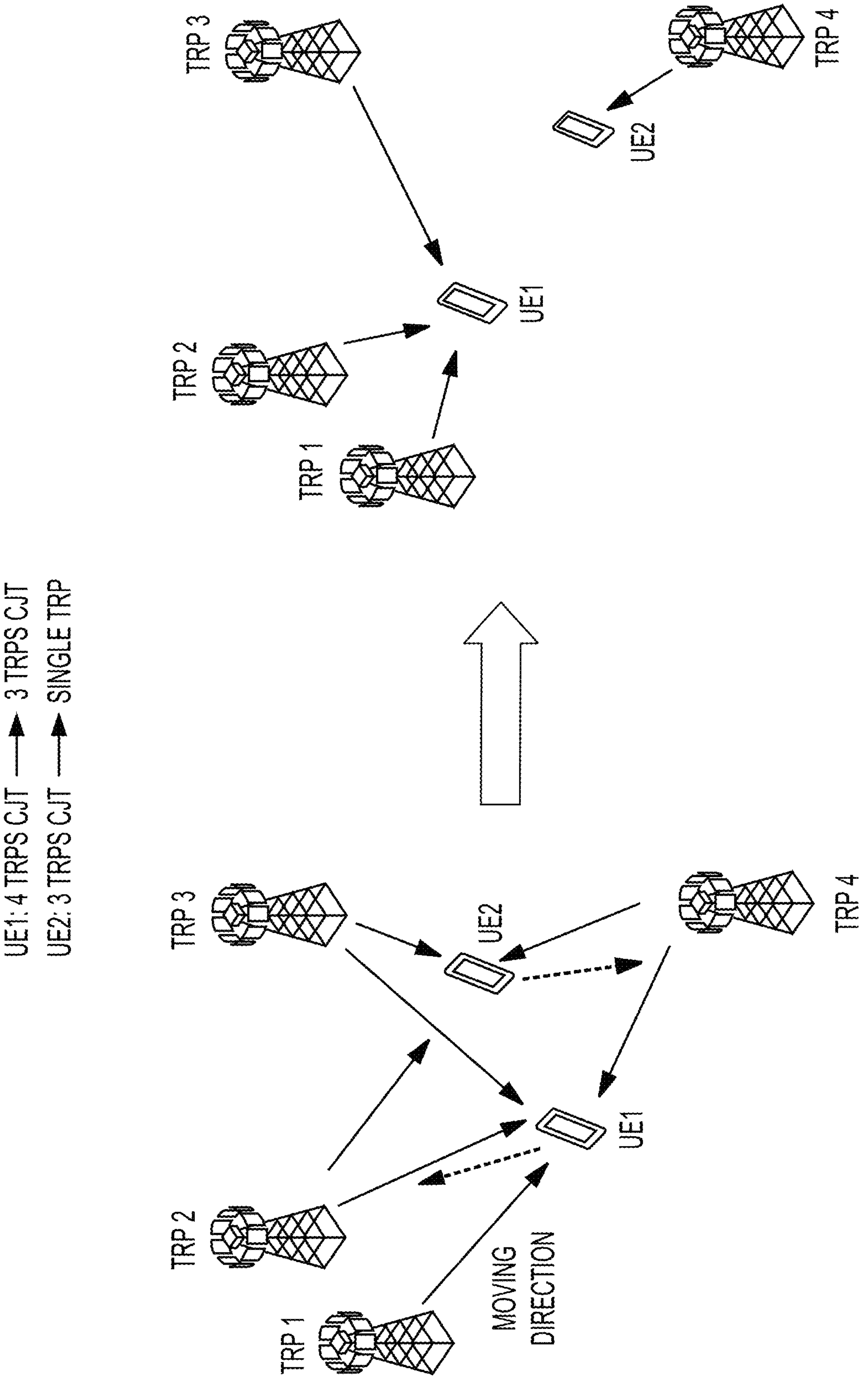
FIG. 26 shows an example where different sets of mTRPs can be switched to serve a UE due to mobility of the UE.

FIG. 26 shows an example where different sets of mTRPs can be switched to serve a UE due to mobility of the UE. As shown, UE1 is originally served by 4 TRPs from TRP1 to TRP4 and later served by 4 TRPs from TRP1 to TRP3. UE2 is originally served by 3 TRPs from TRP2 to TRP3 and layer served by 1 TRP4.

In an example, a UE can perform, for example, RSRP and RSRQ, measurement on a set of measurement objections {TRP1, TRP2, TRP3, TRP4, TRP5, TRP6, TRP7, TRP8}. A network can decide one or more mTRP measurement sets for the UE base on the measurement results reported from the UE. The network can configure a CSI report configuration with multiple CSI-RS resources and one or more CRIs for the UE to perform CSI measurement and reporting. For example, the multiple CSI-RS resources can be transmitted from multiple TRPs of the mTRP measurement sets. The one or more CRIs can be associated to the one or more mTRP measurement sets. For example, the measurement sets associated to the CRIs for CSI measurement and estimation can be one of more of {TRP1, TRP2, TRP3}, {TRP1, TRP2}, {TRP2, TRP3}, {TRP1, TRP3}, {TRP1}, {TRP2}, or {TRP3}.

Based on the CSI report configuration, the UE can estimate and feedback a CSI report to the network. The UE may indicate which CRIs are better or which TRPs may not be needed (which TRPs may be more important) in the CSI report. The network may select TRPs to transmit PDSCH, PDCCH, and the like, for the UE based on the CSI report. For example, the selected set for mTRP transmission based on the CSI report can be {TRP1, TRP2, TRP3}. Alternatively, the UE may perform the selection and report the selection results to the base station.

$$W = W_0 W_1 W_2 W_f^H W = W_1 W_0 W_2 W_f^H$$

Figure 27:
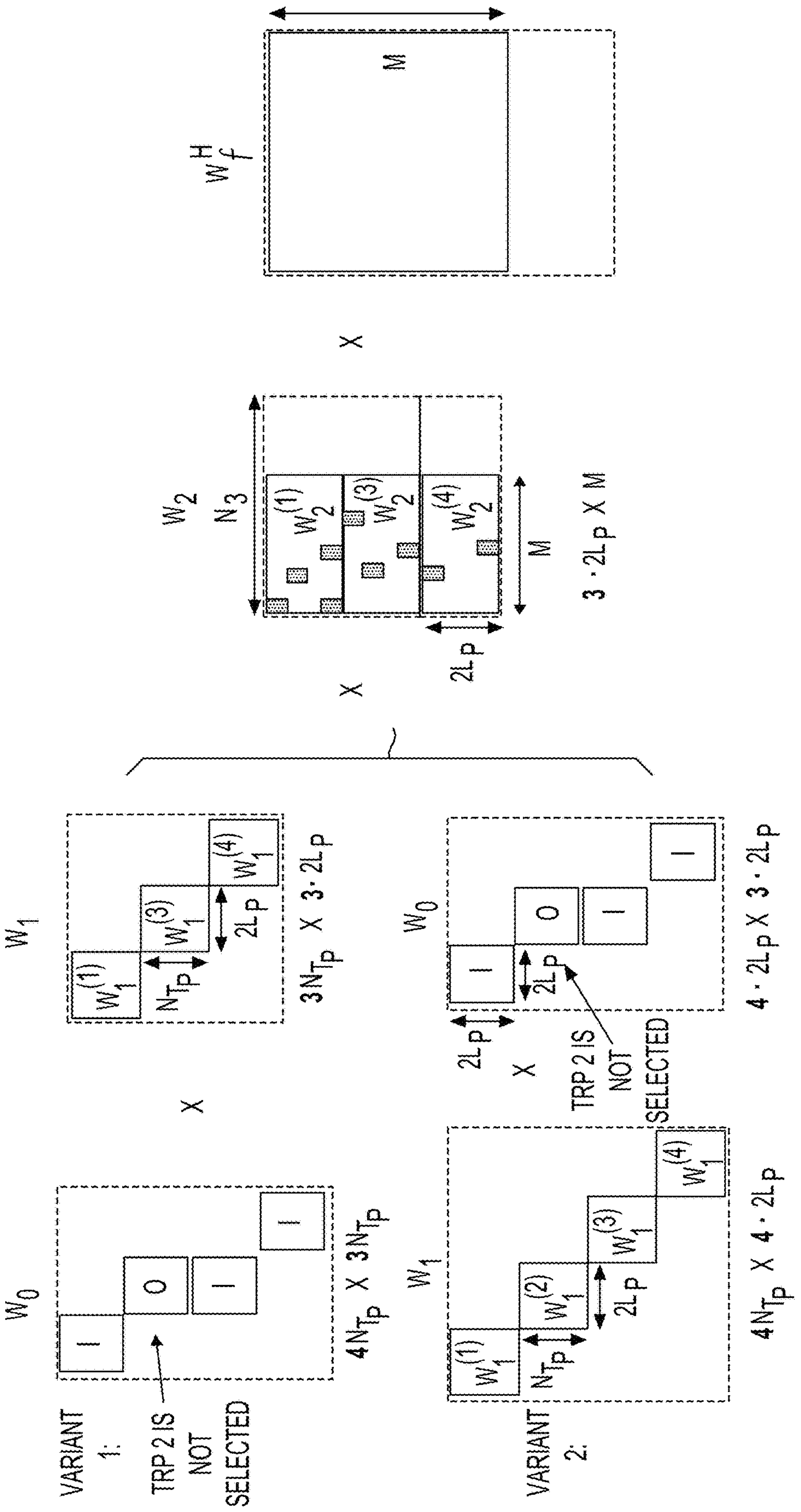
FIG. 27 shows two types (two variants) of codebook structures for CSI feedback.

Based on the Type II codebook structure described herein, in some embodiments, a TRP selection matrix $W_0$ is introduced for CSI feedback from a UE to a network. FIG. 27 shows two types (two variants) of codebook structures for CSI feedback. The two types of codebook structures are based on the Type II codebook structure and the TRP selection matrix $W_0$. The two types of codebook structure can take the following forms:

$$W = W_0 W_1 W_2 W_f^H W = W_1 W_0 W_2 W_f^H; \quad \text{Variant 1}$$

$$W = W_0 W_1 W_2 W_f^H W = W_1 W_0 W_2 W_f^H. \quad \text{Variant 2}$$

The examples shown in FIG. 27 correspond to a scenario where there are 4 candidate TRPs at the network side and each TRP has $N_{Tp}$ antenna ports. In a CSI report process, the UE can measure CSI-RS from the 4 TRPs. Based on the measurement results, the UE can provide a CSI report to the network. The CSI report can indicate the selected TRPs and the associated precoder. For example, the CSI report can include information about the matrices $W_0$, $W_1$, $W_2$, and/or $W_f$ shown in FIG. 27.

$W_0$ is a TRP/ports/beam selection matrix. $W_0$ can be used to dynamically report the CSI for specific TRPs/ports. As shown in FIG. 27, the TRP selection matrix can include multiple submatrices. Each submatrix has a size of $N_{Tp}$ by $N_{Tp}$ (or $2L_p \times 2L_p$). Each submatrix corresponds to one of the 4 candidate TRPs, respectively. For a TRP not selected (e.g., the second one of the 4 TRPs), the corresponding submatrix can be a zero matrix (each element being zero). For a TRP being selected, (e.g., the first, third, or fourth TRP), the corresponding submatrix can be an identity matrix.

For variant 1, the feedback overhead can be reduced. By this variant, the network may not know the SD information of non-selected TRPs. For variant 2, SD information of all TRPs within the coordination set can be reported in $W_1$. The network can use the non-selected TRPs to serve another UEs, or the network can use the SD information of the non-selected TRPs to mitigate the inter-TRP interference. Further, for variant 2, $W_1$ can be reported wideband and $W_0$ can be reported subband, based on subband precoder coefficients. In some examples, a network can use RRC, MAC CE, or DCI signaling to configure whether selection matrix $W_0$ is used. In some examples, the TRPs/ports selection criteria can be based on TRP power efficiency, channel correlation or capacity, interference mitigation, or the like.

Example #10—Dynamic TRP Selection $$i_0 i_0 \binom{N_p}{N'_p} N_p N'_p \binom{N_p}{N'_p} N_p N'_p N'_p N_p N_p N'_p N_p N'_p$$

In an example, when the network uses RRS signaling to configure a UE to report the TRP matrix $W_0$, the UE can report a TRP selection indicator to represent the TRP selection matrix $W_0$. For example, the TRP selection indicator can have an integer value in arrange of $$i_0 i_0 \binom{N_p}{N'_p} N_p N'_p \binom{N_p}{N'_p} N_p N'_p N'_p N_p N_p N'_p N_p N'_p \{0, 1, 2, \ldots ,\},$$

$$i_0 i_0 \binom{N_p}{N'_p} N_p N'_p \binom{N_p}{N'_p} N_p N'_p N'_p N_p N_p N'_p N_p N'_p$$

where is the number of candidate TRPs or TRPs configured by the network, is the number of serving TRPs selected by the UE, and is the total number of possibilities of different $W_0$ given and (the combinations of selecting TRPs from candidate TRPs). In an example, the values of and can be signaled from the network to the UE. In some examples, the values of and can be determined based on negotiations between the network and the UE based on consideration of network capacity, number of UEs to be served, UE capabilities, UE requests, and the like.

In some examples, $W_0$ may be mapped to CRI feedback. In the case of a single TRP being used for transmission, a UE typically selects one CRI to feedback the best BS beam or a TRP selected from candidate TRPs for RI/PMI/CQI feedback. In the case of mTRP joint transmission (JT), the UE may select and report multiple CRIs mapping to multiple TRPs for NCJT/CJT RI/PMI/CQI feedback. There is a mapping relationship between the TRP selection matrix $W_0$ and the selection of CRIs (e.g., represented by a bit map).

For the report of $W_1$, in an example, in case of the structure of $W=W_0W_1W_2W_f$ being used, the UE can avoid feedback of $W_1$ information of non-selected TRPs. As shown in the Variant 1 structure in FIG. 27, the submatrix corresponding to the second TRP (TRP2) is not reported in the CSI report because the second TRP is not selected. In this way, a signaling cost can be saved. In the case of the structure of $W=W_1W_0W_2W_f$ being used, the UE can still feedback $W_1$ information of non-selected TRPs.

For the report of $W_2$ and $W_f$, the UE can avoid reporting information of non-selected TRPs to save feedback overhead. For example, one or more indicators are predefined or configured for reporting the information carried in $W_2$ and $W_f$. For a TRP not selected, the respective indicators corresponding to the un-selected TRPs can be removed from being reported.

VI. CSI Report Configuration

In some embodiments, a CSI report configuration can be configured by higher layer (above physical layer) signaling, such as MAC CE and RRC. The CSI report configuration can include one or more codebook configurations. One codebook configuration can include at one or more antenna configurations $(N_1,N_2)$ for precoder estimation and selection. For example, one antenna configuration $(N_1, N_2)$ can correspond to one CSI-RS resource or resource group. FIG. 28A shows an example of a CSI report configuration. The CSI report configuration includes a codebook configuration. FIG. 28B shows an example of a codebook configuration. The codebook configuration includes codebook subset restriction information. The subset restriction information includes a set of antenna configurations $(N_1,N_2)$. Each antenna configuration (N1,N2) corresponds to a CSI-RS resource or a CSI-RS resource group.

In some examples, a CSI-RS resource set configured to a UE contains multiple resource groups. The UE can be configured one or more codebook configurations for precoder estimation and selection on the multiple resource groups. One codebook configuration can include one or more values of $(N_1,N_2)$. Each value of $(N_1,N_2)$ can correspond to a resource group. As shown in the FIG. 17 example, for the case of 1702, {TRP1, TRP2} are co-located. The CSI-RS {RS #1, RS #2} are included in the resource group 1. Accordingly, one antenna configuration (8,1) is provided for TRP1 and TRP2 together. Similarly, in the case of 1703, one antenna configuration (8,1) is provided for the resource group 2. In the case of 1704, two antenna configurations (8,1) and (8, 1) are provided for the resource groups 1 and 2, respectively.

In some embodiments, the CSI report configuration can include at least one power indicator to indicate how to scale at least the transmission power of at least one resource group belonging to a CRI or which TRPs share the same total power. For example, if a resource set includes only one resource or one resource group for single TRP transmission, the precoder power is usually normalized to one, and a power indicator is not needed. In other examples, at least one power indicator may be provided for mTRP CJT transmission, because different TRPs may use different transmission powers, and some TRPs may share the same power source or the same total power. The UE can use the at least one power indicator to estimate PMIs and CQIs for the CSI report.

Example #11—Power Indicator

In some examples, based on the at least one power indicator, the UE can understand which of the following power scaling methods or modes are used for TRP transmission.

Method1: Each TRP in a selected TRP set transmits with full power, i.e., the precoder used by $p^{th}$ TRP is $$\tilde{W}^{(p)}[n] = \frac{1}{\sqrt{c}} W^{(p)}[n],$$

where $$c_p = \frac{1}{v} \sum_{i=1}^{P_{CSI-RS}^{(p)}} \sum_{j=1}^{v} \left| \{W^{(p)}\}_{ij} \right|^2$$

and v is the transmission rank and $p \in \mathcal{S}$, the set of coherently serving TRPs. $\tilde{W}^{(p)}$ is TRP power scaled precoder. $W^{(p)}$ is UE reported CJT precoder.

Method2: At least one TRP in the selected TRP set, for example the $\hat{p}^{th}$ TRP, transmits with full power. The precoder used by $p^{th}$ TRP can be $$\tilde{W}^{(p)}[n] = \frac{1}{\sqrt{c}} W^{(p)}[n],$$

where $c=\max\{c_1, c_2, c_3, c_4\}$ and $\hat{p}=\arg\max\{c_1, c_2, c_3, c_4\}$.

The network may configure the UE which method is to be used by RRC or MAC CE signaling.

Example #12—Power Indicator

In some examples, a network (e.g., gNB) can signal a power indicator to a UE. The power indicator can indicate that at least one TRP in a selected TRP set, for example the $p^{th}$ TRP, transmits with full power. For example, the $p^{th}$ TRP with full power is determined by $p=\arg\max\{c_1, c_2, c_3, c_4\}$, where $$c_p = \frac{1}{v} \sum\nolimits_{i=1}^{P_{CSI-RS}^{(p)}} \sum\nolimits_{j=1}^{v} \left| \{W^{(p)}\}_{ij} \right|^2$$

is the precoder normalization factor of $p^{th}$ TRP, and v is the transmission rank and $p \in \mathcal{S}$, the set of coherently serving TRPs.

The precoder used by $p^{th}$ TRP is power scaled by a factor $c=\max\{c_1, c_2, c_3, c_4\}$ as follows, $$\tilde{W}^{(p)} = \frac{1}{\sqrt{c}} W^{(p)}$$

$\tilde{W}^{(p)}$ is TRP power scaled precoder. $W^{(p)}$ is UE reported CJT precoder. The precoder norm of $p^{th}$ TRP $\|\tilde{W}^{(\hat{p})}\|^2=1$ means the $\hat{p}^{th}$ TRP transmits full power.

The UE can use the power indicator to estimate CQIs for the CSI report.

Figure 29A:
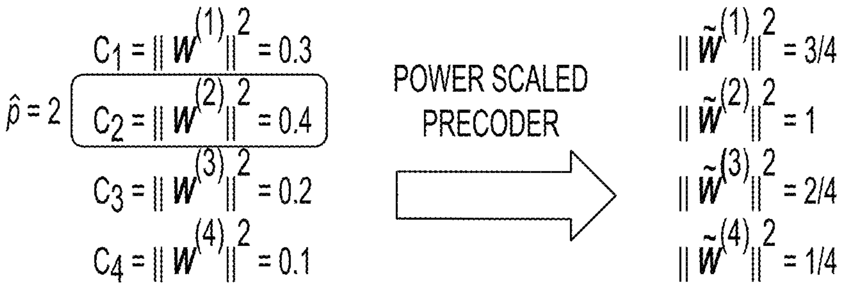
FIGS. 29A-29B show an example of 4 TRP CJT transmission scenario.
Figure 29B:
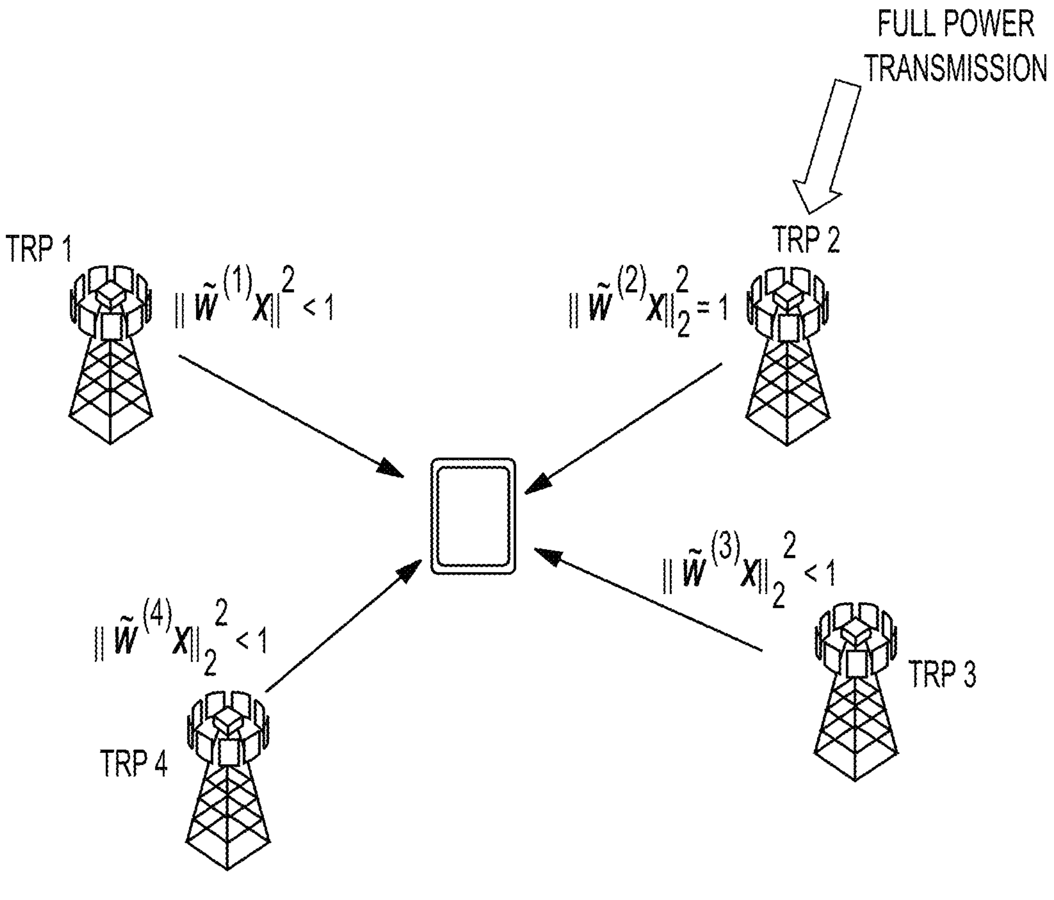

FIGS. 29A-29B show an example of 4 TRP CJT transmission scenario. The precoder normalization factors $\{c_1, c_2, c_3, c_4\}$ are determined to be {0.3, 0.4, 0.2, 0.1}. Accordingly, TRP2 is determined to transmit with full power. And the power scaling factor is determined to be 0.4. All 4 TRPs can be power scaled up by the same scaling factor. There is no effect on interference between TRPs. In an example, the UE and the network can each determine the precoder normalization factors and the scaling factors. In an example, the UE can report precoder normalization factors and/or the scaling factors to the network.

Example #13—Power Indicator

In some examples, the power indicator from the network can indicate to a UE that each TRP in the selected TRP set transmits with full power.

The precoder used by $p^{th}$ TRP is power scaled as:

$$\tilde{W}^{(p)} = \frac{1}{\sqrt{c_p}} W^{(p)},$$

where precoder normalization factor $c_p$ is defined same as in the above example. The precoder norm of each TRP$\|\tilde{W}^{(p)}\|^2=1$ means the each TRP transmits full power. The UE can use the power indicator to estimate CQIs for the CSI report.

Figure 30A:
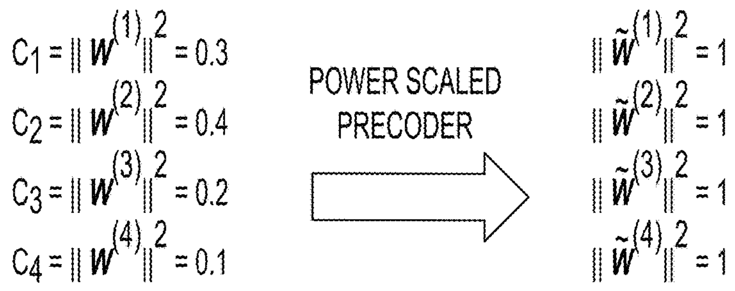
FIGS. 30A-30B show an example of 4 TRP CJT transmission scenario.
Figure 30B:
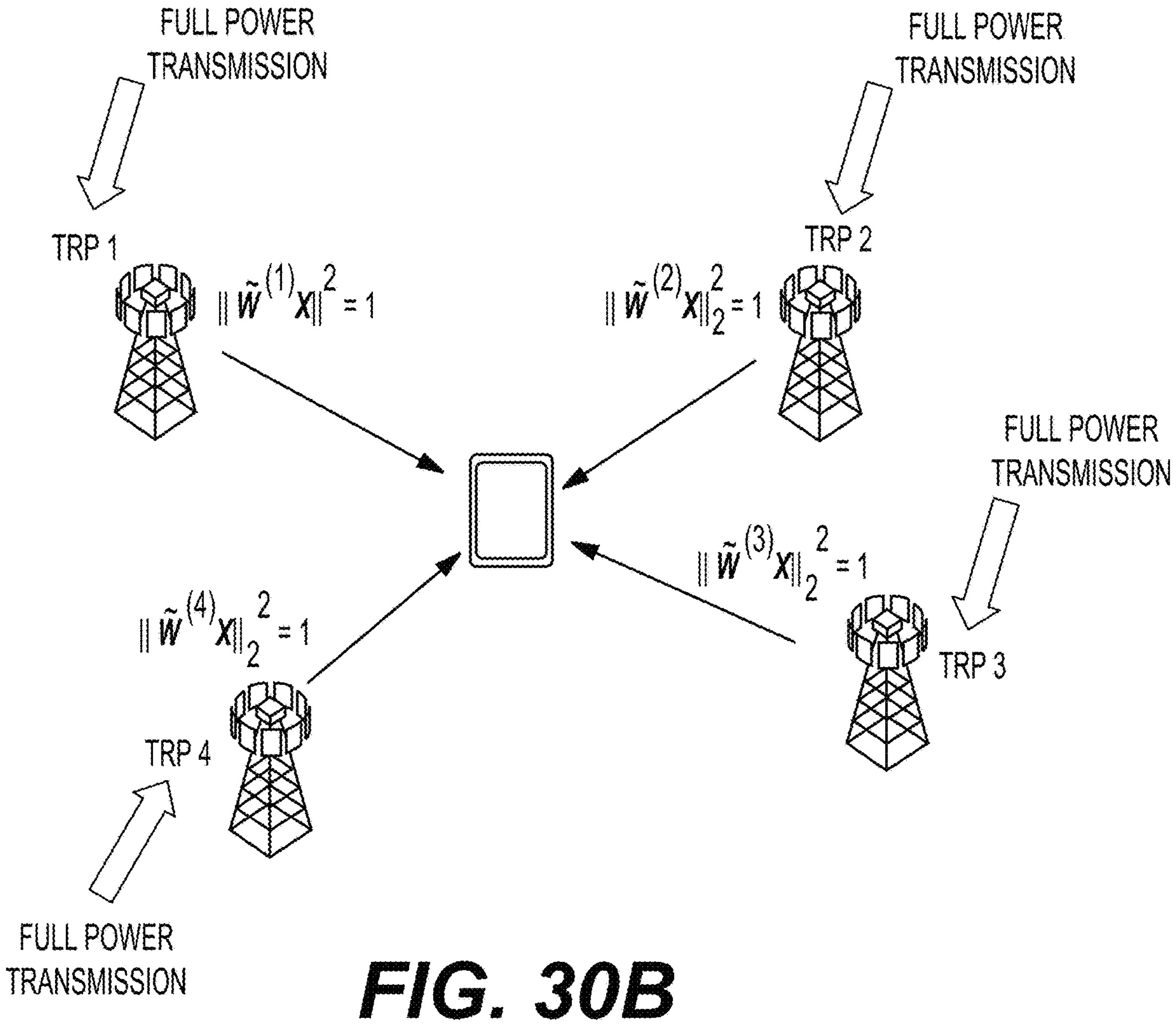

FIGS. 30A-30B show an example of 4 TRP CJT transmission scenario. The precoder normalization factors $\{c_1, c_2, c_3, c_4\}$ are determined to be {0.3, 0.4, 0.2, 0.1}. All TRPs are performing full power transmission. All 4 TRPs can be power scaled up by different scaling factors. Interference between TRPs may increase. In an example, the UE and the network can each determine the precoder normalization factors and the scaling factors. In an example, the UE can report precoder normalization factors and/or the scaling factors to the network.

VIII. CSI Feedback Reduction for mTRP and sTRP Joint Report

In some embodiments, for mixing mTRP NCJT/CJT CSI and sTRP CSI in a CSI report, the UE can be configured with multiple CSI-RS resource indicators (CRIs) to indicate which CSI information to be estimated. FIG. 15A provides an example of such configuration. One CRI can indicate at least one CSI-RS resource belonging to at least one resource group. CRI indexing of sTRP CSI and mTRP CSI can be separated. For a CSI report including sTRP CSI and mTRP CSI, mTRP CSI may reuse sTRP CSI to reduce the content size of mTRP CSI.

In some examples, a UE can be configured with the same codebook type for sTRP CSI and mTRP CSI feedback in a CSI report configuration. A common codebook design can have a precoder structure $W=W_1W_2$ (e.g., 3GPP NR DL Type I codebook and Release 15 Type II codebook) or $$W = W_1 W_2 W_f^H$$

(e.g., NR DL Release 16 Type II codebook). Based on the codebook and precoder deriving designs disclosed herein, the CSI report may reuse $W_1$, $W_1W_2$, or $$W_1 W_2 W_f^H$$

of sTRP CSI and reduce the content size of mTRP CSI. The UE can be configured with CSI feedback reduction information by the CSI report configuration, for example.

Example #14—CSI Feedback Reduction

In some examples, based on codebook and precoder deriving designs for mTRP CSI, for example, based on NR Rel.17 NCJT CSI framework, or other CSI frameworks, a UE may reuse $W_1$, $W_1W_2$, or $$W_1 W_2 W_f^H$$

of sTRP CSI and reduce the content size of mTRP CSI. For example, a UE is configured to measure and feedback TRP1, TRP2, and TRP3 sTRP CSI and mTRP CSI in a CSI report. The UE can measure and derive sTRP precoders of TRP1, TRP2, and TRP3 separately, and reuse $W_1$ or $W_1W_2$ of the sTRP precoders on mTRP precoder deriving and feedback. For example, the sTRP precoders of TRP1, TRP2, and TRP3 can be $$TRP1\ W^{(1)} = W_1^{(1)} W_2^{(1)} W_f^{H(1)}$$

$$TRP2\ W^{(2)} = W_1^{(2)} W_2^{(2)} W_f^{H(2)}$$

$$TRP3\ W^{(3)} = W_1^{(3)} W_2^{(3)} W_f^{H(3)}$$

The $W_1$ matrix of the mTRP precoder can be $$W_1 = \begin{bmatrix} W_1^{(1)} & & \\ & W_1^{(2)} & \\ & & W_1^{(Np)} \end{bmatrix}$$

The CSI report may not include $W_1$ or $W_1W_2$ of mTRP precoders if the UE is configured by RRC or MAC CE.

Example #15—CSI Feedback Reduction

In some examples, a network may configure a UE to reuse $W_1W_2$, or $$W_1 W_2 W_f^H$$

of sTRP CSI and feedback additional precoder information for mTRP CSI in a CSI report. The additional precoder information can include cyclic phase delay (CDD) parameters or an index of a matrix to apply phase shifts on each layer or combine multiple layers to less layers, as shown below.

For example, a UE is configured to measure and feedback TRP1, TRP2, and TRP3 sTRP CSI and mTRP CSI in a CSI report. The sTRP precoders of TRP1, TRP2, and TRP3 can be $$TRP1\ W^{(1)} = W_1^{(1)} W_2^{(1)} W_f^{H(1)}$$

$$TRP2\ W^{(2)} = W_1^{(2)} W_2^{(2)} W_f^{H(2)}$$

$$TRP3\ W^{(3)} = W_1^{(3)} W_2^{(3)} W_f^{H(3)}$$

The mTRP {TRP1, TRP2, TRP3} precoder can be W(i)=

$$\begin{bmatrix} W^{(1)}(i)D^{(1)}(i)U \\ W^{(2)}(i)D^{(2)}(i)U \\ W^{(3)}(i)D^{(3)}(i)U \end{bmatrix},$$

in which i is subcarrier index and matrices D and U are CDD part of precoding. The matrices D and U can be Identity matrices with a size of (layer number of $W^{(k)}$, layer number of $W^{(k)}$) or other CDD matrices, such as 3GPP 36.211 V10.7.0 subsection 6.3.4.2.2 CDD designs as shown below:

$$\begin{bmatrix} y^{(0)}(i) \\ \vdots \\ y^{(Nt-1)}(i) \end{bmatrix} = \begin{bmatrix} W^{(1)}(i)D^{(1)}(i)U \\ W^{(2)}(i)D^{(2)}(i)U \\ W^{(3)}(i)D^{(3)}(i)U \end{bmatrix} \begin{bmatrix} x^{(0)}(i) \\ \vdots \\ x^{(Nt-1)}(i) \end{bmatrix},$$

in which v is the layer number of $W^{(k)}$ and Nt is the total TX antenna number. Examples of D and U are provided in the table below.

| v | U | D(i) |
|---|---|---|
| 2 | $\frac{1}{\sqrt{2}}\begin{bmatrix} 1 & 1 \\ 1 & e^{-j2\pi/2} \end{bmatrix}$ | $\begin{bmatrix} 1 & 0 \\ 0 & e^{-j2\pi i/2} \end{bmatrix}$ |
| 3 | $\frac{1}{\sqrt{3}}\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi i/3} & 0 \\ 0 & 0 & e^{-j4\pi i/3} \end{bmatrix}$ |

Example #16—CSI Feedback Reduction

For example, a UE is configured to measure and feedback TRP1, TRP2, and TRP3 sTRP CSI and mTRP CSI in a CSI report. The sTRP precoders of TRP1, TRP2, and TRP3 can be $$TRP1\ W^{(1)} = W_1^{(1)} W_2^{(1)} W_f^{H(1)}$$

$$TRP2\ W^{(2)} = W_1^{(2)} W_2^{(2)} W_f^{H(2)}$$

$$TRP3\ W^{(3)} = W_1^{(3)} W_2^{(3)} W_f^{H(3)}$$

$$W(i) = \begin{bmatrix} W^{(1)}(i) & & \\ & W^{(2)}(i) & \\ & & W^{(3)}(i) \end{bmatrix} \Phi(i)\Phi(i)\Phi(i)\Phi(i) = \begin{bmatrix} e^{j\phi(i,1)} & 0 & 0 \\ 0 & \ddots & 0 \\ 0 & 0 & e^{j\phi(i,v)} \end{bmatrix} \Phi(i)v \times vvW(i)\Phi(i)\Phi(i)$$

The $mTRP$ $\{TRP1, TRP2, TRP3\}$ precoder can be $$W(i) = \begin{bmatrix} W^{(1)}(i) & & \\ & W^{(2)}(i) & \\ & & W^{(3)}(i) \end{bmatrix} \Phi(i)\Phi(i)\Phi(i)\Phi(i) = \begin{bmatrix} e^{j\phi(i,1)} & 0 & 0 \\ 0 & \ddots & 0 \\ 0 & 0 & e^{j\phi(i,v)} \end{bmatrix} \Phi(i)v \times vvW(i)\Phi(i)\Phi(i),$$

$$W(i) = \begin{bmatrix} W^{(1)}(i) & & \\ & W^{(2)}(i) & \\ & & W^{(3)}(i) \end{bmatrix} \Phi(i)\Phi(i)\Phi(i)\Phi(i) =$$

-continued $$\begin{bmatrix} e^{j\phi(i,1)} & 0 & 0 \\ 0 & \ddots & 0 \\ 0 & 0 & e^{j\phi(i,v)} \end{bmatrix} \Phi(i) v \times vvW(i)\Phi(i)\Phi(i)$$

in which i is subcarrier or subband index, and can be a matrix to apply phase shifts on each layer or combine multiple layers to less layers. If is a matrix to apply phase shifts, it can be. is an diagonal matrix comprising phases. is the layers number of. can be designed to apply phase shifts, amplitude changes, and layer combining. Some examples of are provided below.

| | Examples of Φ (i) |
|---|---|
| Combining 2 layers to 1 layer | $\begin{bmatrix} e^{j\phi(i,1)} \\ e^{j\phi(i,2)} \end{bmatrix}, \begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix}$ |
| Combining 4 layers to 1 layer | $\begin{bmatrix} e^{j\phi(i,1)} \\ e^{j\phi(i,2)} \\ e^{j\phi(i,3)} \\ e^{j\phi(i,4)} \end{bmatrix}, \begin{bmatrix} 1 \\ 1 \\ 1 \\ 1 \end{bmatrix}, \begin{bmatrix} 1 \\ 1 \\ j \\ j \end{bmatrix}, \begin{bmatrix} 1 \\ 1 \\ -1 \\ -1 \end{bmatrix}, \begin{bmatrix} 1 \\ 1 \\ -j \\ -j \end{bmatrix}, \begin{bmatrix} 1 \\ j \\ 1 \\ j \end{bmatrix}, \begin{bmatrix} 1 \\ j \\ j \\ -1 \end{bmatrix}, \begin{bmatrix} 1 \\ j \\ -1 \\ -j \end{bmatrix}, \begin{bmatrix} 1 \\ j \\ -j \\ 1 \end{bmatrix}, \begin{bmatrix} 1 \\ -1 \\ -1 \\ 1 \end{bmatrix}, \begin{bmatrix} 1 \\ -1 \\ -j \\ 1 \end{bmatrix}, \begin{bmatrix} 1 \\ -j \\ 1 \\ -j \end{bmatrix}, \begin{bmatrix} 1 \\ -j \\ j \\ 1 \end{bmatrix}, \begin{bmatrix} 1 \\ -j \\ -1 \\ j \end{bmatrix}, \begin{bmatrix} 1 \\ -j \\ -j \\ -1 \end{bmatrix}$ |

IX. Codebook Designs based on Release 17 feType II PS Codebook

1. $W_1$ Design:

In some examples, there can be two possible designs for $W_1$ matrix.

Per TRP port selection

Across TRP port selection

For per TRP port selection, in some examples, a gNB can transmit $$P_{CSI-RS} = \sum_{p=1}^{N_P} 2L_p$$

precoded CSI-RS, where $N_P$ is the number of coordinating TRPs, and $2L_p$ represents the number of SD/SD-FD pairs (precoded CSI-RS ports) in the $p^{th}$ coordinating TRP. A simple example for this kind of precoded CSI-RS is when gNB determines SD/FD basis per TRP. The UE can further select $$N'_P$$

serving TRPs out of $N_P$ coordinating TRPs by $W_0$. The UE can select $2K_{p'}$ ports out of $2L_{p'}$ ports for the $p'^{th}$ serving TRP. This selection can be polarization common and free, i.e., $K_{p'}$ ports are selected out of $L_{p'}$ ports from $$\binom{L_{p'}}{K_{p'}}$$

possible combinations.

Figure 31:
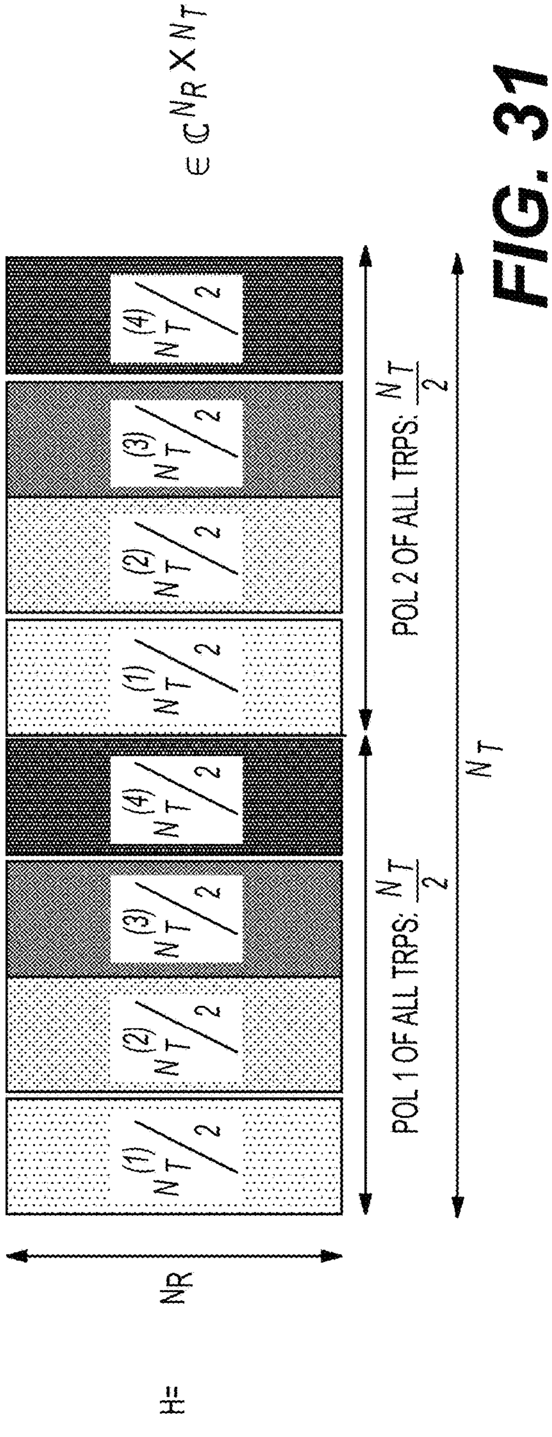
FIG. 31 shows an example that a gNB may derive the SD/FD bases from a joint mTRP channel.

For across TRP port selection, it can be expected that from UL channel acquisition, a gNB can perform coordinated beamformed CSI-RS transmission from all coordinating TRPs. For example, the gNB may derive the SD-FD bases from the joint mTRP channel as shown in FIG. 31 (gNB implementation issue). Based on UL channels, the gNB may even transmit precoded CSI-RS with different powers from different TRPs.

Figure 32:
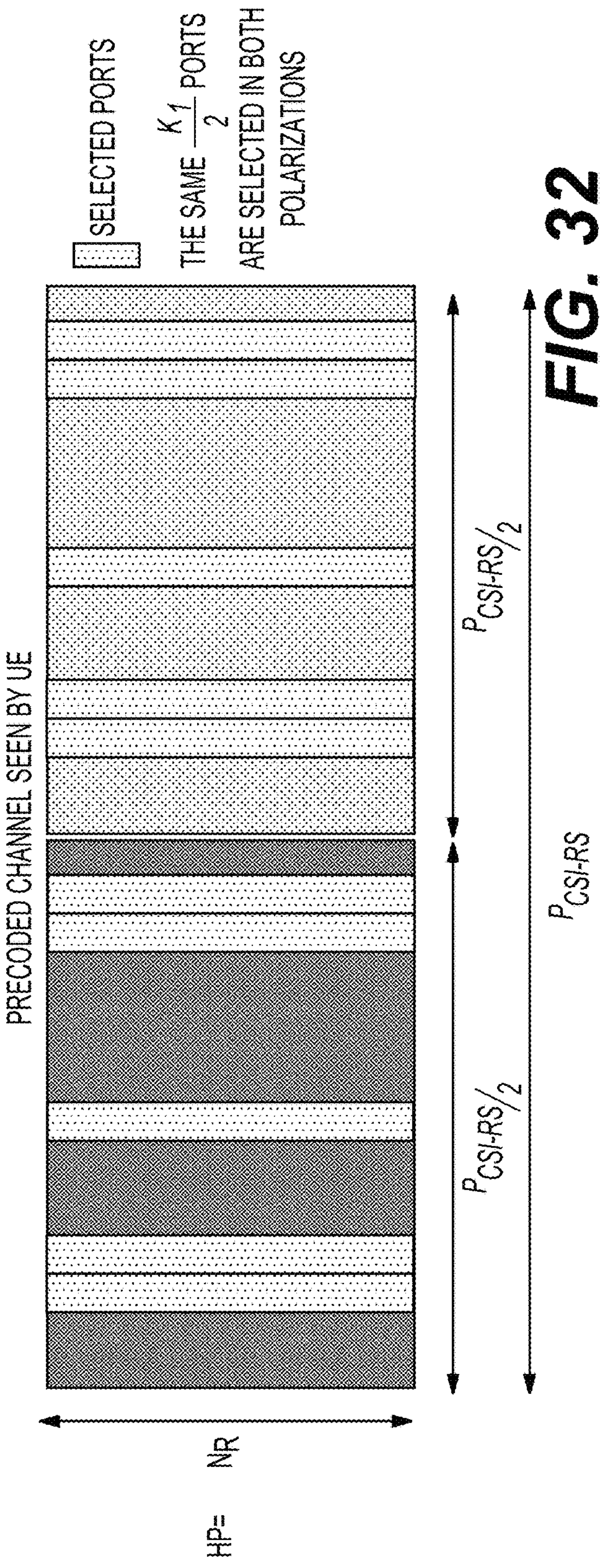
FIG. 32 shows an example that the UE can select $K_1$ ports out of $P_{CSI-RS}$ ports in a polarization common and free manner.

The total number of precoded (beamformed) CSI-RS ports can be $P_{CSI-RS}$. The UE can select $K_1$ ports out of $P_{CSI-RS}$ ports in a polarization common and free manner from $$\binom{\frac{P_{CSI-RS}}{2}}{\frac{K_1}{2}}$$

combinations, as shown in FIG. 32.

2. $W_2$ Design:

There can be two possible designs depending on which method of $W_1$ is used. For per TRP $W_1$, it can be expected that the same design rationale of $W_2$ Design disclosed above can be used. For across TRP $W_1$, the UE essentially sees the multiple TRPs as a single giant TRP and does port selection on a single precoded mTRP channel as explained above, so the $W_2$ design can follow legacy Rel-17 $W_2$ design.

3. $W_f$ Design:

In 3GPP Release 17 design, N=2 or N=4 consecutive DFT vectors starting from 0 are configured to the UE, from which UE selects M=2 vectors for $W_f$. Since most of the frequency selectivity in the channel can be taken care by precoded CSI-RS, the main purpose of this $W_f$ is to compensate for residual frequency selectivity and imperfect delay reciprocity. Further, $W_f$ design can consider TRP specific FD basis selection. For example, TRP p selects $\mathcal{M}_p$ FD bases out of N=2 or N=4 consecutive DFT vectors. However the number of selected FD bases is $|\mathcal{M}_p|$=M=2 for all TRPs, such that $$\bigcup_{p=1}^{N_P} \mathcal{M}_p = \{f_0, f_1, \ldots f_{N-1}\}.$$

That is, union of per TRP FD bases vectors is the overall configured N FD bases.

X. Further Examples of mTRP Measurement and Transmission

In a first example, a method for wireless communications by a User Equipment (UE) comprising:

- receiving signaling from a network entity to indicate a Channel State Information (CSI) report configuration including at least one codebook configuration and at least one of at least one power indicator and CSI feedback reduction information, and associating at least one CSI-RS resource configuration for channel measurement, wherein the at least one CSI-RS resource configuration associates at least two resource groups and at least one channel measurement selection information;
- estimating channel information based on the CSI report configuration;
- deriving at least one Precoding Matrix Indicator (PMI) and Channel Quality Indicator (CQI) based on the estimated channel information and the at least one of at least one power indicator, and CSI feedback reduction information; and
- transmitting a CSI report to the network entity.

In a second example based on the first example, the at least one channel measurement selection information indicates which CSI-RS resources should be estimated for deriving the at least one PMI;

In a third example based on the first example, each resource group comprises at least one CSI-RS resource and the UE considers that the at least one CSI-RS resource in a resource group is transmitted from co-located geographical locations.

In a fourth example based on the second example, the UE considers that the CSI-RS resources indicated by one of the at least one channel measurement selection information is transmitted simultaneously for JT transmission if the one of the at least one channel measurement selection information indicates at least two CSI-RS resources belonging to at least two different resource groups.

In a fifth example based on the first example, the at least one codebook configuration indicates at least one codebook parameter set associated with the at least one CSI-RS resource configuration or at least one channel measurement selection information.

In a sixth example based on the fifth example, the at least one codebook parameter set comprises at least one of the following information(s)

- The number of beam vectors, $L_p$, associated with the p-th CSI-RS resource or resource group indicated by the corresponding channel measurement selection information.
- The NZC selection ratio, $\beta_p$, associated with the p-th CSI-RS resource or resource group indicated by the corresponding channel measurement selection information.

In a seventh example based on the first example, each PMI is derived from at least two of $W_1$, $W_2$ and $W_f$ codebook matrices.

In an eighth example based on the seventh example, the $W_1$ codebook matrix has block diagonal structure with at least two submatrices in its diagonal, and the p-th submatrix of the at least two submatrices contains the spatial beam vectors associated with the p-th CSI-RS resource or resource group indicated by the corresponding channel measurement selection information.

In a ninth example based on the seventh example, the $W_2$ codebook matrix contains the complex linear combining coefficients of the beam vectors in $W_1$, and of the DFT-based delay vectors in $W_f$.

In a tenth example based on the seventh example, the $W_f$ codebook matrix contains the DFT-based delay vectors.

In an eleventh example based on the seventh example, each PMI is further derived from a resource selection matrix $W_0$ and $W_0$ indicates which CSI-RS resource or resource group indicated by the corresponding channel measurement selection information is more important.

In a twelfth example based on the eleventh example, the network entity uses higher layer signaling to indicate UE whether the resource selection matrix $W_0$ is used.

In a thirteenth example based on the seventh example, the precoding coefficient of $W_1$, $W_2$ and $W_f$ further consider the at least one power indicator for power scaling, wherein the at least one power indicator is indicated via higher layer signaling by the network entity.

In a fourteenth example based on the first example, the at least one CQI is calculated and reported based on the at least one power indicator.

In a fifteenth example based on the first example, each codebook configuration associates one of the at least one channel measurement selection information.

In a sixteenth example based on the seventh example, the $W_1$ codebook matrix has block diagonal structure with at least two submatrices in its diagonal, and the p-th submatrix of the at least two submatrices is a selection matrix comprising a single non-zero element in every column and is associated with the p-th CSI-RS resource or resource group indicated by the corresponding channel measurement selection information.

XI. Further Examples of mTRP Measurement and Transmission

Figure 33:
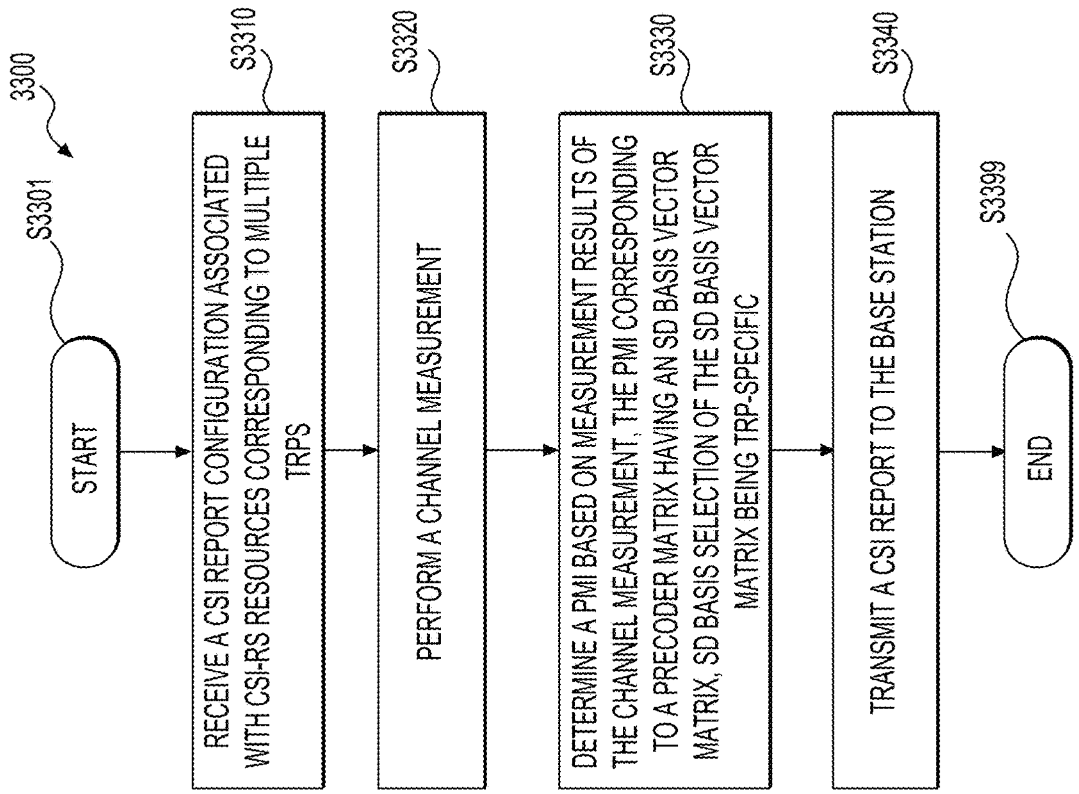
FIG. 33 shows a process 3300 of mTRP CSI measurement and report according to embodiments of the disclosure.

FIG. 33 shows a process 3300 of mTRP CSI measurement and report according to embodiments of the disclosure. The process 3300 can start from S3301 and proceed to S3310.

At S3310, a CSI report configuration can be received at a UE from a base station. The CSI report configuration is associated with a set of CSI-RS resources. Each CSI-RS resource can correspond to one or more of multiple TRPs.

At S3320, a channel measurement can be performed based on the CSI-RSs resources transmitted from the multiple TRPs.

At S3330, a PMI can be determined based on measurement results of the channel measurement. The PMI can correspond to a precoder matrix, denoted W, of a Type II CSI codebook. For example, the PMI may include multiple indicators indicating elements belonging to the precoder matrix. The precoder matrix can have an SD basis vector matrix, denoted $W_1$. SD basis selection of the SD basis vector matrix can be TRP-specific. For example, the SD bases may be selected for each TRP. Each TRP may have a corresponding set of SD basis vectors.

At S3340, a CSI report can be transmitted to the base station. The CSI report can include the PMI. The process 3300 can proceed to S3399 and terminate at S3399.

Figure 34:
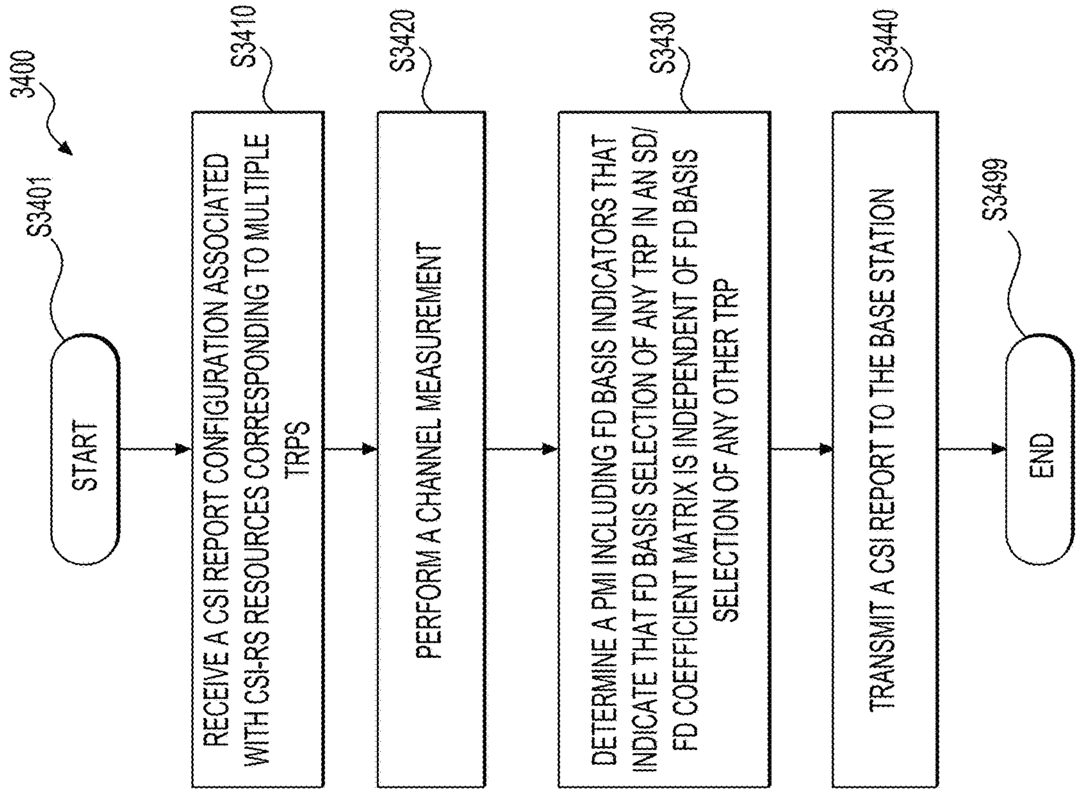
FIG. 34 shows another process 3400 of mTRP CSI measurement and report according to embodiments of the disclosure.

FIG. 34 shows another process 3400 of mTRP CSI measurement and report according to embodiments of the disclosure. The process 3400 can start from S3401 and proceed to S3410.

At S3410, a CSI report configuration can be received at a UE from a base station. The CSI report configuration is associated with a set of CSI-RS resources. Each CSI-RS resource can correspond to one or more of multiple TRPs.

At S3420, a channel measurement can be performed based on the CSI-RSs resources transmitted from the multiple TRPs.

At S3430, A PMI can be determined based on measurement results of the channel measurement. The PMI can correspond to a precoder matrix, denoted W, of a Type II CSI codebook. The precoder matrix can have an SD/FD coefficient matrix (or referred to as a linear combination coefficient matrix), denoted $W_2$. Rows of coefficients in the SD/FD coefficient matrix correspond to SD basis vectors in an SD basis vector matrix, denoted $W_1$. Columns of coefficients in the SD/FD coefficient matrix correspond to FD basis vectors in an FD basis vector matrix, denoted $W_f$. The PMI includes FD basis indicators. The FD basis indicators indicate that FD basis selection of any TRP in the SD/FD coefficient matrix is independent of FD basis selection of any other TRP.

At S3440, a CSI report can be transmitted to the base station. The CSI report can include the PMI. The process 3400 can proceed to S3499 and terminate at S3499.

Figure 35:
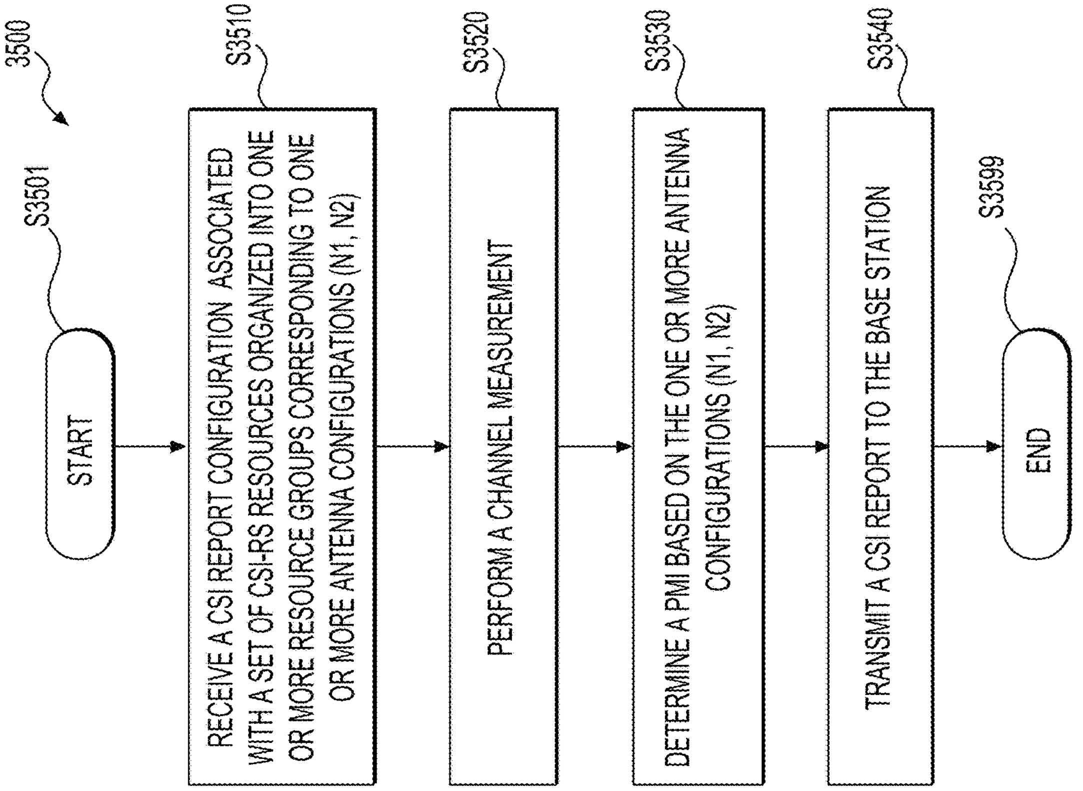
FIG. 35 shows another process 3500 of mTRP CSI measurement and report according to embodiments of the disclosure.

FIG. 35 shows another process 3500 of mTRP CSI measurement and report according to embodiments of the disclosure. The process 3500 can start from S3501 and proceed to S3510.

At S3510, a CSI report configuration can be received at a UE from a base station. The CSI report configuration can be associated with a set of CSI-RS resources. Each CSI-RS resource can correspond to one or more of multiple TRPs. The CSI-RS resources can be organized into one or more resource groups. The CSI report configuration includes one or more antenna configurations (N1, N2). Each antenna configuration corresponds to one or more of the multiple TRPs. The one or more antenna configurations correspond to the one or more resource groups, respectively. N1 and N2 being numbers of antenna ports of the respective one or more TRPs of the same polarization direction in the vertical and horizontal directions, respectively.

At S3520, a channel measurement can be performed based on the CSI-RS resources corresponding to the multiple TRPs.

At S3530, a PMI can be based on measurement results of the channel measurement and the one or more antenna configurations (N1, N2).

At S3540, a CSI report can be transmitted to the base station. The CSI report can include the PMI. The process 3500 can proceed to S3599 and terminate at S3599.

XII. Exemplary Apparatus

Figure 36:
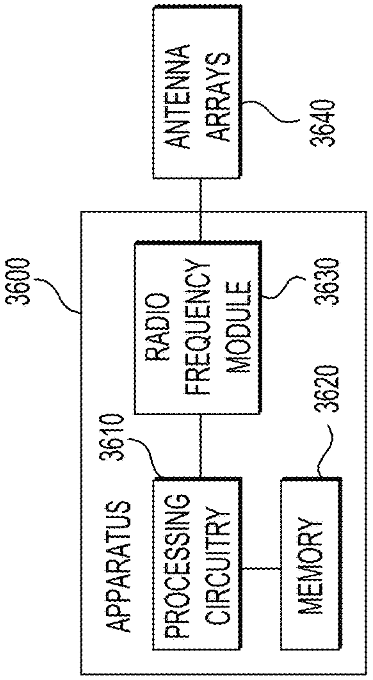
FIG. 36 shows an exemplary apparatus 3600 according to embodiments of the disclosure.

FIG. 36 shows an exemplary apparatus 3600 according to embodiments of the disclosure. The apparatus 3600 can be configured to perform various functions in accordance with one or more embodiments or examples described herein. Thus, the apparatus 3600 can provide means for implementation of mechanisms, techniques, processes, functions, components, systems described herein. For example, the apparatus 3600 can be used to implement functions of UEs or BSs (controlling TRPs) in various embodiments and examples described herein. The apparatus 3600 can include a general-purpose processor or specially designed circuits to implement various functions, components, or processes described herein in various embodiments. The apparatus 3600 can include processing circuitry 3610, a memory 3620, and a radio frequency (RF) module 3630.

In various examples, the processing circuitry 3610 can include circuitry configured to perform the functions and processes described herein in combination with software or without software. In various examples, the processing circuitry 3610 can be a digital signal processor (DSP), an application-specific integrated circuit (ASIC), programmable logic devices (PLDs), field programmable gate arrays (FPGAs), digitally enhanced circuits, or comparable device or a combination thereof.

In some other examples, the processing circuitry 3610 can be a central processing unit (CPU) configured to execute program instructions to perform various functions and processes described herein. Accordingly, the memory 3620 can be configured to store program instructions. The processing circuitry 3610, when executing the program instructions, can perform the functions and processes. The memory 3620 can further store other programs or data, such as operating systems, application programs, and the like. The memory 3620 can include non-transitory storage media, such as a read-only memory (ROM), a random-access memory (RAM), a flash memory, a solid-state memory, a hard disk drive, an optical disk drive, and the like.

In an embodiment, the RF module 3630 receives a processed data signal from the processing circuitry 3610 and converts the data signal to beamforming wireless signals that are transmitted via antenna arrays 3640, or vice versa. In some examples, the RF module 3630 can include a digital to analog converter (DAC), an analog to digital converter (ADC), a frequency up-converter, a frequency down converter, filters and amplifiers for reception and transmission operations. In some examples, the RF module 3630 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 3640 can include one or more antenna arrays organized in multiple antenna panels or antenna groups.

The apparatus 3600 can optionally include other components, such as input and output devices, additional or signal processing circuitry, and the like. Accordingly, the apparatus 3600 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer-readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid-state memory, magnetic tape, a removable computer diskette, a random-access memory (RAM), a read-only memory (ROM), a magnetic disk and an optical disk, and the like. The computer-readable non-transitory storage medium can include all types of computer-readable medium, including magnetic storage medium, optical storage medium, flash medium, and solid-state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:

receiving a channel state information (CSI) report configuration at a user equipment (UE) from a base station, the CSI report configuration being associated with a set of CSI reference signal (CSI-RS) resources corresponding to multiple transmission reception points (TRPs), the CSI-RS resources being organized into one or more resource groups, the CSI report configuration including one or more antenna configurations (N1, N2) each corresponding to one or more of the multiple TRPs, the one or more antenna configurations (N1, N2) corresponding to the one or more resource groups, respectively, N1 and N2 being numbers of antenna ports of the respective one or more TRPs in vertical and horizontal directions, respectively, and wherein at least one resource group includes at least two TRPs;

performing a channel measurement based on the CSI-RS resources corresponding to the multiple TRPs;

determining a precoder matrix indicator (PMI) based on measurement results of the channel measurement and the one or more antenna configurations (N1, N2) each corresponding to one or more of the multiple TRPs; and transmitting a CSI report to the base station, the CSI report including the PMI.

2. The method of claim 1, wherein the PMI corresponding to a precoder matrix of a Type II CSI codebook.

3. The method of claim 1, wherein a first antenna configuration (N1, N2) of the one or more antenna configurations (N1, N2) corresponds to at least two co-located TRPs of the multiple TRPs, N1 and N2 being numbers of antenna ports of the respective co-located TRPs in vertical and horizontal directions, respectively.

4. The method of claim 1, wherein the CSI report configuration further includes a power indicator indicating how to scale a transmission power of a TRP of the multiple TRPs.

5. The method of claim 4, wherein the UE perform channel-quality indicator (CQI) estimation based on the power indicator.

6. The method of claim 1, wherein the CSI report configuration further includes a power indicator indicating which TRPs of the multiple TRPs share a same total power.

7. The method of claim 1, wherein the CSI report configuration further includes a power indicator indicating at least one of the multiple TRPs transmits with full power.

8. The method of claim 1, wherein the CSI report configuration further includes a power indicator indicating each of the multiple TRPs transmits with full power.

9. An apparatus, comprising circuitry configured to:

receive a channel state information (CSI) report configuration from a base station, the CSI report configuration being associated with a set of CSI reference signal (CSI-RS) resources corresponding to multiple transmission reception points (TRPs), the CSI-RS resources being organized into one or more resource groups, the CSI report configuration including one or more antenna configurations (N1, N2) each corresponding to one or more of the multiple TRPs, the one or more antenna configurations (N1, N2) corresponding to the one or more resource groups, respectively, N1 and N2 being numbers of antenna ports of the respective one or more TRPs in vertical and horizontal directions, respectively, and wherein at least one resource group includes at least two TRPs;

perform a channel measurement based on the CSI-RS resources corresponding to the multiple TRPs;

determine a precoder matrix indicator (PMI) based on measurement results of the channel measurement and the one or more antenna configurations (N1, N2) each corresponding to one or more of the multiple TRPs; and transmit a CSI report to the base station, the CSI report including the PMI.

10. The apparatus of claim 9, wherein the PMI corresponding to a precoder matrix of a Type II CSI codebook.

11. The apparatus of claim 9, wherein a first antenna configuration (N1, N2) of the one or more antenna configurations (N1, N2) corresponds to at least two co-located TRPs of the multiple TRPs, N1 and N2 being numbers of antenna ports of the respective co-located TRPs in vertical and horizontal directions, respectively.

12. The apparatus of claim 9, wherein the CSI report configuration further includes a power indicator indicating how to scale a transmission power of a TRP of the multiple TRPs.

13. The apparatus of claim 12, wherein the UE perform channel-quality indicator (CQI) estimation based on the power indicator.

14. The apparatus of claim 9, wherein the CSI report configuration further includes a power indicator indicating which TRPs of the multiple TRPs share a same total power.

15. The apparatus of claim 9, wherein the CSI report configuration further includes a power indicator indicating at least one of the multiple TRPs transmits with full power.

16. The apparatus of claim 9, wherein the CSI report configuration further includes a power indicator indicating each of the multiple TRPs transmits with full power.

17. A non-transitory computer-readable medium storing instructions that, when executed by a processor, cause the processor to perform a method, the method comprising:

receiving a channel state information (CSI) report configuration from a base station, the CSI report configuration being associated with a set of CSI reference signal (CSI-RS) resources corresponding to multiple transmission reception points (TRPs), the CSI-RS resources being organized into one or more resource groups, the CSI report configuration including one or more antenna configurations (N1, N2) each corresponding to one or more of the multiple TRPs, the one or more antenna configurations (N1, N2) corresponding to the one or more resource groups, respectively, N1 and N2 being numbers of antenna ports of the respective one or more TRPs in vertical and horizontal directions, respectively, and wherein at least one resource group includes at least two TRPs;

performing a channel measurement based on the CSI-RS resources corresponding to the multiple TRPs;

determining a precoder matrix indicator (PMI) based on measurement results of the channel measurement and the one or more antenna configurations (N1, N2) each corresponding to one or more of the multiple TRPs; and transmitting a CSI report to the base station, the CSI report including the PMI.

18. The non-transitory computer-readable medium of claim 17, wherein the PMI corresponding to a precoder matrix of a Type II CSI codebook.

19. The non-transitory computer-readable medium of claim 17, wherein a first antenna configuration (N1, N2) of the one or more antenna configurations (N1, N2) corresponds to at least two co-located TRPs of the multiple TRPs, N1 and N2 being numbers of antenna ports of the respective co-located TRPs in vertical and horizontal directions, respectively.

20. The non-transitory computer-readable medium of claim 17, wherein the CSI report configuration further includes a power indicator indicating how to scale a transmission power of a TRP of the multiple TRPs.

* * * * *